US006487564B1

(12) United States Patent
Asai et al.

(10) Patent No.: US 6,487,564 B1
(45) Date of Patent: Nov. 26, 2002

(54) MULTIMEDIA PLAYING APPARATUS UTILIZING SYNCHRONIZATION OF SCENARIO-DEFINED PROCESSING TIME POINTS WITH PLAYING OF FINITE-TIME MONOMEDIA ITEM

(75) Inventors: Kayoko Asai; Makoto Sato, both of Tokyo; Atsushi Minemura, Kashiwa; Toshio Oka, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/677,752

(22) Filed: Jul. 10, 1996

(30) Foreign Application Priority Data

Jul. 11, 1995 (JP) .............................................. 7-174662
Nov. 1, 1995 (JP) .............................................. 7-306372

(51) Int. Cl.[7] .............................................. G06F 17/21
(52) U.S. Cl. .................................. 707/500.1; 707/501.1
(58) Field of Search ................................ 395/806, 807, 395/773, 762; 345/302, 723; 707/500.1, 501.1, 513, 530

(56) References Cited

U.S. PATENT DOCUMENTS

| | | | |
|---|---|---|---|
| 5,333,299 A | | 7/1994 | Koval et al. ................. 395/551 |
| 5,471,576 A | * | 11/1995 | Yee ............................. 395/807 |
| 5,515,490 A | * | 5/1996 | Buchanan et al. ........... 395/807 |
| 5,524,193 A | * | 6/1996 | Covington et al. .......... 395/773 |
| 5,559,949 A | * | 9/1996 | Reimer et al. ............... 395/327 |
| 5,596,705 A | * | 1/1997 | Reimer et al. ............... 395/326 |
| 5,600,775 A | * | 2/1997 | King et al. ................... 395/806 |
| 5,625,833 A | * | 4/1997 | Levine et al. ................ 395/507 |
| 5,666,542 A | * | 9/1997 | Katai et al. .................. 395/762 |

FOREIGN PATENT DOCUMENTS

JP 5-274807 10/1993

OTHER PUBLICATIONS

Little et al., "Interval–based conceptual models for time–dependent multimedia data", IEEE Transactions on Knoledge and Data Engineering vol. 5, Issue 4, pp. 551–563.*

Iino et al., "An object–oriented model for spatio–temporal synchronization of multimedia information", Proceedings of the International Conference on Multimedia Computing and Systems, 1994, pp. 110–119.*

Ogawa et al., "Scenario–based hypermedia: A model and a system", Proceedings of the First European Conference on Hypertext, Nov. 1990, pp. 38–51.*

"An Integrated Digital Production Suite"by Carson et al., SMPTE Journal, Jun. 1991, pp. 423–426.

"Approaches to Video disc –Based Editing"by Becker & Spangler, SMPTE Journal, Aug. 1991, pp. 633–636.

* cited by examiner

*Primary Examiner*—Stephen S. Hong
(74) *Attorney, Agent, or Firm*—Israel Gopstein Clark Brody

(57) ABSTRACT

A multimedia playing apparatus plays hypermedia titles each consisting of a plurality of monomedia objects including at least one finite time monomedia object such as a video object, which is formatted as a sequence of fixed-length playing sections such as video frames and functions as a base-axis object for providing a timing reference. The apparatus executes playing of a hypermedia title in accordance with processing time points specified as respective numbers of the playing sections, and stores and utilizes a plurality of sets of synchronization trigger data each of which designates that playing of a specific monomedia object other than the base-axis object is to be started, or is to be ended, at a specific processing time point, with the synchronization trigger data sets being successively accessed and used as the corresponding processing time points are respectively reached during playing of the hypermedia title.

13 Claims, 41 Drawing Sheets

FIG. 3

(a)
```
<Scenario> = <Title descriptor><Object descriptor><Subject matter descriptor>
                    (a)              (b)                    (c)
             <Synchronization trigger data>
                    (d)
```

(a)
```
<Title descriptor>    = <Title name><Base-axis object ID>

<Title name>          = String of characters other than null or control characters <Base-axis object ID> = Character string expressing positive integer
```

(b)
```
<Object descriptor>  = <Object ID><Displayed width><Displayed height><X><Y>
                       <Subject matter ID><Line feed>
                       |<Object descriptor><Object descriptor>

<Object ID>          = Character string expressing positive integer
<Displayed width>    = Character string expressing positive integer
<Displayed height>   = Character string expressing positive integer
<X>                  = Character string expressing positive integer
<Y>                  = Character string expressing positive integer
<Subject matter ID>  = Character string expressing positive integer
<Line feed>          = Line feed code
```

(c)
```
<Subject matter descriptor> = <Subject matter ID><Subject matter file name><Line feed>
                              <Subject matter descriptor><Subject matter descriptor>

<Subject matter file name>  = Arbitrary character string, beginning with alphanumeric
                              character, formed of alphanumeric characters and period
```

(d)
```
<Synchronization trigger data>   = <Processing time point><ID of object which is to be processed>
                                   <Processing contents><Line feed>
                                   |<Synchronization trigger data><Synchronization trigger data>

<Processing time point>          = Character string expressing integer of value 0 or higher <ID of object which is to be processed> = Character string expressing positive integer <Processing contents>            = ON / OFF
```

FIG. 4
(a) Title descriptor
| Media title name |
| Base-axis object ID |
(b) object descriptor
ID number = object ID
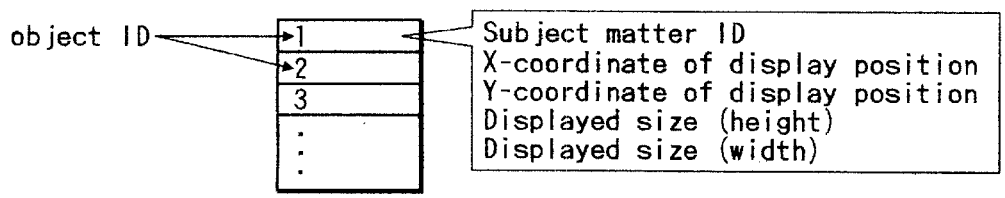
(c) Subject matter descriptor
Array number = subject matter ID
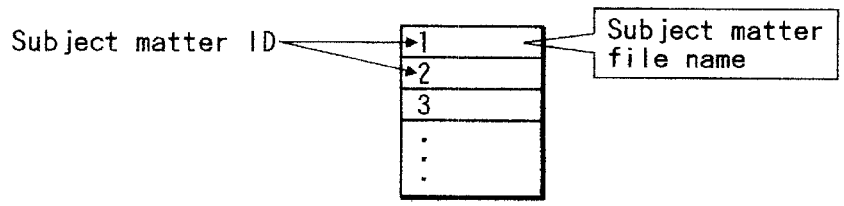
(d) Synchronization trigger data
Arranged successively in order of increasing value of processing point (i.e. frame number count)
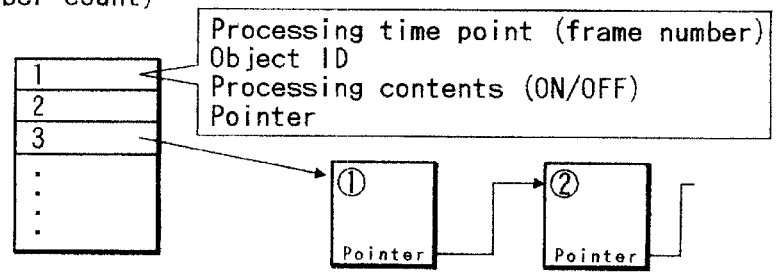

FIG. 8
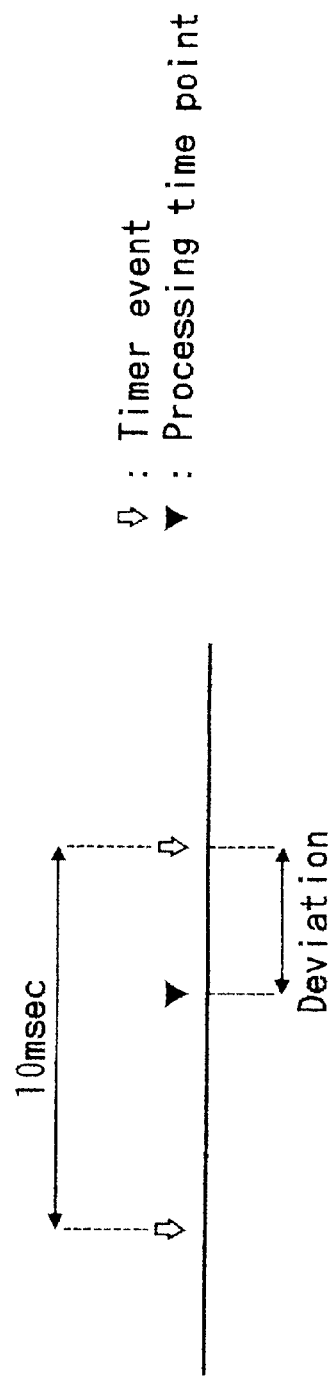
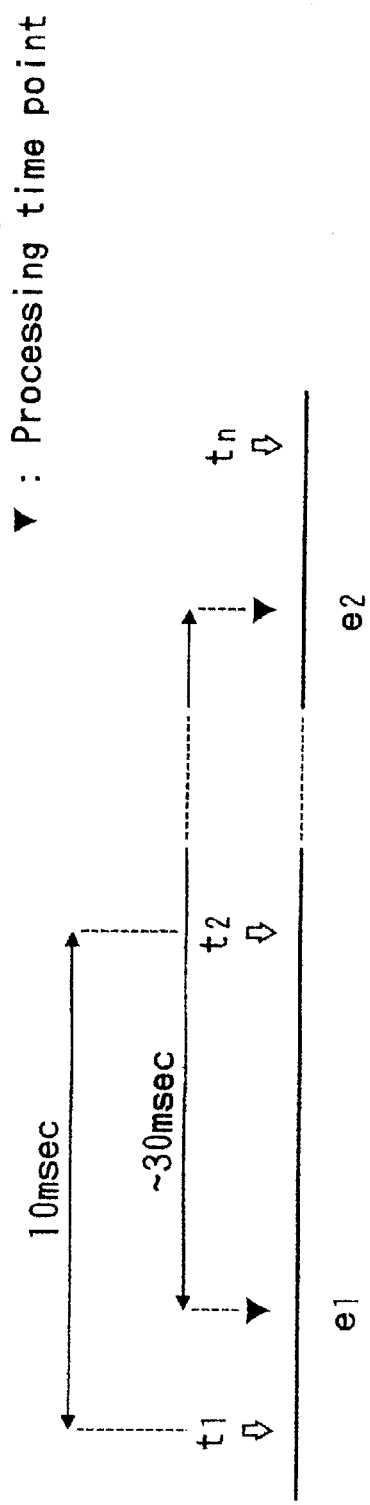

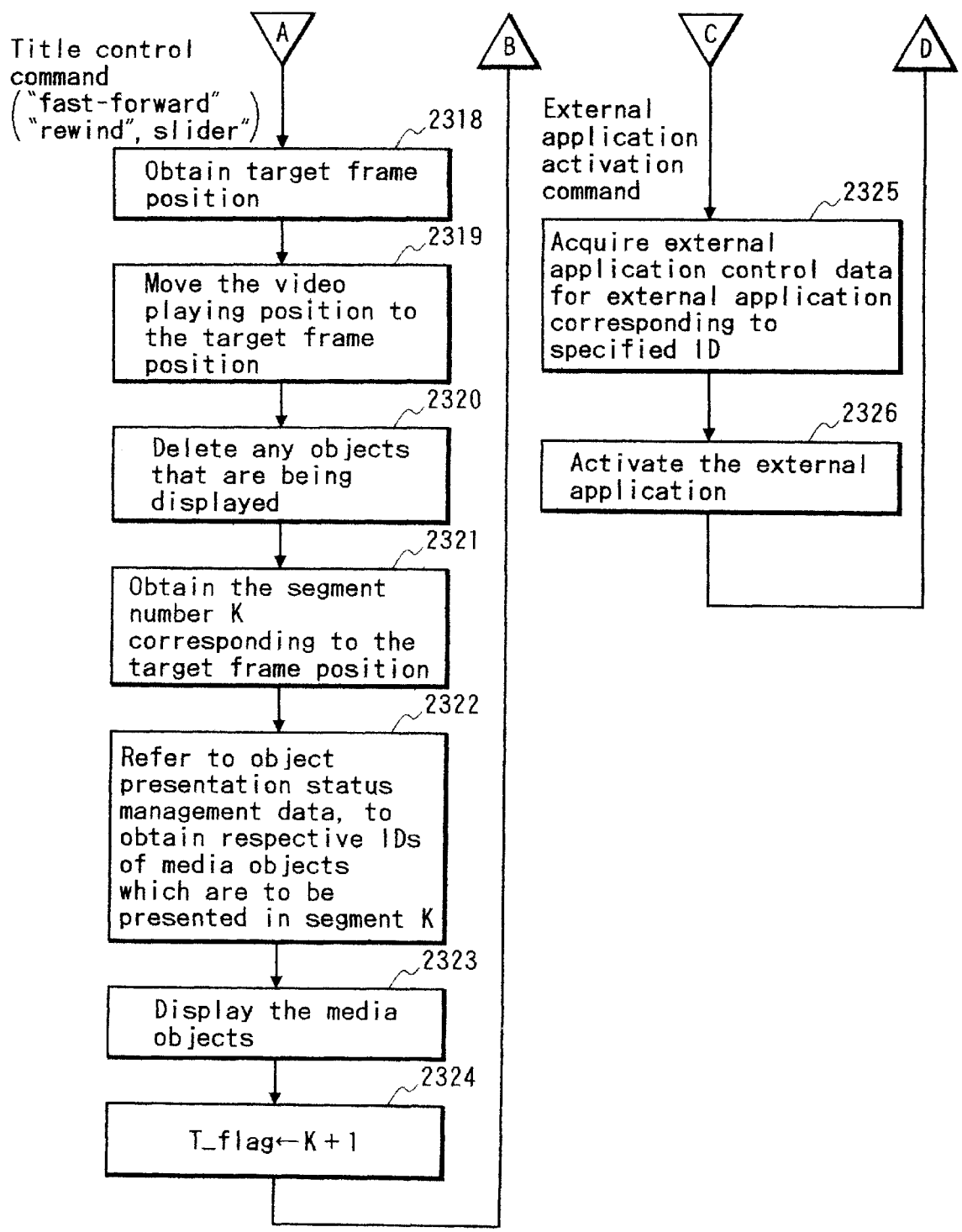

FIG. 24

```
<Scenario> = <Title descriptor><Object descriptor><Subject matter descriptor>
                 (a)              (b)                  (c)
             <Synchronization trigger data><External application descriptor>
                          (d)                            (e)
```

(a) Same as in Fig. 3
(b) Same as in Fig. 3
(c) Same as in Fig. 3
(d) Same as in Fig. 3

(e)
```
<External application descriptor> = <Application ID><Application name><Line feed>
                                    |<External application descriptor>

<Application ID>    = Character string expressing a positive integer
<Application name>  = String of arbitrary characters, other than null or control characters
```

Array number = application ID

FIG. 29
(a) Title descriptor
    Same as in Fig. 4
(b) Object descriptor
    Same as in Fig. 4
(c) Subject matter descriptor
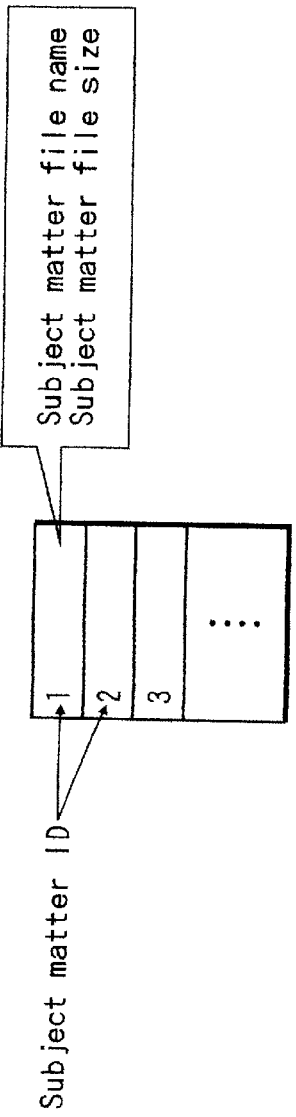
Array number = subject matter ID
(d) Synchronization trigger data
Stored in array sequence of increasing value of processing time point
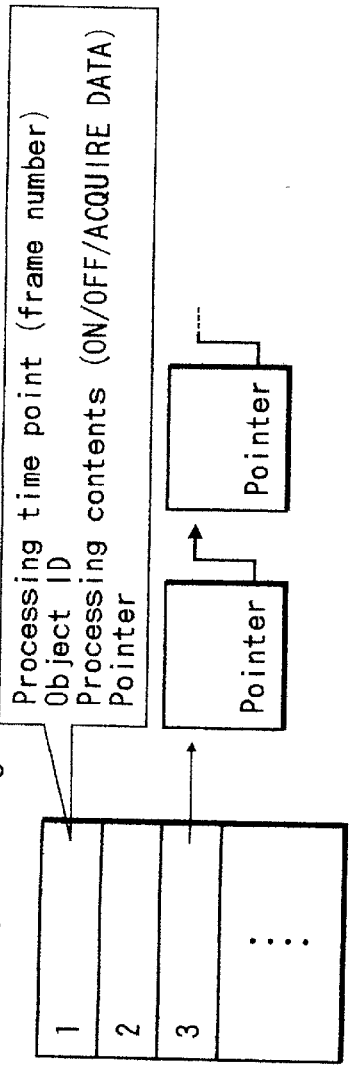

FIG. 30

(c)
```
<Subject matter descriptor> = <Subject matter ID><Subject matter file name><Subject matter file size><Line feed>
                              <Subject matter descriptor><Subject matter descriptor>
```

FIG. 43

| Base-axis object data transfer rate (bps) | Data block size (Kbyte) | Acquisition cycle (msec) |
|---|---|---|
| 1.5M | 100 | 500 |
| 3.0M | 50 | 500 |
| 2.3M | 300 | 1000 |

MULTIMEDIA PLAYING APPARATUS UTILIZING SYNCHRONIZATION OF SCENARIO-DEFINED PROCESSING TIME POINTS WITH PLAYING OF FINITE-TIME MONOMEDIA ITEM

BACKGROUND OF THE INVENTION

1. Field of the Invention

The present invention relates to a multimedia playing apparatus for playing multimedia information items (referred to in the following as multimedia titles), each consisting of a combination of multimedia data objects such as video clips, audio clips, still pictures, text items, etc., with playing conditions (e.g., playing intervals, window size and window position on a display screen, etc) for the various multimedia data objects being specified in a scenario.

2. Description of the Prior Art

When playing a multimedia title, it is necessary that the start and end of playing the various monomedia objects, during the playing progression, be linked to some reference timing axis, in a manner that is specified in the scenario data. With a prior art type of multimedia playing apparatus, a real-time axis is generally used for that purpose. For example, the scenario of a multimedia title might specify that a certain still-picture monomedia object is to start to be displayed at a point which occurs 3 minutes after playing of that multimedia title has started, and is to cease to be displayed at a point which occurs 6 minutes after playing of the multimedia title has started. That is to say, playing times for the various monomedia objects of a multimedia title, specified in the scenario, are linked to points along a real-time axis whose origin is the time point at which playing of the multimedia title begins.

However in practice, such a method presents various basic problems. For example, the multimedia title might include a video object, i.e., a video clip, which is played for a relatively long duration during the playing progression of the multimedia title, and it might be required for a certain still picture to start to be displayed at a certain point (such a point being referred to in the following as a processing time point), within that progression, which is accurately determined in relation to playing the video object. In a practical type of multimedia playing apparatus, in which the data of the video object might be transferred from a data storage device via a network data communication path before being displayed, it cannot be guaranteed that the progression of playing that video object will be accurately in accordance with a predetermined absolute real-time axis. There will be minor variations in timing, which will not affect the playing of the video object as seen by a user, but whereby it cannot be ensured that a certain frame of the video will occur at an accurately predetermined point on the real-time axis, after the start of playing the multimedia title. Moreover, the data of a finite-time object such as a video object are generally stored and transferred encoded in a compressed format such as the MPEG1 format. When playing of such a video object is started the data are successively decompressed (decoded) by a decoder apparatus, in a manner which is not linked to the progression of the scenario. Thus, only the starting point of playing such a finite-time object is directly linked to the playing progression of the multimedia title as set out in the scenario.

The longer the duration for which such a finite-time object is played, the greater will be the amount of deviation between the actual time of occurrence of a certain part of the object (e.g., playing of a specific frame of a video object) and the processing time point which has been specified for that occurrence in the scenario. As a result, there may be significant errors between the scenario and the multimedia title "story" which is actually presented, e.g., still-picture objects may not presented at the correct times during playing of a video object. Thus the problem arises that the "story" which is actually presented by a multimedia title may vary in accordance with the operating environment, i.e., in accordance with the characteristics of data storage devices, a network through which data are transferred, etc.

It can thus be understood that the above problem results from the fact that management of playing of the multimedia title is based upon use of a real-time axis as a reference axis for the playing progression.

A second problem is as follows. It can be assumed in general that some finite-time object, and in particular a video object, will be being played at any particular point during the progression of a multimedia title. When a monomedia object such as a still picture is to be presented, the data representing that monomedia object are read out from data storage (in general, as a data file), are converted to suitable form for being played, i.e., are formed in accordance with the scenario contents, such that the monomedia object will appear at the specified position, with the specified window size, on the display screen. However in a practical apparatus, such processing, and also the processing whereby the video object data are processed must be performed by the same computer, i.e., the same CPU. Hence, the acquisition of the still-picture object data and the conversion of these data to suitable form for presentation will impose a substantial load on that CPU, i.e., will require a significant amount of processing time. This may obstruct the processing which must be performed, at regular intervals, to acquire and process video data to play successive frames of the video data, and so may result in momentary interruptions of playing a finite-time object such as a video object.

A third problem is as follows. With a prior art type of multimedia playing apparatus, playing of a multimedia title is performed as an automatic sequence, i.e., the multimedia title must be played continuously in accordance with the scenario, from the beginning. It has not been possible to provide a function whereby a user can execute manual control of the playing progression, e.g., whereby the user can move the playing position to an arbitrary point within the playing progression. The reason for this is as follows. With the prior art type of multimedia playing apparatus, processing points (i.e., points at which playing of a monomedia object is to be started or terminated) are defined within the scenario at positions along the playing progression axis of the multimedia title, as respective time points. In order to be able to move the playing position to an arbitrary point along the playing progression, it is necessary first to determine the status of playing at that arbitrary point, and to obtain that information it would be necessary to again begin to read through the scenario, from the start of the scenario, until the specified time point is reached, and then obtain information specifying the monomedia object or monomedia objects to be presented at that time point. However if such processing were to be executed during actual playing of a multimedia title, it would be difficult to achieve a sufficiently rapid and smooth transition to the new playing position.

A fourth problem is as follows. With a prior art type of multimedia playing apparatus, it has not been possible for a user to execute an operation to alter any of the display attributes of a monomedia object such as displayed (window) position, displayed (window) size, etc., i.e., to execute any operation (referred to in the following as a user-mediated operation) which results in a change in the progression of the multimedia title which is not in accordance with the scenario.

A fifth problem is as follows. With a prior art type of multimedia playing apparatus, it is not possible to execute any processing other than playing of multimedia titles. If it is necessary to execute other types of processing, then it becomes necessary to provide a dedicated apparatus for that purpose. If it were possible for the multimedia playing apparatus to execute external applications (for example, starting at any arbitrary point during playing of a multimedia title, as specified by an input command generated by a user while viewing the multimedia title), then various additional functions could easily be provided by such a multimedia playing apparatus, and the range of use would be greatly expanded.

SUMMARY OF THE INVENTION

It is an objective of the present invention to provide a multimedia playing apparatus for playing a hypermedia title, whereby the problems of the prior art set out hereinabove can be overcome. The term "hypermedia title" as used herein signifies a multimedia title which includes a finite-time monomedia object such as a video object which is played continuously from start to end of the playing progression of the multimedia title, with that finite-time monomedia object being formatted as a successive of playing sections which are of identical length. Such a video object will be referred to in the following as the base-axis object of the hypermedia title. For example, if the base-axis object is a video object (i.e., a video clip which is played continuously from start to end of playing the multimedia title), then that is inherently divided into a succession of playing sections, i.e., the video frames. Alternatively, an audio base-axis object could be used, for example by embedding periodic timing markers in an audio sound track of a multimedia title, to thereby define successive playing sections. With the present invention, the aforementioned processing time points are defined as respective numbers of these playing sections, so that respective attainments of the processing time points during the playing progression of the hypermedia title can be detected by maintaining a count of the number of playing sections which have been played, by a counter which will be referred to as the playing progression counter.

It should be noted that the term "played" as used in the following description and in the claims is to be understood in a very broad sense, i.e., to apply to playing of a finite-time monomedia object such as a video or audio object to display a moving picture or generate audible sound, and to apply also to static displaying of monomedia objects such as still pictures or text items.

As a result of defining the processing time points as described above, it becomes possible to accurately synchronize the various processing operations applied to the other monomedia objects of the hypermedia title (these being referred to in the following as the non base-axis objects) with the playing progression of the base-axis object, since these time points are linked to that playing progression, rather than to points along the real-time axis.

Thus, the present invention provides a multimedia playing apparatus which utilizes a specific finite-time object of a multimedia title to define a reference timing axis, which will be referred to as the base axis, and which is utilized (rather than using a real-time axis for timing reference purposes) during playing of a multimedia title to define the timings of respective processing points, i.e., the points at which playing of other monomedia objects is started or terminated, as defined in the scenario.

Hence, an apparatus according to the present invention inherently overcomes the first of the problems set out hereinabove.

To overcome the second problem set out above, the invention provides a multimedia playing apparatus whereby, prior to the time at which playing of a hypermedia title is to be enabled (i.e., prior to the time at which the apparatus is set in a condition in which it is possible for a user to input a command to specify that the hypermedia title is to be played), the data for all of the monomedia objects other than the base-axis object are acquired (e.g., read out as respective data files from a data storage device) and formed into corresponding data which are ready to be supplied to a playing device (e.g., video display section) for immediate presentation, with these data then being stored locally in memory until required during playing of the hypermedia title. As a result, during playing of the hypermedia title, each base-axis object can immediately start to be presented at the point which is specified in the scenario, without danger of obstructing the playing of the base-axis object.

To overcome the third problem set out above, the invention provides a multimedia playing apparatus whereby a hypermedia title is treated as a succession of segments, and whereby specific data (object presentation status management data) are prepared prior to the time at which playing of the hypermedia title is to be enabled, with the data specifying the processing which is to be executed within each of the segments. That is to say, for each segment, the corresponding part of the object presentation status management data specifies the monomedia objects (other than the base-axis object) which are to start to be played at the beginning of that segment, or for which playing is to be terminated at the beginning of that segment, or which are to continue (i.e., from the preceding segment) to be played during that segment. The object presentation status management data are stored in memory. Subsequently, during playing of the hypermedia title, if it is required to move the playing position to a different position within the playing progression, the necessary information concerning the playing status at that different position is immediately available, by reading out from memory the part of the object presentation status management data which corresponds to that new position. In that way, it becomes possible to provide a manual control feature, whereby a user can arbitrarily shift the playing position to a different position within the playing progression of a hypermedia title.

To overcome the fourth problem set out above, the invention provides a multimedia playing apparatus whereby, for one or more monomedia objects of a hypermedia title, data are prepared which specify at least one different playing attribute which is different from the attributes which are specified for that monomedia object in the scenario. For example in the case of a still-picture object, data may be prepared which specify a larger display size, and/or a different display position, from the size and/or position specified in the scenario. Such data are stored in memory prior to the time at which playing of a hypermedia title is to be enabled, and can subsequently be used to enable interactive control of that playing attribute (or attributes) by the user. Such a method of interactive control requires only a very small amount of processing, and so can be easily implemented during playing of a hypermedia title without the danger of obstructing the progression of playing the hypermedia title.

To overcome the fifth problem set out above, the invention provides a multimedia playing apparatus whereby information required for activating specific external applications, which are unrelated to playing of a hypermedia title, is contained in the scenario, and whereby a user can input an external application activation command, during playing of the hypermedia title, to selectively specify execution of one of the external applications.

More specifically, according to a first aspect the invention provides a multimedia playing apparatus for playing a hypermedia title formed of a base-axis object and at least one non base-axis object, the base-axis object being a finite-time monomedia object having a playing duration which extends from start to end of a playing progression of the hypermedia title, the base-axis object being configured as a plurality of sequential fixed-length playing sections, the multimedia playing apparatus comprising:

scenario data storage means for storing data of a scenario of the hypermedia title, the scenario including a plurality of sets of synchronization trigger data, each of the sets identifying a corresponding one of the non base-axis objects and specifying, for the corresponding non base-axis object, a processing time point during the playing progression at which a processing operation for starting playing of the non base-axis object or a processing operation for ending playing of the non base-axis object is to be executed, each of the processing time points being expressed as an integral number of the playing sections, subject matter data storage means for storing respective subject matter data of the base-axis object and each of the non base-axis objects;

timer event generating means for periodically generating timer events;

base-axis object display means controllable for acquiring subject matter data of the base-axis object from the subject matter data storage means and utilizing the subject matter data to play the base-axis object, and for counting successively played ones of the playing sections;

non base-axis object display means for playing each of the non base-axis objects;

internal data memory means;

processing event counter means;

playing progression counter means for counting successive ones of the playing sections during playing of the hypermedia title;

playing command input means, operable by a user for generating at least a "play" input command to designate that playing of the hypermedia title is to be started; and overall control and synchronization processing means for executing initial processing to set the apparatus in a condition of readiness for playing the hypermedia title, the initial processing comprising at least operations for acquiring the scenario data from the scenario data storage means, obtaining the sets of synchronization trigger data from the scenario data and storing the sets in sequentially numbered locations in the internal memory means, for setting the processing event counter means and playing progression counter means to a common initial value, and on completion of the initial processing, when input of the "play" input command occurs, executing operations for controlling the base-axis object display means to begin to acquire the base-axis object subject matter data, in response to occurrence of each of the timer events, obtaining respective current values of the playing sections count and processing event count, obtaining from the internal memory means a set of the synchronization trigger data having a storage location which corresponds to the processing event count value, judging whether the playing sections count value is greater than or equal to a processing time point value which is specified in the obtained set of synchronization trigger data, and, when the playing sections count value is judged to be greater than or equal to the specified processing time point value, executing a processing operation which is specified in the synchronization trigger data set, for a non base-axis object which is identified in the synchronization trigger data set, and incrementing the processing event counter means.

According to a second aspect, with such a multimedia playing apparatus a plurality of the sets of synchronization trigger data may be assigned to a specific one of the processing time points, and each of the synchronization trigger data sets includes storage location pointer information for defining a sequence in which the plurality of sets are to be successively read out from memory and processed when the specific processing time point is reached.

According to a third aspect, the overall control and synchronization processing means of such a multimedia playing apparatus comprises means functioning, when the obtained set of synchronization trigger data specifies for the corresponding non base-axis object that playing of the non base-axis object is to be started, to acquire a subject matter data set of the non base-axis object from the subject matter data storage means, to process the subject matter data set into a corresponding formed data set which is in accordance with the playing conditions specified in the scenario, and to supply the formed data set to the second display means.

According to a fourth aspect, such a multimedia playing apparatus further comprises non base-axis object data memory means, and the overall control and synchronization processing means further comprises:

means functioning, during execution of the initial processing operations, to acquire respective sets of subject matter data of each of the non base-axis objects from the subject matter data storage means, to convert each of the sets into respective corresponding sets of formed data which are in accordance with the playing conditions specified in the scenario, and to store the sets of formed data in the non base-axis object data memory means, and means functioning during the playing progression, when the obtained set of synchronization trigger data specifies for the corresponding non base-axis object that playing of the non base-axis object is to be started, to acquire a formed data set corresponding to the non base-axis object from the non base-axis object data memory means and to supply the formed data set to the second display means.

According to a fifth aspect, such a multimedia playing apparatus further comprises title control command input means, operable by a user for generating a title control input command to specify that a current playing position of the hypermedia title is to be shifted to a new playing position in the playing progression, object presentation status management data memory means, and playing status restoration processing means, and wherein the overall control and synchronization processing means further comprises means functioning during execution of the initial processing operations to obtain the information specifying respective processing time points for starting and ending display of each of the non base-axis objects, to generate corresponding object presentation status management data specifying, for each of respective sequentially numbered segments of the playing progression which are defined between successive pairs of the processing time points, each of the non base-axis objects which is to be played during the segment, and to store the object presentation status management data in the object presentation status management data memory means, wherein the playing status restoration processing means comprises means functioning, in response to designation of a shift to a new playing position by a title control input command, to control the second display means to delete all non base-axis objects which are currently being displayed by the second display means, to obtain the number of a segment which contains the new playing position, to obtain from the object presentation status management data memory means the object presentation status management data corresponding to the segment, to read out from the non base-axis object data memory means respective sets of the formed data of non base-axis objects which are specified for the segment in the object presentation status management data and to supply the non base-axis object formed data to the non base-axis object display means.

According to a sixth aspect, such a multimedia playing apparatus further comprises object control means, and object control command input means operable by a user for generating an object control command to designate for at least one of the non base-axis objects that the non base-axis object is to be displayed in accordance with a user-mediated display condition which is different from a display condition specified for the non base-axis object in the scenario, the overall control and synchronization processing means further comprising means, functioning during execution of the initial processing operations, to modify the formed data set of the non base-axis object to obtain a modified formed data set which is in accordance with the user-mediated display condition, and to store the modified formed data set in the internal data memory means, and the object control means functioning during playing of the hypermedia title, in response to input of the object control command, to control the second display means to terminate playing of the non base-axis object and to acquire the modified formed data set from the internal data memory means and supply the modified formed data set to the second display means, for thereby playing the non base-axis object in accordance with the user-mediated display condition.

According to a seventh aspect, with such a multimedia playing apparatus the scenario includes information relating to at least one external application program having functions which are not related to the playing of a hypermedia title, the apparatus further comprising external application program activation command input means operable by a user for generating an external application program activation input command, external application program activation means controllable for activating the execution of the external application program, and external application program data memory means, the overall control and synchronization processing means further comprising means functioning during execution of the initial processing operations to generate external application program control data which are necessary for activating the external application program and to store the external application program control data in the external application program data memory means, the external application program activation means being responsive to generation of the external application program activation input command, during playing of the hypermedia title, for acquiring the external application program control data from the external application program data memory means and supplying the external application program control data to the external application program activation means, and the external application program activation means utilizing the external application program control data to activate the external application program.

According to an eighth aspect, with such a multimedia playing apparatus, the base-axis object subject matter data are cyclically acquired by the base-axis object display means from the subject matter data storage means as successive fixed-size data blocks having a first value of data block size, with a fixed cycle time, and the overall control and synchronization processing means acquires and supplies the non base-axis object subject matter data as successive fixed-size data blocks, with the cycle time, the blocks having a second value of size which is predetermined based on the cycle time and the first value of size, the apparatus further comprising data block acquisition information memory means having stored therein the cycle time and the second data block size value, object data acquisition time calculation means functioning during the initial processing to calculate, for each of the non base-axis objects, a duration of acqusition time required to acquire the subject matter data of the each non base-axis object from the subject matter data storage means, and sequential data acquisition schedule management means for determining, based on the acquisition time durations, respective data acquisition starting time points for sequential acquisition of subject matter data of respective ones of the non base-axis objects to begin, with at least one of the data acquisition starting time points being determined such that at least a part of the subject matter data of a corresponding non base-axis object is specified to be acquired during the playing progression of the hypermedia title, the overall control and synchronization processing means comprising means functioning during the initial processing to create, in correspondence with each of the data acquisition starting time points which is a positive value, an additional synchronization trigger data set which specifies as processing contents thereof that data acquisition for the corresponding non base-axis object is to commence at the data acquisition starting time point, and to store the additional synchronization trigger data sets in the internal memory means, to acquire from the subject matter data storage means respective subject matter data sets for each of the non base-axis objects corresponding to a data acquisition starting time point which is a negative value, and convert each of the subject matter data sets into a corresponding set of formed data which are in accordance with the playing conditions specified in the scenario, and to store the sets of formed data in the non base-axis object data memory means.

The acquisition of respective subject matter data sets for each of the non base-axis objects corresponding to a data acquisition starting time point which is a negative value may be executed by continuous data acquisition from the subject matter data storage means, or by cyclic acquisition of the subject matter data set from the subject matter data storage means, as sequential data blocks having the second fixed size, with the cycle time.

In addition, the sequential data acquisition schedule management means may comprise means functioning, for each of the non base-axis objects corresponding to a data acquisition starting time point which is a negative number, to divide the subject matter data set of the non base-axis object into an initial processing data acquisition portion and a playing progression data acquisition portion each comprising an integral number of the data blocks of the second size value, and, when the playing progression data acquisition portion has other than zero magnitude, to acquire from the subject matter data storage means the initial processing data acquisition portion and store the portion in the non base-axis object data memory means, and wherein the overall control and synchronization processing means comprises means for creating an additional synchronization trigger data set which specifies that acquisition of the playing progression data acquisition portion from the subject matter data storage means is to be commenced at the starting point of the playing progression, and for storing the additional synchronization trigger data set in the internal memory means.

Moreover it is possible to store in the data block acquisition information memory means a plurality of pairs of values, each pair being a combination of a cycle time value and second data block size value which have been predetermined in accordance with a specific value of bandwidth of a data communication path between the subject matter data storage means and the base-axis object display means. In that way, it becomes possible to permit selection of a cycle time/data block size combination which is appropriate for a particular data communication path.

It can be understood from the above that it is a basic feature of the present invention that, since the starting and termination time points of playing respective monomedia objects (other than the base-axis object) are defined in the scenario in terms of frame numbers of the base-axis object, the synchronization relationships between playing of these monomedia objects and the playing of the base-axis object (and between playing of respective monomedia objects) can be made independent of such factors as variations in playing speed of the base-axis object.

Although the present invention will be described in the following with respect to embodiments in which the non base-axis objects are assumed to be respective still pictures, it should be noted that it would be equally possible for some or all of these to be finite-time monomedia objects, i.e., video clips or audio clips. Whichever is the case, the specific processing time point at which playing of a particular object is to be started, and the time point at which that playing is to be terminated, are designated in respective sets of synchronization trigger data.

BRIEF DESCRIPTION OF THE DRAWINGS

FIG. 3 shows an example of the format of scenario data used in the first embodiment;

FIG. 4 illustrates the format in which internal data items are obtained from the scenario data and stored in an internal data memory;

FIG. 8 illustrates relationships between processing time points and timer events, in the first embodiment;

FIGS. 23A, 23B constitute a flow diagram showing the overall operation of the fifth embodiment;

FIG. 24 shows a partial example of scenario data used with the fifth embodiment, for illustrating differences from the scenario data of the first embodiment;

FIG. 29 illustrates the format in which internal data items are obtained from the scenario data and stored in an internal data memory, for the sixth embodiment;

FIG. 30 shows an example of a "subject matter descriptor" item of the scenario data, for the sixth embodiment, to illustrate differences from the scenario data of the first embodiment;

FIG. 43 is a table showing an example of the contents of a data block acquisition information memory, for an embodiment which is a modification of the sixth embodiment.

DESCRIPTION OF PREFERRED EMBODIMENTS

Various terms used in the following will first be defined. The term "playing" will be used with the generalized significance of playing a video clip, playing an audio clip, displaying a still picture or text item, etc. The term "multimedia title" is used to signify a multimedia presentation which is made up of a combination of video clips, audio clips, text, still pictures, etc., with these being presented in accordance with a predetermined story. The term "scenario" signifies a set of data providing specific information on how the story is to be played, i.e., including such information as the respective points in that playing progression at which various ones of the multimedia constituents are to be presented, and information (such as data storage location information, e.g., file names, file directory path information) specifying how the data expressing such constituents, i.e., the subject matter data, can be obtained and supplied to a playing device such as a video display unit. The term "monomedia object" signifies one of such constituents, i.e., a video clip, audio clip, still picture, etc, which is played as a part of the multimedia title, in accordance with the scenario, during the progression of playing the multimedia title. The term "hypermedia title" signifies a multimedia title having one specific finite time monomedia object (such as a video or audio object) that is formatted as a sequence of playing sections, and which is assigned a reference timing function, with such a specific monomedia object being referred to as a base-axis object. That is to say, during playing of the hypermedia title, times of starting and stopping of playing the other monomedia objects of that hypermedia title are linked to the progression of playing the base-axis object (specifically, playing of successive ones of the playing sections), rather than being linked to the flow of real time. The term "non base-axis object" will be used to refer to each monomedia object other than the base-axis object, of a hypermedia title.

If the base-axis object of a multimedia title is a video object, then the multimedia title will be referred to as a hypervideo title. The term "external application" will be used to refer to an application program other than one which is directly related to playing multimedia data.

Figure 1:
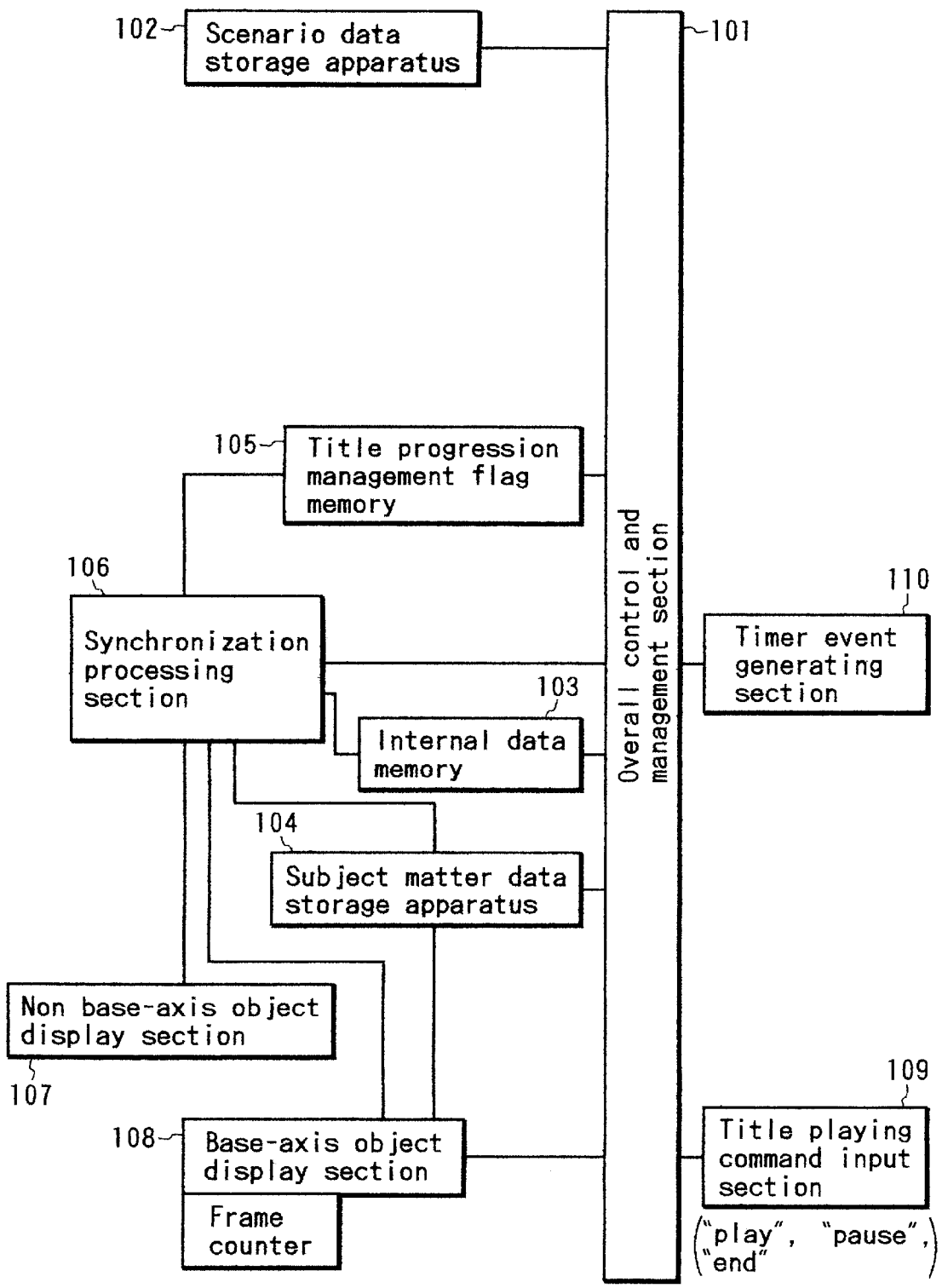
FIG. 1 is a general system block diagram of a first embodiment of a multimedia playing apparatus according to the present invention.

FIG. 1 is a block diagram showing the general configuration of a first embodiment of a multimedia title playing apparatus according to the present invention, which will be described referring also to the operating flow diagram of FIG. 2. It should be understood that FIG. 1 shows a system which may be configured, in practice, as a single computer system which includes data storage devices (such as hard disk storage devices) or by a combination of mutually communicating computer systems with at least one of these including data storage devices (such as a server computer/client terminal combination), for example which mutually communicate via a data communication path such as a path which extends through a data communication network. In FIG. 1, data expressing a scenario of a hypermedia title are stored in a scenario data storage apparatus 102, which may be for example an auxiliary data storage device such as a high-capacity hard disk storage apparatus. An overall control and management section 101 serves to read out the scenario data from the scenario data storage apparatus 102, interpret the scenario and convert it into internal data, and store these data in an internal data memory 103. In the case of a practical system which is configured, for example, of a server computer communicating with one or more client terminals, the scenario data storage apparatus 102 could be an auxiliary data storage device of the server computer, and the overall control and management section 101 might for example be implemented by hardware and software of the client terminal, together with hardware and software for controlling a communication protocol to acquire (i.e., read out and transfer) data from the scenario data storage apparatus 102 as required. In that case, a subject matter data storage apparatus 104 (described hereinafter) might also be an auxiliary storage device of a server computer, such as a high-capacity hard disk data storage apparatus, with the remaining blocks of the system shown in FIG. 1 being constituted in a client terminal. However it should be understood that the apparatus need not be limited to such a practical configuration.

The above processing will be referred to as the initial processing, which is executed prior to the start of playing the hypermedia title. When this initial processing has been completed, control of starting and stopping playing of the base-axis object are executed in accordance with title playing commands which can be input by a user through a title playing command input section 109.

The data of the base-axis object are played by the base-axis object display section 108. During the playing progression of a hypermedia title, the base-axis object display section 108 automatically acquires data of the base-axis object from the subject matter storage apparatus, executes any necessary processing, plays the data contents in a manner which has been specified by the scenario, and plays the base-axis object data from start to end of the playing progression. If the base-axis object is a video object, with the subject matter data being stored in compressed form (e.g., as MPEG1 data) then blocks of the data are periodically requested from the subject matter data storage apparatus by the base-axis object display section 108, temporarily stored in a video buffer memory, and decompressed to obtain successive video frames, which are displayed at a screen position and within a window size which are each specified in the scenario. As successive frames are displayed, these are counted by a frame counter which forms part of the base-axis object display section 108, and which constitutes the playing progression counter of this embodiment. The count value of that frame counter is reset to zero before the playing progression begins, with the successive frame count values being supplied thereafter to the overall control and management section 101 during the playing progression.

Since these functions of the base-axis object display section 108 can all be easily implemented by known types of apparatus, no detailed description will be given of the contents of the base-axis object display section 108.

It will be understood that if the base-axis object is a video object, then the base-axis object display section 108 shares a common physical display device (display screen) with a non base-object display section 107 (described hereinafter), with respect to displaying still pictures or text by the non base-object display section 107. However for simplicity of description these are indicated as separate system sections.

At periodic intervals, a timer event is generated by a timer event generating section 110. When this occurs, the synchronization processing section 106 determines the playing position of the base-axis object (i.e., the point which has been reached in the playing progression, for example the cumulative frame number count, if the base-axis object is a video object). Based on the playing position thus obtained, the synchronization processing section 106 refers to the internal data held in the internal data memory 103, to find if a non base-axis object is to be played at that time. If there is an object which is to be played at that point, the synchronization processing section 106 reads out the subject matter data of that object from the subject matter data storage apparatus 104 and supplies the data to the non base-axis object display section 107, to thereby present that monomedia object in a manner which is specified in the scenario.

This embodiment and the succeeding embodiments will each be described on the assumption that the base-axis object of a hypermedia title is a video object, i.e., that the apparatus is designed to play hypervideo titles. However the invention is not limited to that, and it would be equally possible to use an audio title (e.g., a continuous audio sound track) as the base-axis object, if suitable timing markers are embedded in the audio title.

The scenario is in the form of text, and is stored in a file. The scenario is written in Bakasnawaki format (BNF format), as shown in the example of FIG. 3.

Referring to FIG. 3, in section (a), the <title descriptor> specifies the hypermedia title name of the base-axis object.

In section (b) of FIG. 3, <object descriptor> specifies object-related presentation information, such as the display size with which a video picture, still picture or text item is to appear, the display screen position, etc.

In section (c) of FIG. 3, <subject matter descriptor> specifies subject matter information such as the name of a file (or files) in which the subject matter data of a monomedia object are held stored. Here, the term "subject matter data" signifies the actual data contents of a monomedia object (for example, data representing a still picture), as opposed to information which specifies how and when the object is to be played. The <synchronization trigger data> specifies synchronization processing information. The <processing time points> are the synchronization points, i.e., the processing time points at which the aforementioned synchronization processing is to be executed, which are defined along the axis of progression of playing the base-axis object, rather than points defined along a real time axis. In this embodiment, since the base-axis object is a video object, these processing time points are expressed as video frame numbers (i.e., corresponding to respective cumulative frame number count values which will be reached during playing of the base-axis object). The <processing contents> specifies a flag, whose ON or OFF state control the ON and OFF states of playing the monomedia object, respectively.

In section (d) of FIG. 3, the <synchronization trigger data> specifies that the monomedia object whose ID appears as <ID of object which is to be subjected to processing> is to be subjected to the processing which appears as <processing contents>, at the time (with respect to the progression axis of the base-axis object) which appears as <processing time point>. As mentioned above, the <processing contents> can be set as either ON or OFF, i.e., the processing can consist of starting the playing of that monomedia object, or terminating that playing. In the following, termination of playing a monomedia object will be referred to as deletion of the object.

In that way, link information is defined which connects specific frame numbers of the video clip which is the base-axis object to the respective presentation/deletion time points for each of the other monomedia objects of a hypervideo title.

As initial processing, before beginning playing of such a hypervideo title, the overall control and management section 101 of FIG. 1 first reads out the scenario data for that hypervideo title from the scenario data storage apparatus 102, and converts the scenario data contents to a data format which can be utilized by the synchronization processing section 106 during the playing progression. The resultant data (referred to in the following as the "internal data") are then stored in the internal data memory 103 (step 202 in FIG. 2). The configuration of the internal data is as shown in FIG. 4, and is as follows:

Section (a) of FIG. 4: "Title descriptor"

This contains information relating to the overall hypermedia title, including the title name, and the base-axis object. In the scenario file, this appears in the form shown in the example of FIG. 3.

Section (b) of FIG. 4: "Object descriptor"

This has an array configuration, consisting of a list of object IDs for each of the monomedia objects of the hypermedia title. Each object ID (which is specific to a particular monomedia object), consists of a numeric array. An object ID has the following constituent information. The subject matter ID consists of a number which identifies the subject matter of that monomedia object, to an apparatus such as the synchronization processing section 106. The "display position" and "display size" values define the position at which the monomedia object is to appear on a display screen, and the size with which it is to be displayed. The object descriptor contents appear in the scenario file in the form shown in section (b) of FIG. 3.

Section (c) of FIG. 4: "Subject matter descriptor"

This is a numeric array, which specifies respective subject matter IDs for the subject matter of the monomedia objects. These subject matter IDs are respective file names of the subject matter files. In the scenario file, the subject matter descriptor has the form shown in section (c) of FIG. 3.

Section (d) of FIG. 4: "Synchronization trigger data"

This consists of a plurality of sets of synchronization trigger data, the sets being listed successively and stored in successively numbered locations of the internal memory, with each set corresponding to a specific monomedia object and to a specific processing time point (i.e., along the progression axis of the base-axis object). If a plurality of processing operations have been assigned to one processing time point, then the highest-priority set of synchronization trigger data for that processing point contains a pointer to the memory storage location of the next-lower priority set of synchronization trigger data for that processing point, which if necessary may contain a pointer to the next-lower priority set, and so on. Each of these sets of synchronization trigger data contains the following information items:

The "processing time point". This is a time point, (with respect to the progression axis of the base-axis object) at which presentation/deletion processing of the monomedia object is to be executed, i.e., at which starting or ending of playing the object is to occur. In this embodiment, these time points are expressed as frame numbers of the video clip which constitutes the base-axis object.

The "object ID". This is the ID of the monomedia object, i.e., which is to be subjected to (presentation or deletion) processing.

The "processing contents". This specifies either ON or OFF states, respectively corresponding to starting or ending playing of the monomedia object having the specified "object ID".

The "pointer". This field either contains the null code, if only a single processing operation has been assigned to the processing point concerned, or information which points to the storage location of another of the synchronization trigger data sets (i.e., the synchronization trigger data for the next-lower priority operation), if two or more processing operations have been assigned to that processing time point. More specifically, when the scenario specifies two or more ON/OFF processing operations to be executed at the same time point, then as described hereinafter these are assigned respective priorities, and executed successively. In that case, a synchronization trigger data set can point to the next set of synchronization trigger data which is to be processed after the processing operation of the first set is completed. That next set, in turn, may point to another synchronization trigger data set, as illustrated in for the synchronization trigger data set that is listed for the third processing time point, shown in section (d) of FIG. 4.

Section (d) of FIG. 3 illustrates how one of these sets of synchronization trigger data appears in the scenario file.

The sets of synchronization trigger data are stored in successively numbered memory locations in order of increasing value of processing time point, i.e., in order of occurrence along the progression axis of the base-axis object. With this embodiment, this signifies "in order of increasing values of video frame number".

Figure 5:
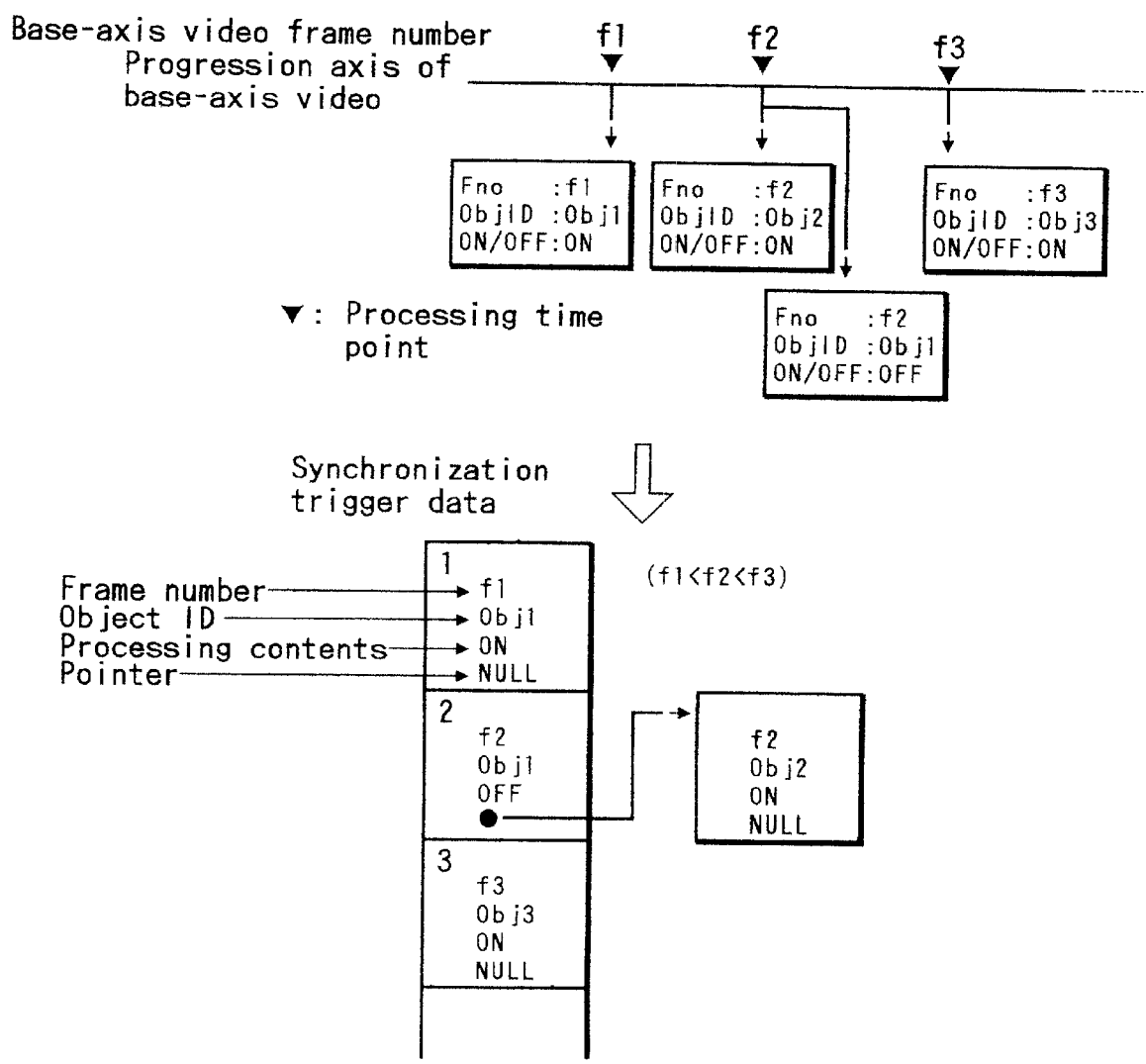
FIG. 5 is a diagram for illustrating the relationship between processing time points determined for processing operations on respective monomedia objects, and respectively corresponding sets of synchronization trigger data which are created and stored in the internal data memory of the first embodiment.

With this embodiment, to ensure smooth playing of the hypervideo title, when two or more processing operations have been assigned to the same time point, OFF (deletion) processing of a monomedia object is assigned a higher priority than ON (presentation) processing. Thus for example in FIG. 5, at the point defined by frame number f2 along the progression axis of the video base-axis object, the monomedia object having the ID Obj2 is to begin to be played (ON processing) and the monomedia object having the ID Obj1 is to be deleted (OFF processing), i.e., its presentation is to be terminated. As shown, the OFF processing is assigned priority, and executed first.

That is also illustrated, for the internal data, in section (d) of FIG. 4. In that example, three processing operations have been assigned to the third processing time point.

Figure 2:
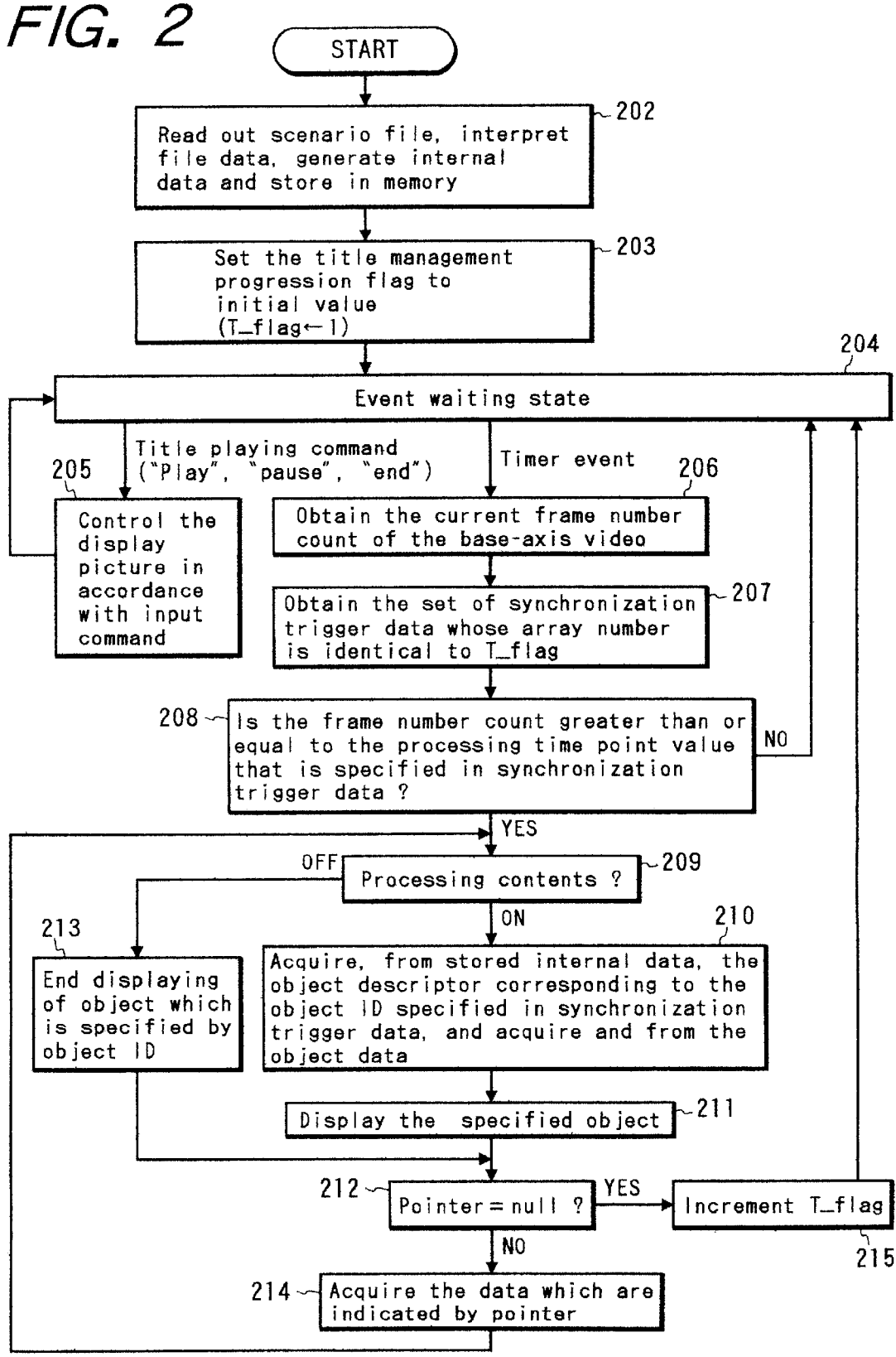
FIG. 2 is a flow diagram showing the overall operation of the first embodiment.

The overall control and management section 101 then resets the frame counter of the base-axis object display section 108 to an initial value of zero, and also sets the counter which is referred to herein as the title progression management flag T_flag to an initial value of 1 and stores that value in the title progression management flag memory 105 (step 203 in FIG. 2).

Figure 6:
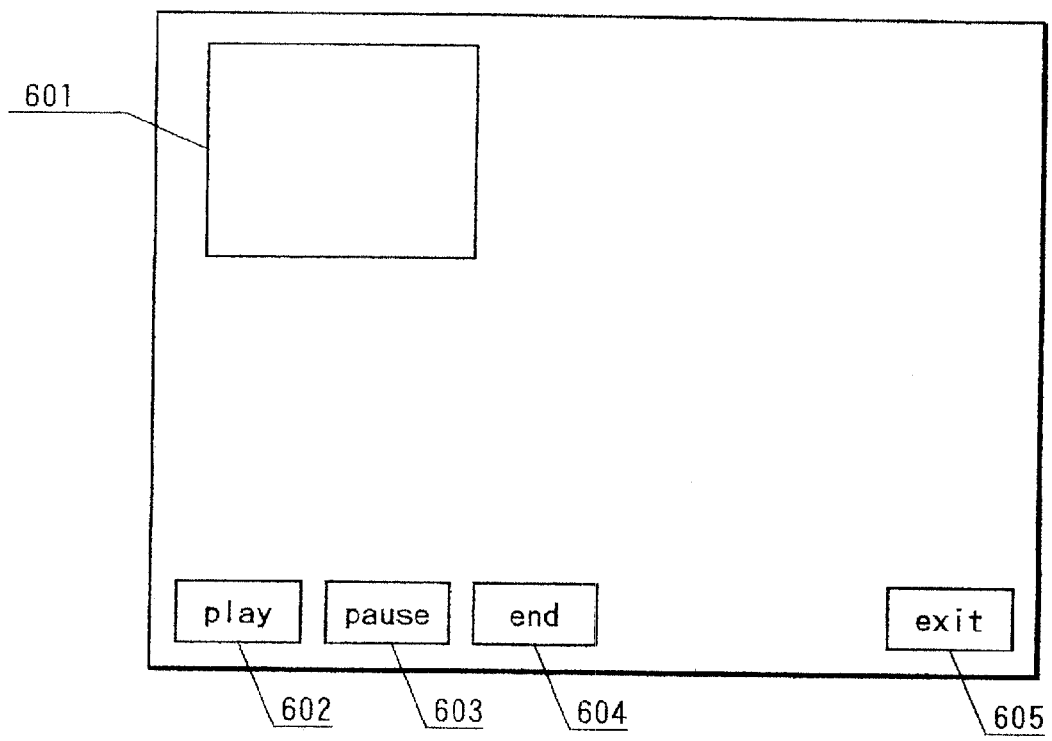
FIGS. 6, 7 show examples of display pictures generated with the first embodiment.
Figure 7:
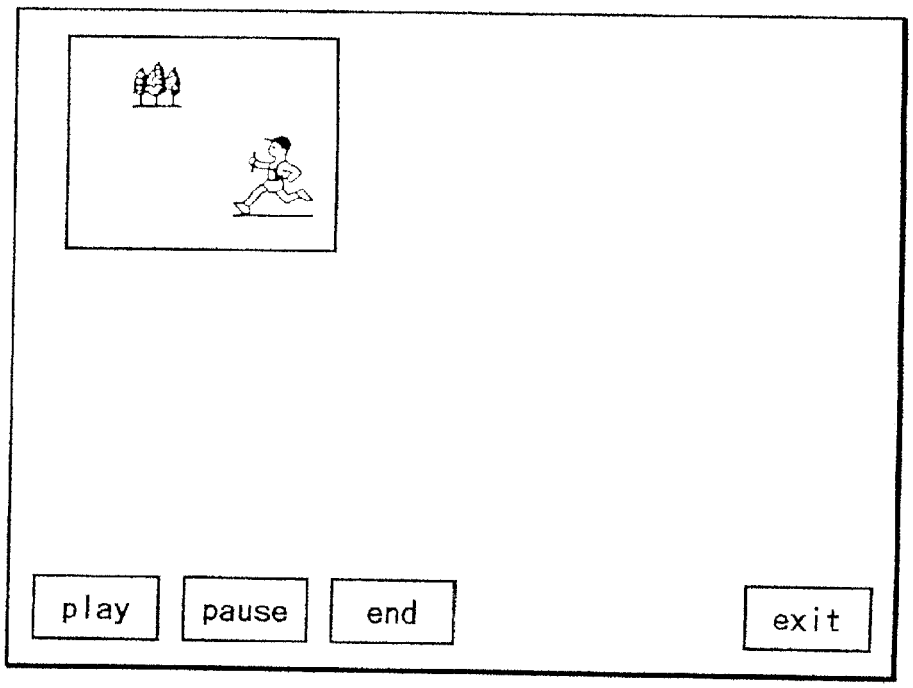

After completing the above initial processing, the overall control and management section 101 enters the event waiting condition (step 204 in FIG. 2). The display state at this time is as shown in FIG. 6, in which 601 denotes a display window within which a video picture can be generated by the base-axis object display section 108, but which at this time is empty. 602, 603 and 604 are respective "play", "pause" and "stop" display buttons i.e., which can be activated in the usual manner by shifting a display cursor to the position of a button, and "clicking" on that position, using an input device such as a mouse, to thereby input corresponding "play", "pause" and "stop" commands, and thereby control playing of a hypermedia title. These buttons constitute the title playing command input section 109 of FIG. 1. If any of these buttons is activated, then the next time that timer event generation occurs, the overall control and management section 101 implements video control (step 205 in FIG. 2) in accordance with the command that has thus being input, with the result of that control appearing as a display picture produced by the base-axis object display section 108. For example with the example of FIG. 6, if the "play" button has been activated, then the playing condition is started, and a display picture such as shown in the example of FIG. 7 is produced in the window 601. That display picture is formed of successively played frames of the video which is the base-axis object, in this embodiment. That is to say, when the "play" button is activated, playing of the base-axis object is started, and thereafter whenever a timer event is generated, the set of steps 206, 207, etc. shown in FIG. 2 is entered, from step 204. Each time this occurs, the processing which is then executed is determined based upon the current count of frame numbers of the video which is the base-axis object.

Specifically, the timer event generating section 110 executes timer event generation at regular intervals, and whenever a timer event is generated, the overall control and management section 101 passes control to the synchronization processing section 106. Assuming that the "play" button has been activated previously, the synchronization processing section 106 then acquires the video frame number count at that time point (i.e., the frame number which has been reached during progression of playing the base-axis object) from the base-axis object display section 108 (step 206 in FIG. 2).

Next, the synchronization processing section 106 acquires the set of synchronization trigger data corresponding to that frame number, from the internal data held in the internal data memory 103. As shown in FIG. 4, the sets of synchronization trigger data are stored in order of increasing processing time point positions (in this example, increasing video frame numbers). When a timer event generation occurs, and playing of the base-axis object is in progress, then the value of the title progression management flag T_flag determines the processing operation (if any) which will then be executed, i.e., determines which of the sets of synchronization trigger data will be read out from memory (in step 207 of FIG. 2). For example referring to section (d) of FIG. 4, when playing of the base-axis object is started as a result of the "play" button being activated, then when the next timer event is generated, since the title progression management flag T_flag has been initially set to the value 1, the first of the sequentially stored sets of synchronization trigger data will be acquired and used. Since the title progression management flag T_flag is then incremented (in step 215 of FIG. 2), if a playing-related command were then to be input before the next timer event is generate, the second of the sequentially stored sets of synchronization trigger data would be acquired and used when that next timer event occurs, and so on.

Following step 207 in FIG. 2, the synchronization processing section 106 compares the processing time point (i.e., which expresses a frame number count value) that is expressed by the acquired synchronization trigger data set with the elapsed frame number count of the base-axis object (step 208 in FIG. 2). If these are identical (i.e. a time point has been reached at which a processing operation is to be performed) or if the elapsed frame number count is the larger of the two values (i.e., a time point at which a processing operation is to be performed has been passed), then processing specified by that synchronization trigger data set is executed. The reason for this is apparent from the example of section (a) of FIG. 8, which illustrates that a processing point will in general fall between two successive timer events (i.e., two points which lie on the real-time axis).

It can thus be understood that there may be a certain amount of deviation between the point at which a processing operation is specified to be performed and the real time point at which the processing operation actually occurs. However since the timer events are generated, with this embodiment, at 10 msec intervals, the maximum amount of deviation of the processing points will be no greater than 10 msecs. Hence, there will be no significant adverse effects upon playing of the hypermedia title.

This embodiment utilizes the MPEG1 video data compression/encoding standard, and the frames are played at a rate of approximately 1 frame/30 msec. Since the timer event interval is 10 msecs, as shown in the example of section (d) of FIG. 8, two successive processing points cannot occur between two successive timer events.

The synchronization processing is executed by the synchronization processing section 106 as follows. If the processing contents of the acquired synchronization trigger data set are found to be ON in step 209 of FIG. 2 (i.e., presentation of the monomedia object concerned is to be started), then the contents of the "object ID" part of the object identifier are acquired. As shown in FIG. 4, that information includes the ID for the subject matter data of that monomedia object, and that subject matter ID is then used to obtain, from the subject matter descriptor, the name of the file in which the subject matter data are stored. The subject matter data of the monomedia object are thereby read out from the subject matter data storage apparatus 104, converted to suitable form for playing (e.g., display) by the non base-axis object display section 107 (step 210 in FIG. 2), and then supplied to the non base-axis object display section 107 to be played (step 211 in FIG. 2).

Figure 9:
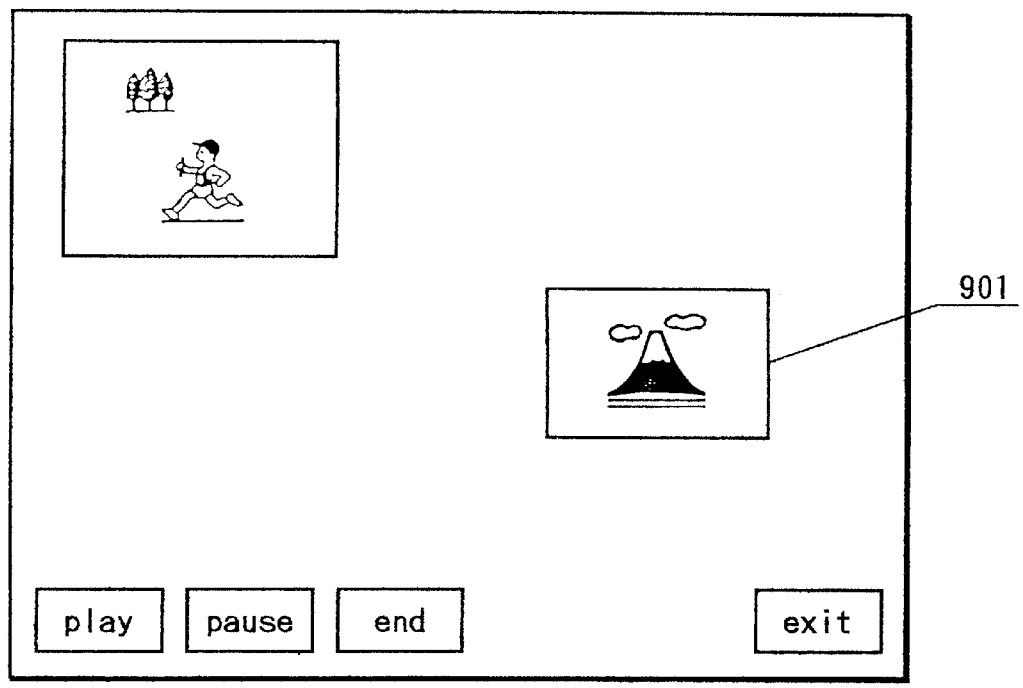
FIGS. 9 and 10 show examples of display pictures generated with the first embodiment, for the cases in which a still picture monomedia object is displayed and is deleted, respectively.

Assuming that this monomedia object is a still picture, then the resultant display screen at that time might be as shown in the example of FIG. 9, showing the displayed still picture 901.

Figure 10:
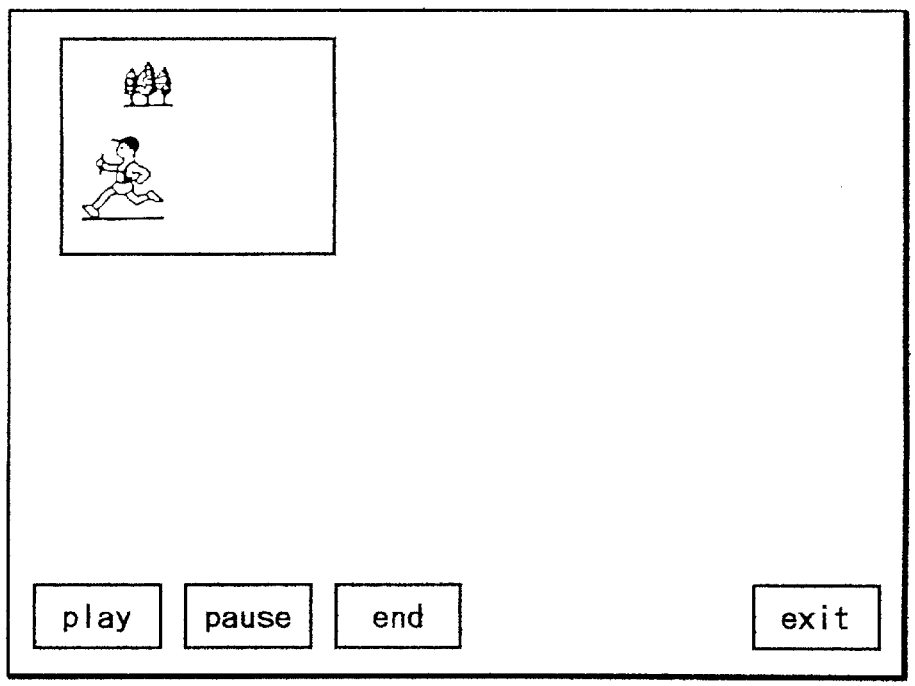

However if it is found in step 209 that the processing contents are OFF, so that playing of the specified monomedia object is to be ended, then processing is executed to delete that monomedia object from the display (step 213 in FIG. 2). The display condition will then be as shown in FIG. 10.

If the "pointer" field of the aforementioned synchronization trigger data set contains information other than the null code, then the synchronization trigger data set whose storage location is indicated by the pointer information is acquired (step 214 in FIG. 2), and the processing sequence of steps 209 to 214 in FIG. 2 is then repeated.

Upon completion of all of the processing operations which have been specified for a processing point, in that manner, the synchronization processing section 106 increments the value of the title progression management flag T_flag (step 215 in FIG. 2).

From the above description of the first embodiment, it can be understood that with the present invention, a finite time monomedia object (such as a video clip) is used to define a base timing axis for a hypermedia title, with playing of that hypermedia title being synchronized with playing of that monomedia object rather than being synchronized with points lying along the real time axis. As a result, synchronization is maintained irrespective of the playing environment in which that finite time monomedia object is played.

A second embodiment of the invention will be described in the following, referring first to the general system block diagram of FIG. 11. This embodiment also plays hypervideo titles, as for the first embodiment. Firstly, the basic operating principles of the multimedia playing apparatus shown in FIG. 11 will be described. As initial processing, executed before playing of a hypervideo title can begin, the processing as which has been described above for the first embodiment is first executed, i.e., processing corresponding to steps 202, 203 of FIG. 2. However with this embodiment, as an additionional part of the initial processing, the respective subject matter data for each of the non base-axis objects of the hypervideo title are read out from the subject matter data storage apparatus 104, converted to suitable form for presentation by the non base-axis object display section 107, and stored temporarily in a non base-axis object data memory 1102. After completion of this initial processing, the same processing steps as described for the first embodiment are executed, with respect to input commands such as a "play" command, and timer events. However the operation of the synchronization processing section 1103 of this embodiment differs from that of the synchronization processing section 106 of the first embodiment with respect to playing of a non base-axis object, in that with the second embodiment, data expressing the object are supplied directly to the non base-axis object display section 107 to be played.

Thus, the second embodiment differs from the first embodiment in that, with the second embodiment, the data for all of the non base-axis objects of a hypermedia title are converted beforehand to data of suitable form for presentation, and stored in the non base-axis object data memory 1102.

Figure 11:
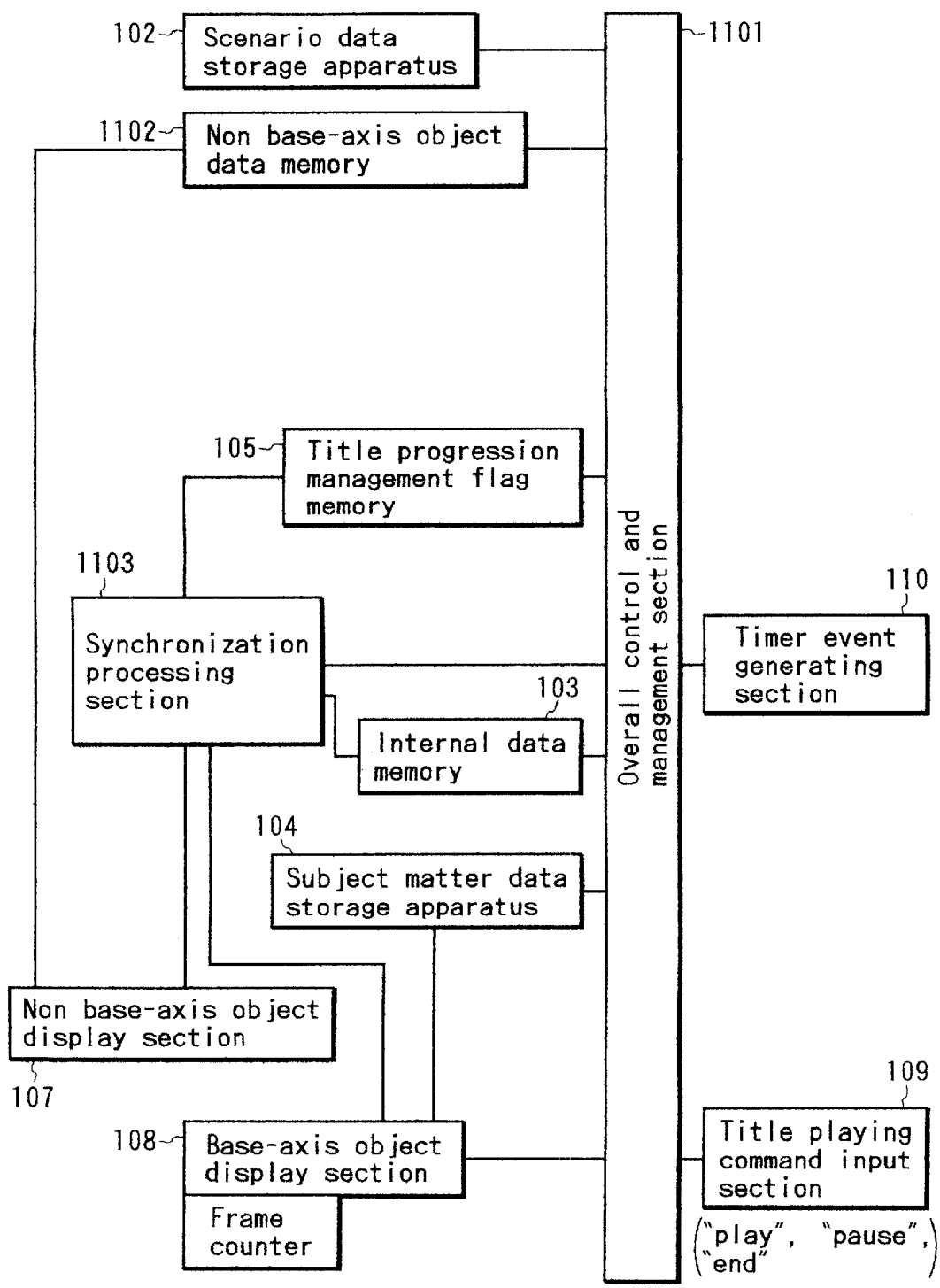
FIG. 11 is a general system block diagram of a second embodiment of a multimedia playing apparatus according to the present invention.

In FIG. 11, system blocks which are identical in function to blocks shown in FIG. 1 are designated by corresponding reference numerals, and detailed description of these will be omitted. 1101 denotes the overall control and management section, which controls and manages the overall operation of the apparatus. 1102 denotes an object data memory section, as mentioned above. 1103 denotes a synchronization processing section, which controls non base-axis objects in a manner which is matched to the playing progression of the base-axis object.

Figure 12:
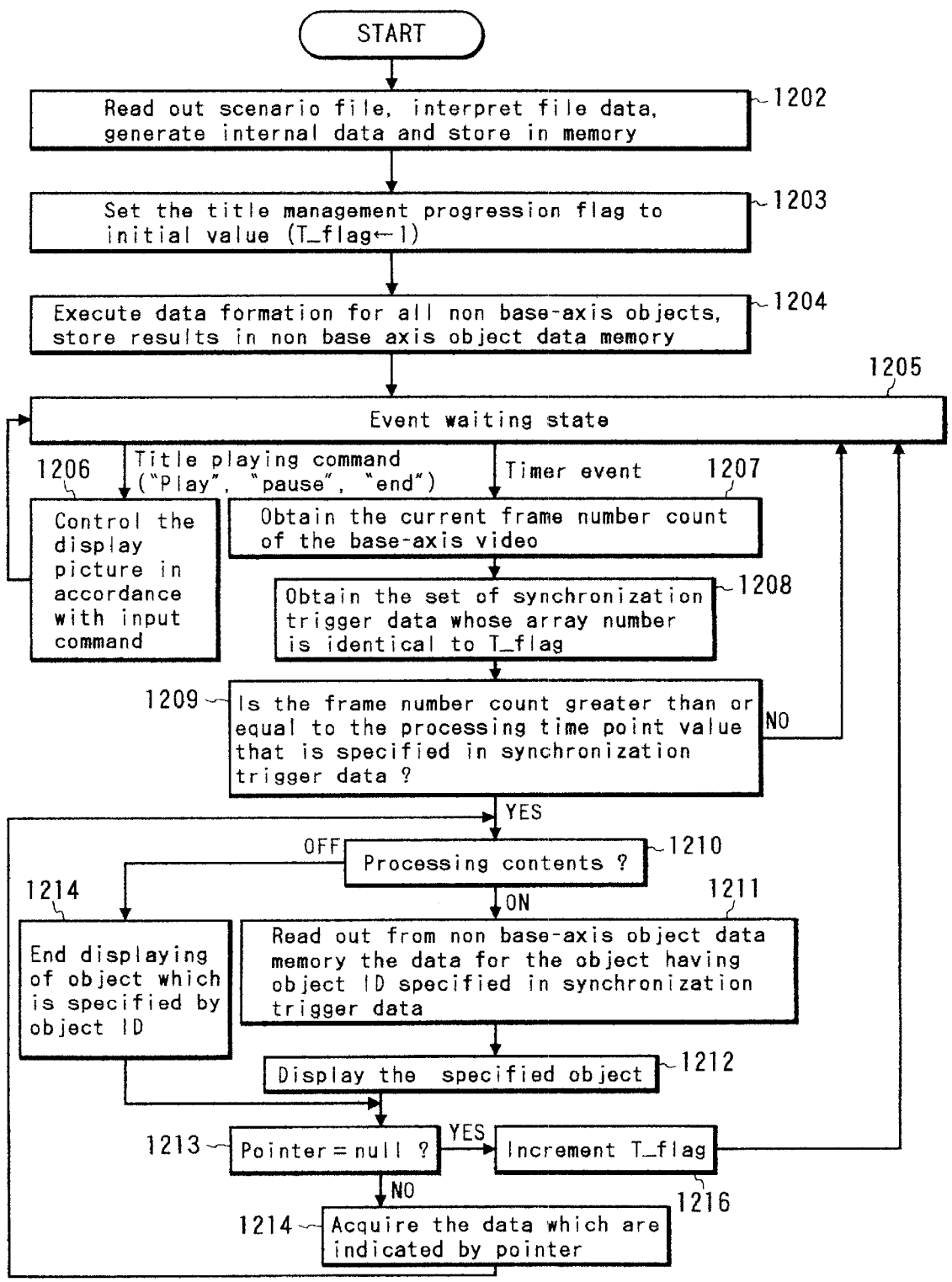
FIG. 12 is a flow diagram showing the overall operation of the second embodiment.

The operation of this embodiment will be described referring to FIG. 11 and the operation flow chart of FIG. 12. In FIG. 11, the overall control and management section 1101 executes the same processing as the overall control and management section 101 of FIG. 1 during the first part of the initial processing (steps 1202, 1203 in FIG. 12). However after step 1203, the overall control and management section 1101 refers to the internal data which have been generated in steps 1202, 1203 as described above for the first embodiment, and examins the object descriptor data, to obtain the respective object IDs of the non base-axis objects of the hypermedia title (illustrated in FIG. 4), then obtains from these the storage locations (file names, or file name+ directory path information) at which the respective subject matter data of these non base-axis objects are stored in the subject matter data storage apparatus 104. The overall control and management section 1101 then reads out the data from these files, to convert the data of respective non base-axis objects to suitable form for presentation, and stores the resultant data in the non base-axis object data memory 1102 (step 1204 in FIG. 12).

For brevity of description in the following, the operation "converting the original data of a non base-axis object into suitable form for presentation by the non base-axis object display section 107" will be referred to simply as the "formation" of the non base-axis object data.

After completing the initial processing, the overall control and management section 1101 enters the timer event waiting state, in the same way as the overall control and management section 101 of FIG. 1 described above. If a "play" input command is then supplied from the title playing command input section 109, the overall control and management section 1101 functions thereafter in accordance with occurrences of timer events generated by the timer event generating section 110, in a similar manner to that of the first embodiment, i.e., when a timer event is generated, control is passed to the synchronization processing section 1103. When that occurs, the synchronization processing section 1103 first executes similar processing to that of the embodiment of FIG. 1 (steps 1207 to 1210). However there is the point of difference that in step 1211 of FIG. 12, when the ID of a monomedia object is obtained and it is found that playing of that object is to be started, the synchronization processing-section 1103 does not then read out the subject matter data file of that monomedia object from an auxiliary storage device. Instead, the data for that object, which have been formed beforehand as described above, i.e., converted beforehand into a form suitable for use by the non base-axis object display section 107, are read out from the non base-axis object data memory 1102 (step 1211 of FIG. 12) and supplied to the non base-axis object display section 107 to be played (step 1212 of FIG. 12).

Thus with this embodiment, data of all of the non base-axis objects are read out at the time of start-up, and stored in a memory apparatus which has a substantially higher access speed than an auxiliary data storage device such as a hard disk apparatus. When one of these monomedia objects is to be played, e.g., displayed, then the corresponding data are read out from memory and directly displayed by the display apparatus. Hence, it becomes unnecessary to execute the aforementioned data formation processing each time that a monomedia object is to be played, so that a high speed of presentation of monomedia objects can be realized, and smooth playing of the hypermedia title can be achieved.

A third embodiment of the invention will be described referring first to the general system block diagram of FIG. 13. The basic principles of operation of this multimedia playing apparatus will first be described. The first part of the initial processing is identical to that of the preceding embodiment of FIG. 11. However with the third embodiment, a hypermedia title which is to be played is considered to be divided into a number of segments. During the initial processing, respective sets of data, which will be referred to as object presentation status management data, are generated for each of these segments. The object presentation status management data are generated in accordance with the internal data which has been derived during the first part of the initial processing (as described for the preceding embodiments), and are then stored in the object presentation status management data memory 1302 shown in FIG. 13. After completing the initial processing, the system will respond to input commands (i.e., beginning with a "play" input command) and to timer events in basically the same way as described for the second embodiment. However in addition, with the third embodiment, control of shifting the playing position with respect to the progression axis of the base-axis object (i.e., to move to a specific point along that axis and then institute presentation of the hypermedia title) is made possible, in response to input commands supplied from a title control command input section 1304. Playing of the base-axis object by the base-axis object display section 108, is then started from that point. At the same time, the playing status restoration processing section 1303 acquires from the object presentation status management data memory 1302 the object presentation status management data for the segment which corresponds to that point on the progression axis of the base-axis object, and thereby obtains the presentation status of non base-axis objects with respect to that point, i.e., determines whether presentation of one or more non base-axis objects should be occurring at that point. If so, that presentation is started, via the non base-axis object display section 107.

More specifically, the third embodiment differs from the second embodiment described above with respect to the following points:

(a) A hypermedia title (which will be assumed in the following to be a hypervideo title) is divided into segments, and for each of these segments, a set of object presentation status management data are generated and stored, with the data specifying which monomedia object (or monomedia objects), if any, is in the presentation status within that segment. An object presentation status management data memory 1302 is provided, for storing the object presentation status management data. A playing status restoration processing section 1303 is provided, for referring to the object presentation status management data when a shift in playing position (to a new point along the progression axis of the base-axis object) is to be executed, and then setting the playing status to that of the hypervideo title segment which corresponds to that point. A title control command input section 1304 is provided, for inputting commands from a user, to specify that the playing position is to be moved to such a new point.

Thus, this embodiment basically differs from the preceding embodiments in that it becomes possible for a user, while a hypermedia title presentation is in progress, to shift to a new playing position within that hypermedia title.

Figure 13:
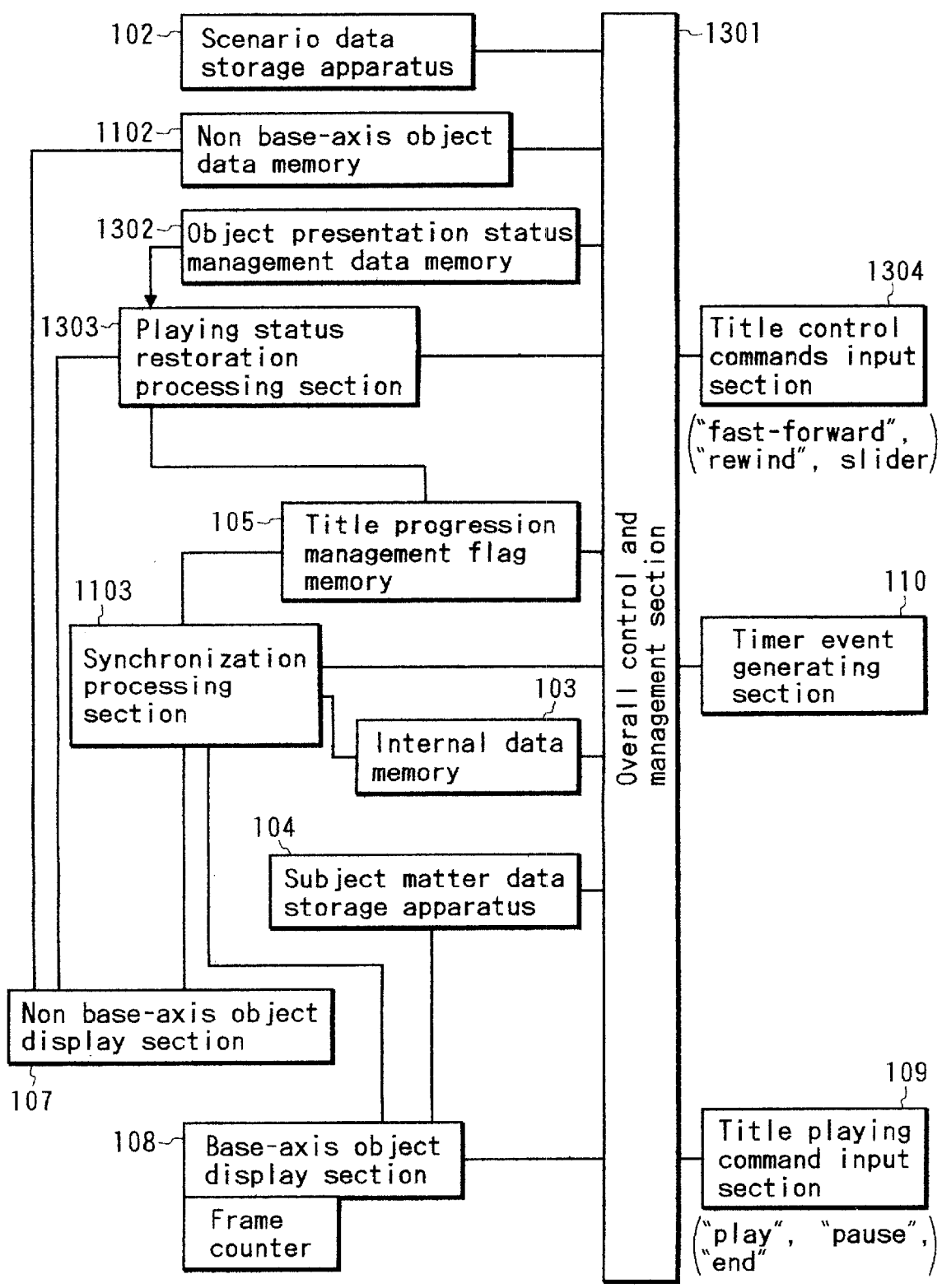
FIG. 13 is a general system block diagram of a third embodiment of a multimedia playing apparatus according to the present invention.

In FIG. 13, system blocks which are identical in function to system blocks of the preceding embodiments are designated by corresponding reference numerals, and detailed description of these will be omitted. The operation of this embodiment will be described referring to FIG. 13 and to the flow diagram of FIG. 14. It will again be assumed that this embodiment is designed to play hypervideo titles, i.e., in which the base-axis object is a video clip. In FIG. 13, the overall control and management section 1301 first executes similar initial processing operation steps to those executed by the overall control and management section 1101 of FIG. 11 (steps 1102 to 1104 in FIG. 14). However as a final step in this initial processing, the overall control and management section 1301 refers to the synchronization trigger data held in the internal data memory 103, to generate object presentation status management data, and stores these data in a object presentation status management data memory 1302. The object presentation status management data memory 1302 is a computer memory, having relatively high access speed. (step 1105 in FIG. 14).

Figure 15:
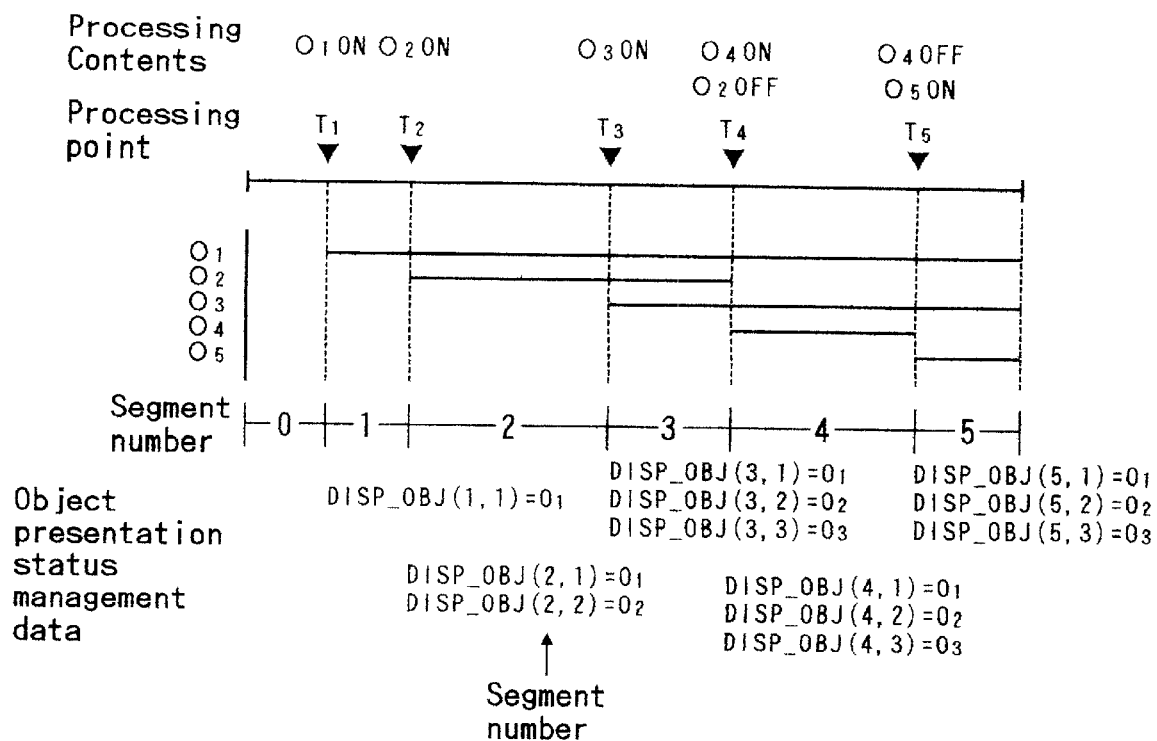
FIG. 15 is a conceptual diagram for illustrating the principles of generating object presentation status management data, with the third embodiment.

FIG. 15 illustrates the method of generating the object presentation status management data. These data are configured in the form of a 2-dimensional numeric array. In FIG. 15, the points indicated as points T1, T2, etc., are the aforementioned processing time points (synchronizing points) which are defined along the progression axis of the base-axis object, i.e., (in the case of a base-axis object which is a video clip) points defined by respective counts of elapsed frame numbers during playing of the base-axis object. The aforementioned segments of the hypermedia title are respectively defined between successive processing time points, and numbered accordingly, e.g., segment 1 is defined between the first two processing time points (T1 and T2) which occur along the playing progression axis. In the object presentation status management data, a monomedia object which is to be played for the duration of the n-th segment is identified as:

DISP_OBJ [n, m]

where m is a positive integer, which takes values that increase successively from 1. That is to say, if a plurality of monomedia objects are assigned to be played during the same segment, these IDs take respectively increasing values of m.

In FIG. 15, since only the monomedia object O1 is to be played within segment 1, from T1 to T2, the object presentation status management data for that segment is:

DISP_OBJ [1, 1]=O1

Similarly, since monomedia objects O1, O2 are to be played during segment 2, from T2 to T3, for that segment:

DISP_OBJ [2, 1]=O1

DISP_OBJ [2, 2]=O2

And, similarly for succeeding segments 3, 4 and 5:

DISP_OBJ [3, x]=Ox (x: 1, 2, 3)

DISP_OBJ [4, y]=Oy (y: 1, 2, 3)

DISP_OBJ [5, z]=Oz (z: 1, 2, 3)

Figure 14A:
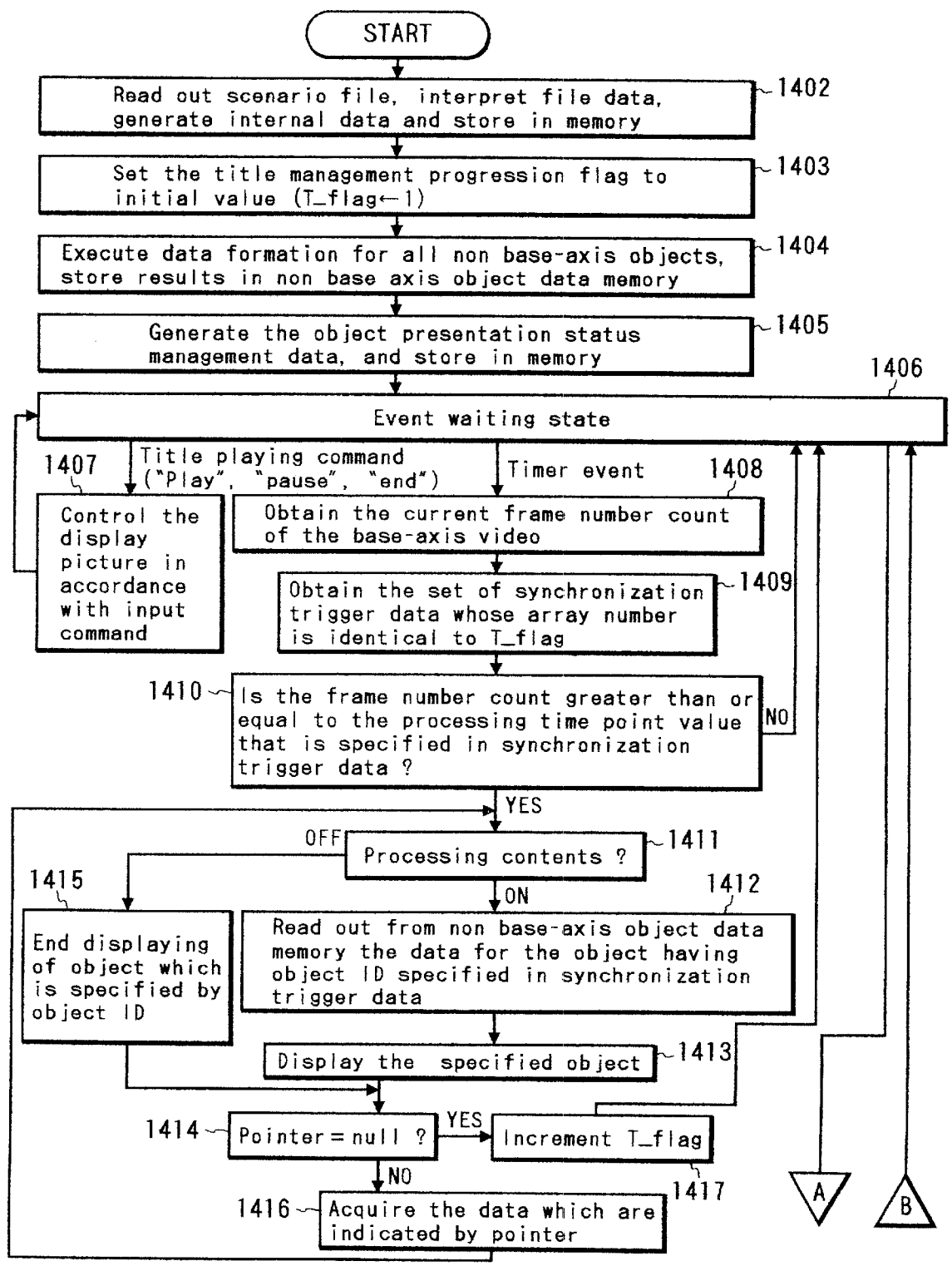
FIGS. 14A, 14B constitute a flow diagram showing the overall operation of the third embodiment.
Figure 14B:
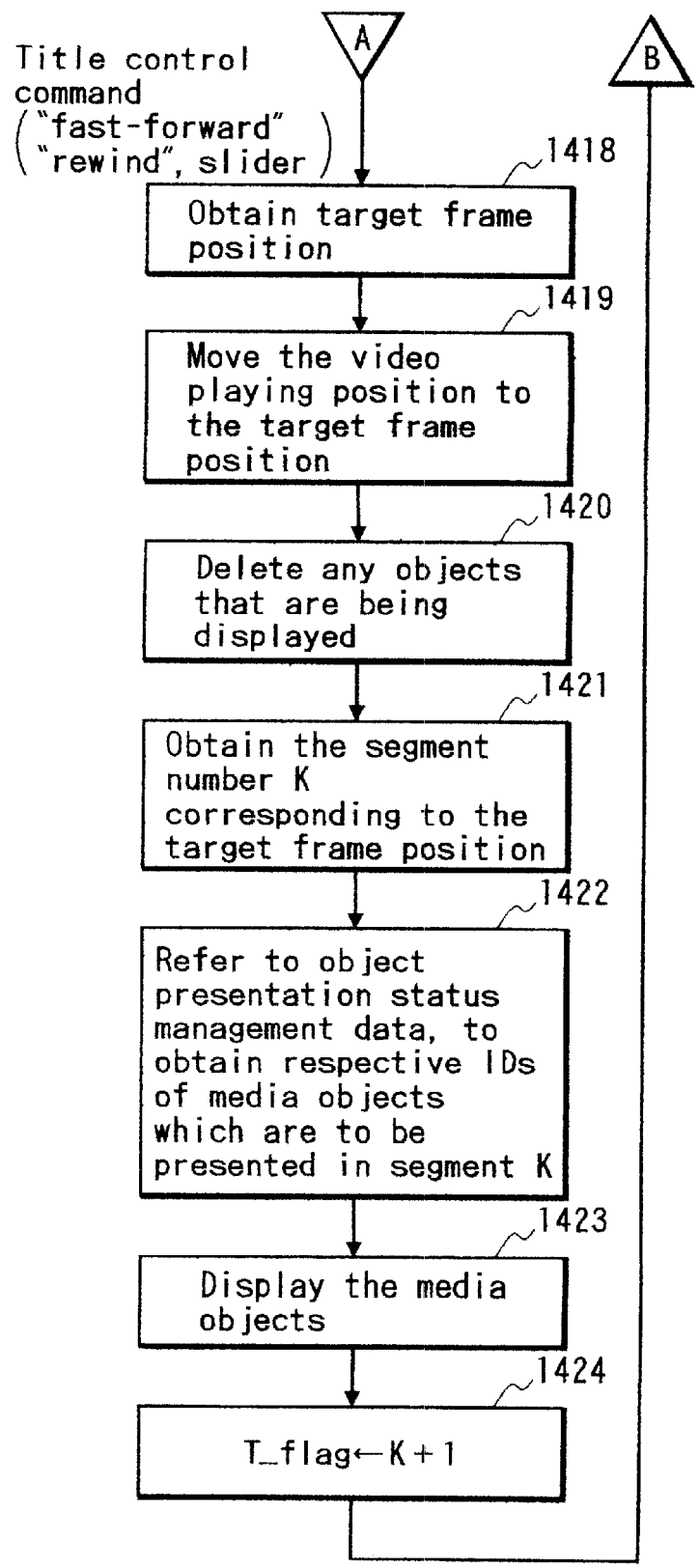
Figure 16:
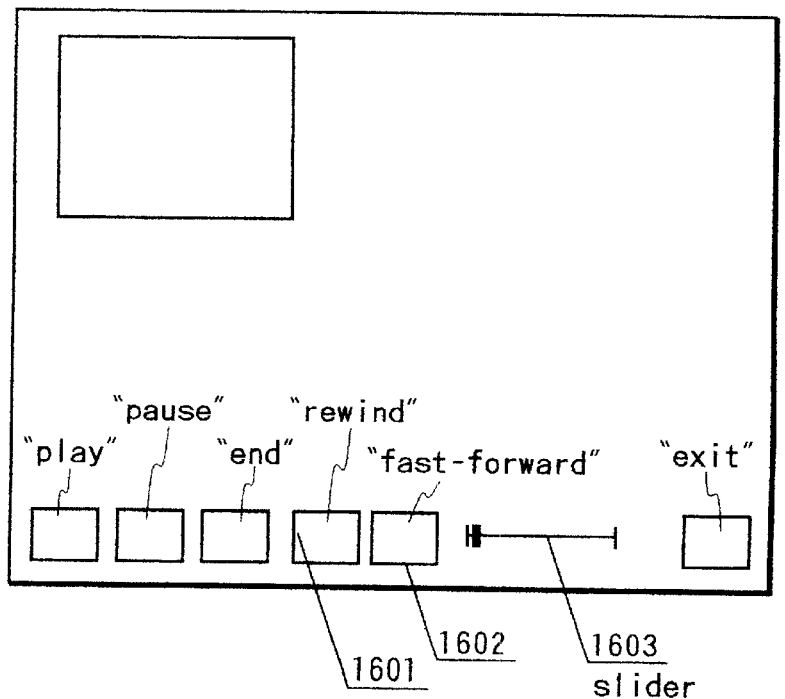
FIG. 16 shows an example of a display picture produced with the third embodiment.

After completing this initial processing, i.e., completing step 1405 of FIG. 14, the overall control and management section 1301 enters the waiting state. The display condition in that state is illustrated in FIG. 16. In FIG. 16, 1601, 1602 and 1603 respectively designated "rewind" and "fast forward" buttons, and a slider, which constitute the title control command input section 1304. When a command is input from the title playing command input section 109 or a timer event is generated by the timer event generating section 110, the overall control and management section 1101 executes similar processing to that described for the preceding embodiment (steps 1407 to 1417 of FIG. 14).

However if a command is input as a result of activating any of the "rewind" or "fast forward" buttons, or the slider, which constitute the title control command input section 1304, then such a command has the effect of designating that the playing position is to be shifted along the axis of progression of the base-axis object, either forward or backward, by a specific amount. In this embodiment, that amount is expressed as a specific number of video frames. (If the user maintains a "rewind" or "fast forward" button in the activated condition, then that specific amount will be successively incremented, however that point need not be considered in this description). When such a command input occurs, the overall control and management section 1301 calculates the frame number of the (base-axis object) video frame which immediately precedes the frame to which the playing position should be shifted (1418 of FIG. 14), then uses the base-axis object display section 108 to implement a shift of the playing position to that frame number (1419 of FIG. 14).

Figure 17:
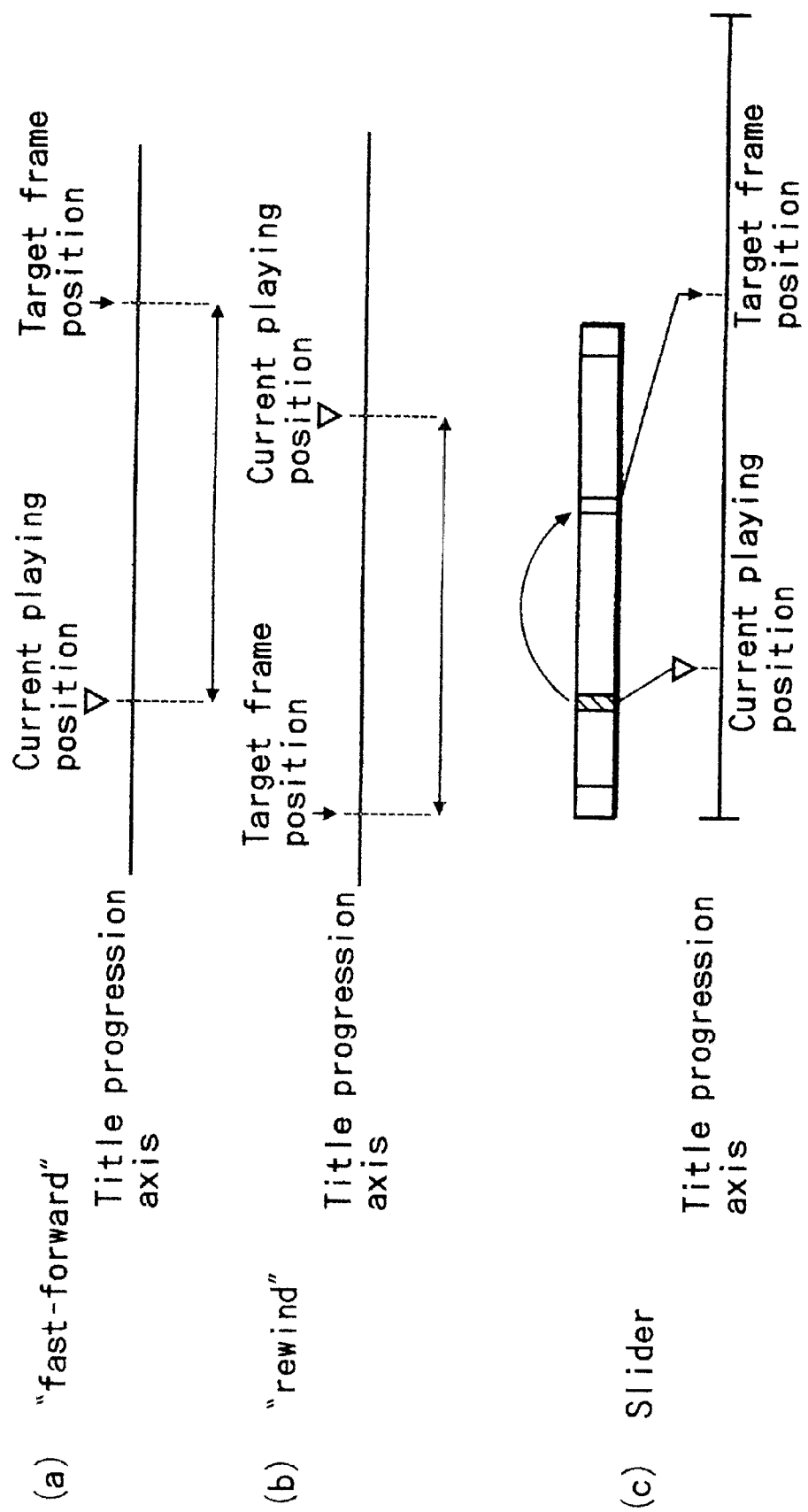
FIG. 17 is a conceptual diagram for illustrating how a target frame position is determined, with the third embodiment.

In the following, the aforementioned frame number which immediately precedes the frame number to which the playing position is to be shifted will be referred to as the target frame position. If the fast-forward button is activated, then the playing position is shifted forward from the current position, by the required number of frames, to the target frame position. This is illustrated in section (a) of FIG. 17. If the "rewind" button is activated, then the playing position is shifted backward from the current position, by the required number of frames, to the target frame position. This is illustrated in section (b) of FIG. 17. If the slider position is changed, then the number of frames between the current playing position and the position corresponding to the slider position is calculated, and a shift is then made to the target frame number. This is illustrated in section (c) of FIG. 17.

When the playing position has been moved to the point specified by the input command, the overall control and management section 1301 transfers control to the playing status restoration processing section 1303, which then deletes all of the monomedia objects which were currently being played (step 1420 in FIG. 14), and then acquires the synchronization trigger data set for that playing position, from the internal data memory 103, to thereby obtain the segment number K corresponding to the target frame position (i.e., the number of the segment which contains the target frame) (step 1420 in FIG. 14).

Specifically, the required segment number K corresponding to the target frame is a number which satisifies the following condition, assuming that the processing time points are expressed as respective frame numbers: Processing time point of synchronization trigger data set K<target frame number<synchronization trigger data set (K+1)

The playing status restoration processing section 1303 then accesses the object presentation status management data held in the object presentation status management data memory 1302, to obtain the ID of each non base-axis monomedia object which is to be played within segment K (step 1422 in FIG. 14), then reads out the data expressing that object (or each of the objects) from the non base-axis object data memory 1102 and supplies the data to the non base-axis object display section 107, to be played (step 1423 in FIG. 14).

After completing this processing, the playing status restoration processing section 1303 sets the title progression management flag T_flag to the value (K+1) (step 1424 in FIG. 14).

Thus as described, with this embodiment, a hypermedia title is considered to consist of a plurality of segments, with the segments being managed respectively separately, with respect to monomedia object presentation status. Hence, the playing status at any arbitrary playing position during presentation of a hypermedia title can be immediately determined, thereby enabling operations for shifting the playing position (e.g., "fast forward" or "rewind" operations) to be implemented.

Figure 18:
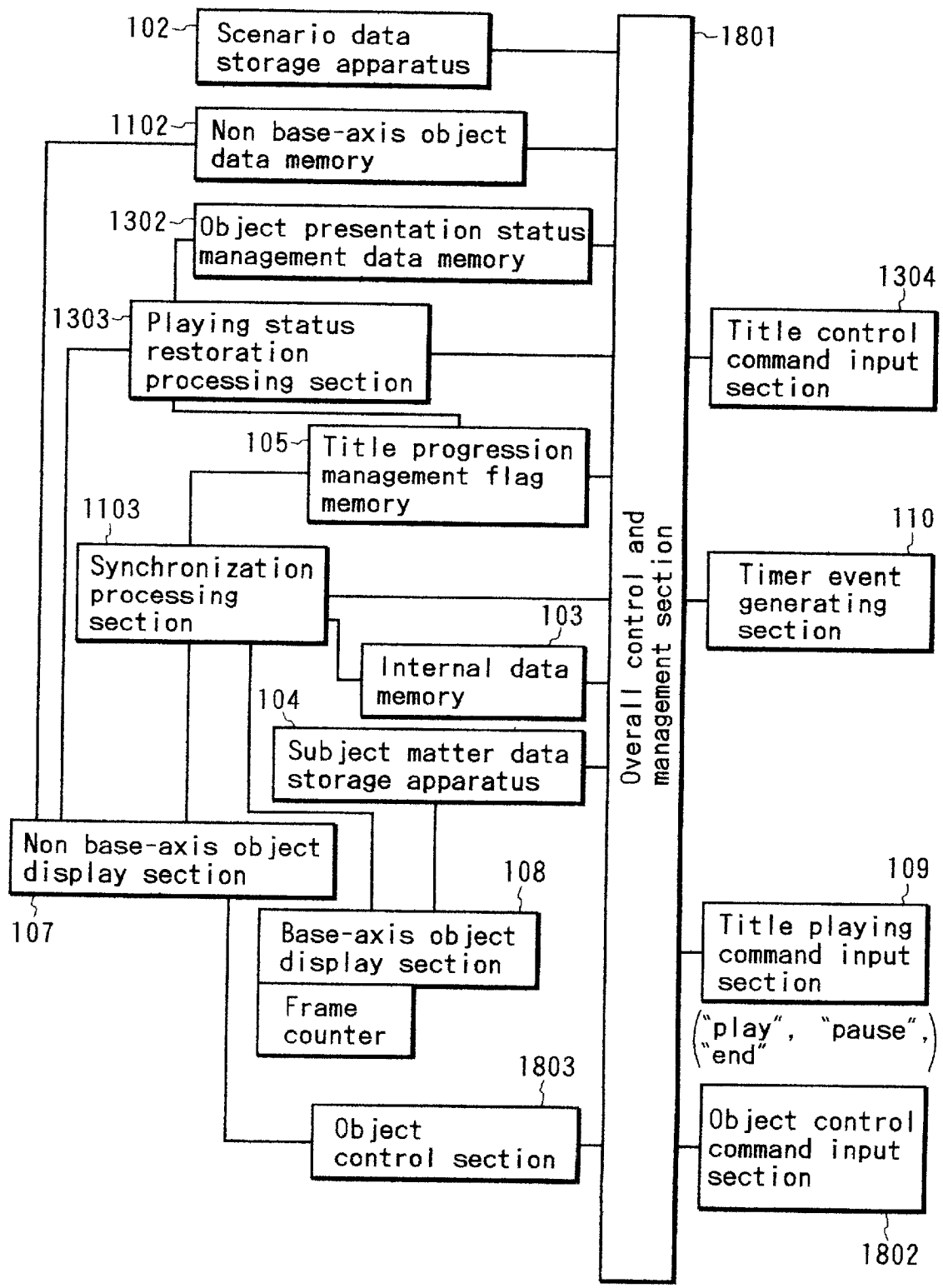
FIG. 18 is a general system block diagram of a fourth embodiment of a multimedia playing apparatus according to the present invention.

A fourth embodiment will be described referring to the general system block diagram of FIG. 18. Firstly, the basic operation of the multimedia playing apparatus shown in FIG. 18 will be described. During the initial processing, similar processing to that of FIG. 13 is executed, however in addition, data which are necessary for user adaptation are generated, and stored in the object presentation status management data memory 1302. After completing the initial processing, similar processing to that of FIG. 13 is executed, with respect to input commands and timer events. However with this embodiment, the overall control and management section 1801 can vary the presentation of the monomedia objects via the non base-axis object display section 107 in accordance with user-mediated commands which are input from the object control section 1802.

More specifically, this embodiment differs from the third embodiment described above with respect to the following points. The fourth embodiment is provided with an object control command input section 1802, whereby a user can input user-mediated operating commands, and an object control section 1803 for controlling the presentation attributes of a monomedia object in accordance with the contents of input commands, thereby enabling user-mediated operations to be performed without obstructing the playing of a hypermedia title, while playing of a hypermedia title is in progress.

In describing the operation of this embodiment, it will be assumed that a user-mediated command is provided whereby the display size of a monomedia object (e.g. a video, still picture or text object) can be varied under the control of the user. Control is preferably executed such that when a command is input to specify that the display size of a text object (i.e., the size of the window in which the object appears) is to be expanded, then the font size of the displayed text is also changed.

The operation will be described referring to FIG. 18 in conjunction with the operating flow diagram of FIG. 19 for this embodiment. In FIG. 18, the overall control and management section 1801 performs the substantially the same processing as the overall control and management section 1301 of the embodiment of FIG. 13 during most of the steps of the initial processing (steps 1902, 1903, 1905 in FIG. 19). However when a non base-axis object is formed (i.e., the data are converted to suitable form for supplying to the non base-axis object display section 107), data whereby that object can be displayed in expanded size are also formed, and stored in the non base-axis object data memory 1102 (step 1904 in FIG. 19).

Figure 19A:
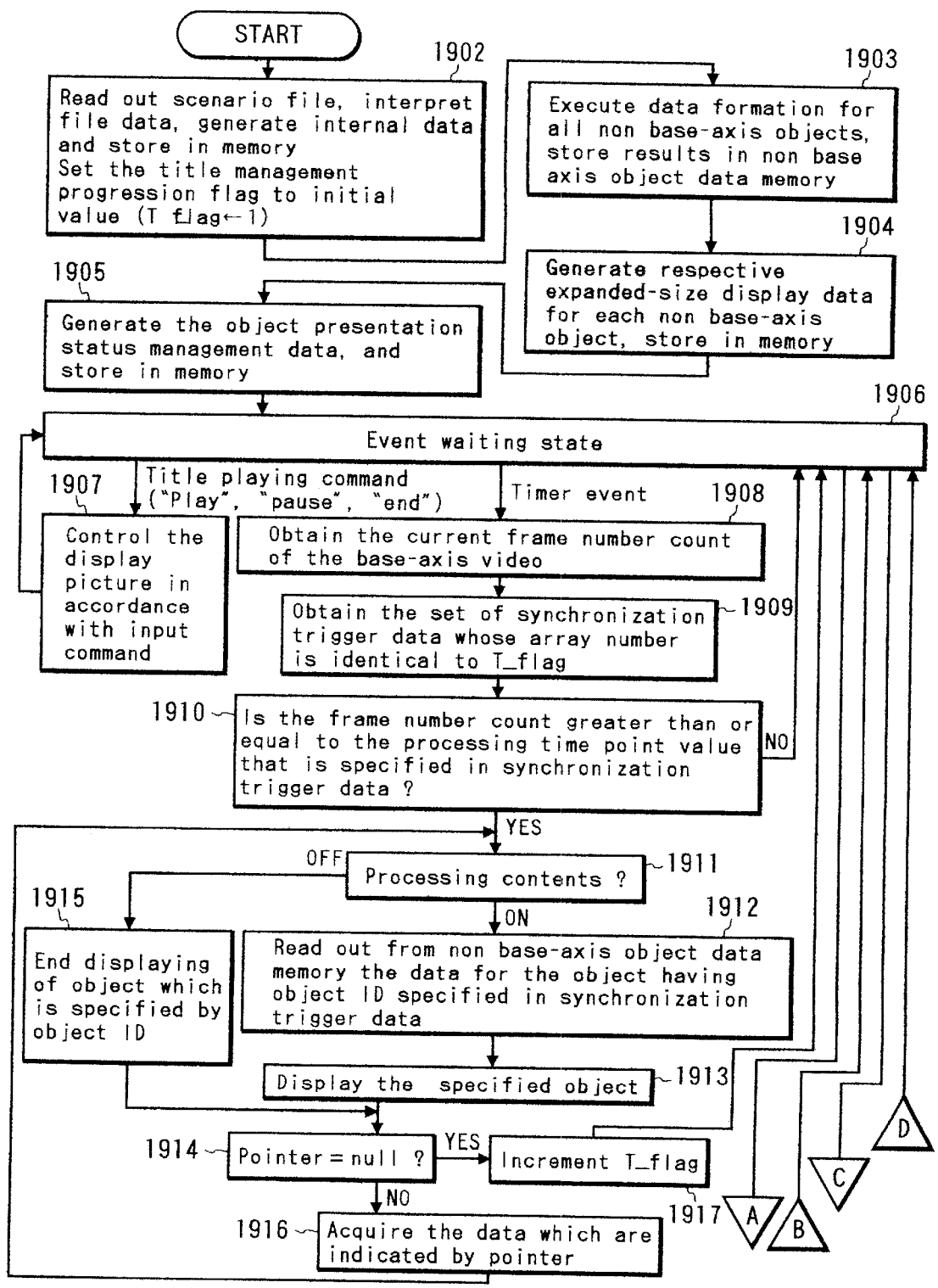
FIGS. 19A, 19B constitute a flow diagram showing the overall operation of the fourth embodiment.
Figure 19B:
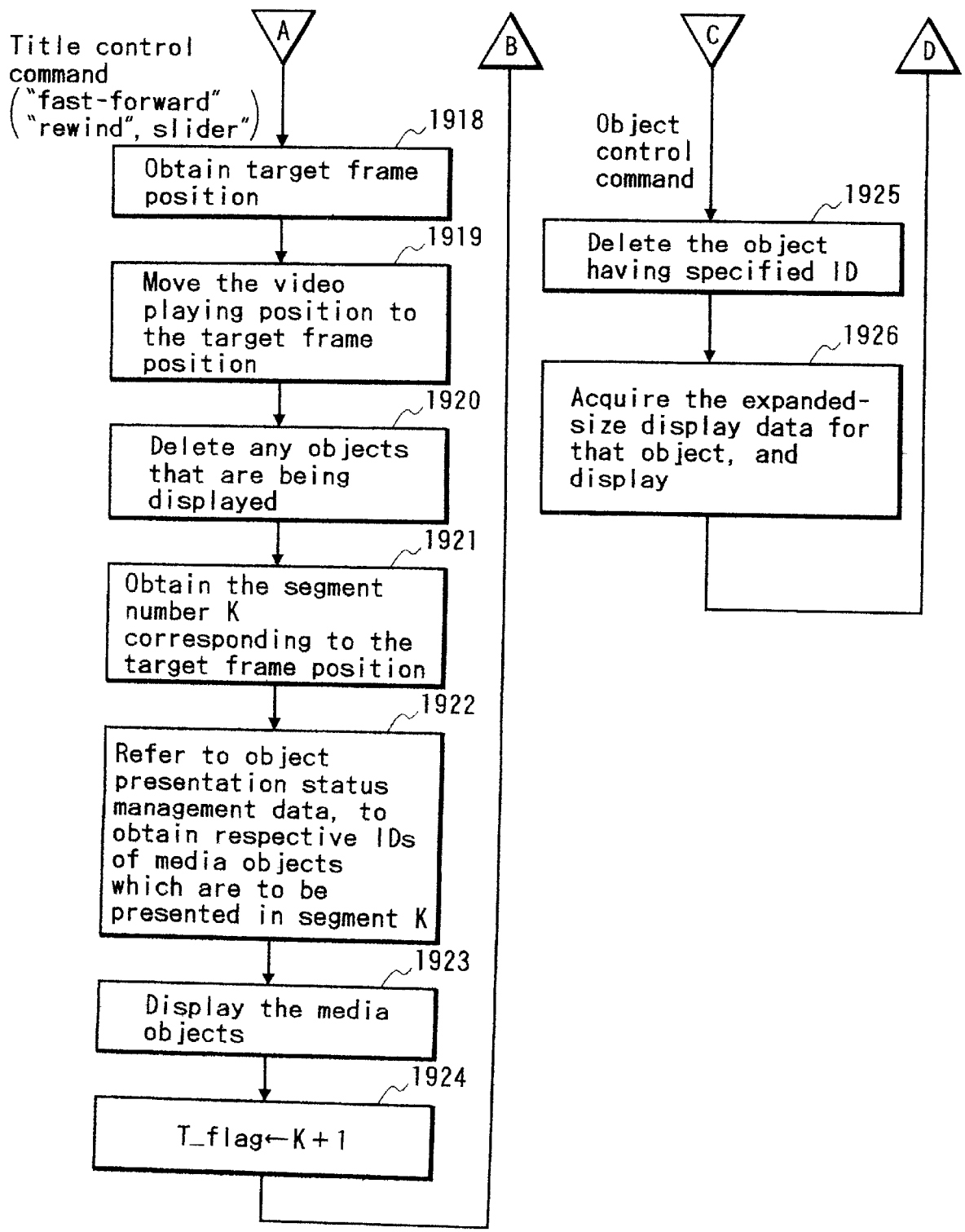

After completing the initial processing, the overall control and management section 1801 enters the event waiting state (step 1906 in FIG. 19). Thereafter, when a command is input from the title playing command input section 109, or a timer event is generated by the timer event generating section 110, or a command is input from the title control command input section 1304, then similar processing is executed by the overall control and management section 1801 to that executed by the overall control and management section 1301 of FIG. 13 (steps 1907 to 1924 in FIG. 19)

Figure 20:
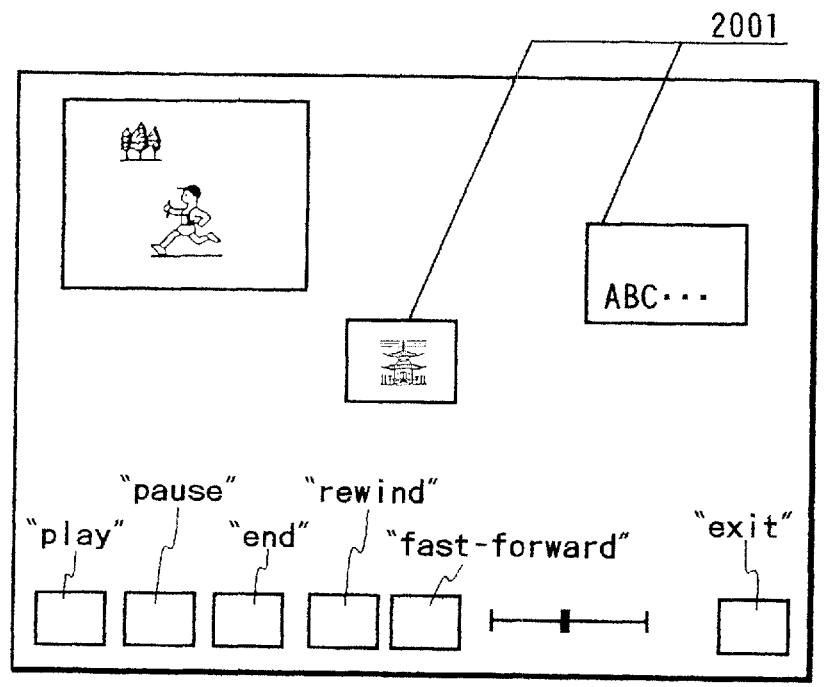
FIGS. 20, 21 show examples of display pictures produced with the fourth embodiment.

As illustrated in FIG. 20, the object control command input section 1802 of this embodiment generates object windows 2001 on the display screen. These windows (and so, the display contents within a window) can be selectively expanded in size under the control of the user-mediated commands. Specifically, a user can input a command to expand one of these windows in size, by moving a display cursor within the window concerned, then "clicking" on that window, by using an input device such as a mouse.

When such an input command is received, the overall control and management section 1801 passes control to the object control section 1803 and in addition, detects the specific window which has been "clicked" on, determines the object ID for the monomedia object which is currently being displayed within that window, and supplies that object ID to the object control section 1803. When control is thus passed from the overall control and management section 1801, the object control section 1803 deletes the monomedia object having the specified ID, using the non base-axis object display section 107 (step 1925 in FIG. 19). In addition, based on the object ID which has been supplied, the overall control and management section 1801 reads out from the non base-axis object data memory 1102 the data which have been stored therein for using in displaying that monomedia object in expanded size, and supplies these data to the non base-axis object display section 107(step 1926 in FIG. 19).

Figure 21:
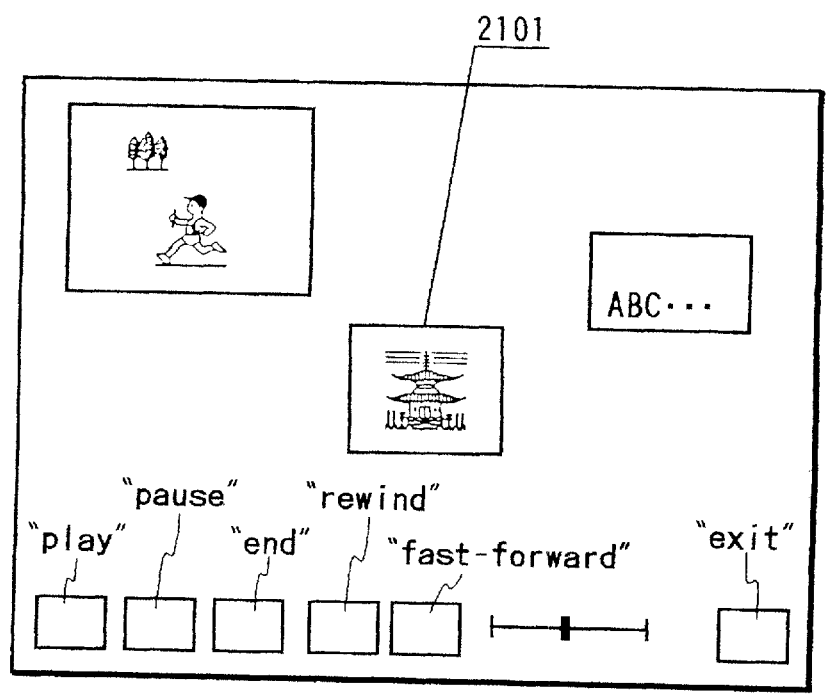

The resultant display condition might be as shown in FIG. 21, for example.

Instead of preparing and storing the data required for displaying a monomedia object in expanded size beforehand (i.e., before playing of the hypermedia title can be started, in response to a user "play" input command), it would be possible to generate such data at the time when a display expansion command is input. However in that case, since a certain amount of time is required to generate the necessary data, there is a high probability that this could hinder playing of the hypermedia title. With this embodiment, by generating such data beforehand, and storing the data in memory, a sufficiently high speed of operation for changing between normal size display and expanded size display of a monomedia object can be achieved, without the danger of hindering smooth playing of the hypermedia title.

Thus as described above, this embodiment provides a feature whereby user-mediated operations can be implemented, based on monomedia object display data which are prepared and stored beforehand. Interactive control by a user, during playing of a hypermedia title, can thereby be achieved without affecting the progression of the hypermedia title.

A fifth embodiment of the invention will be described referring to the general system block diagram of FIG. 22. Firstly, the basic operation of the apparatus shown in FIG. 22 will be described. During the initial processing, similar processing to that of FIG. 13 is executed, however additional processing is also executed, for the purpose of enabling one or more external application programs (referred to in the following simply as external applications) to be activated, during the progression of playing a hypermedia title. Such activation of an external application is made selectable by the user, e.g., by generating a display button corresponding to the external application, whereby the user can designate activation of the indicated external application by "clicking" on that button. During the initial processing, data relating to each such an external application is acquired (specifically, the application name) and is used to generate data which will be referred to as the external application control data, with these data being stored in a external application memory 2202. These external application control data are used, in conjunction with a user input command designating activation of an external application, to generate output commands for activating that external application. Since various types of external application can be envisaged, details of means for running an external application in response to such activation output commands will be omitted.

After completing this initial processing, processing of hypermedia title playing commands etc. and of timer events is executed as described for the embodiment of FIG. 13. However in addition, the external application control data held in the external application memory 2202 may be read out at one or more points during the playing progression, to activate and control an external application, in accordance with external application control commands which are supplied via a external application activation command input section 2203.

More specifically, this embodiment differs from the third embodiment with respect to the following points. The overall control and management section 2201 interprets a scenario which contains linked external application control data. Also, the embodiment includes a external application memory 2202 for storing that external application control data, an external application activation command input section 2303 which enables a user to input commands to activate selected external applications, and an external application activation section 2204 for receiving such input commands and for referring to the data stored in the external application memory 2202, to activate a linked external application. Thus, this embodiment includes a feature whereby external applications can be activated which are linked to the scenario of a hypermedia title, in response to commands which are input via the external application activation command input section 2203.

Figure 22:
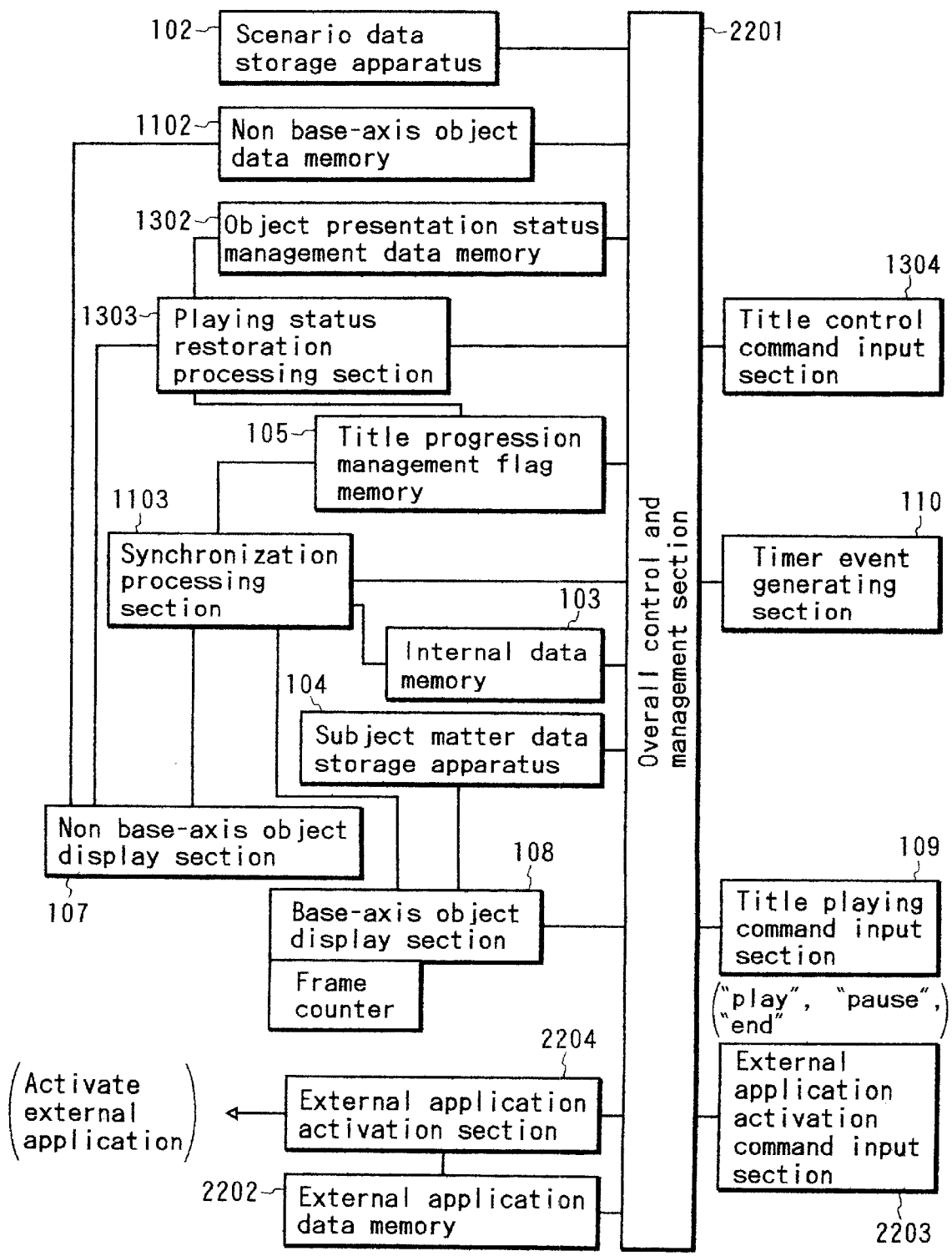
FIG. 22 is a general system block diagram of a fifth embodiment of a multimedia playing apparatus according to the present invention.

In FIG. 22, system blocks which are identical in function to system blocks of the preceding embodiments shown in FIG. 1, FIG. 11 and FIG. 13 are designated by corresponding reference numerals, and detailed description of these will be omitted. The operation of this embodiment will be described referring to FIG. 22 and to the flow diagram of FIG. 23. It will again be assumed that this embodiment is designed to play hypervideo titles, i.e., in which the base-axis object is a video clip. In FIG. 22, the overall control and management section 2201 first reads out the scenario data from the scenario data storage apparatus 102, interprets the contents, and stores the resultant internal data in the internal data memory 103 (step 2302 of FIG. 23). In addition, the overall control and management section 2201 generates external application control data for the external applications listed in the scenario, and stores the external application control data in the external application memory 2202 (step 2303 of FIG. 23).

FIG. 24 illustrates the format of scenario data (i.e. as stored in the scenario data storage apparatus 102) of this embodiment. The respective data formats of the portions designated as sections (a), (b), (c) and (d) are identical to those of the sections (a), (b), (c) and (d) of FIG. 3, described hereinabove. However the data also includes an external application descriptor, indicated as section (e).

Figure 25:
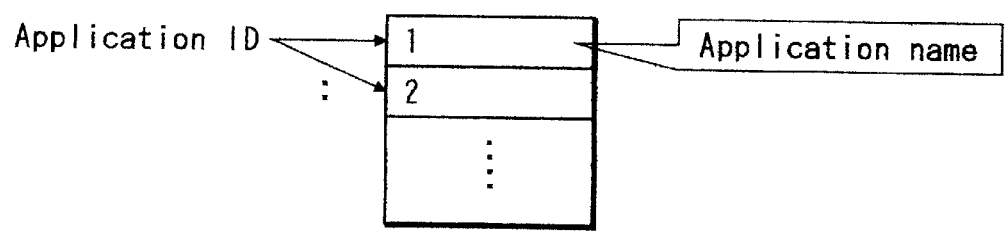
FIG. 25 is a diagram for illustrating external application information which is obtained from the scenario data and stored in the internal data memory, with the fifth embodiment.

The structure of the external application control data (stored in the external application memory 2202) is illustrated in FIG. 25. As shown, this contains, for each external application, an application ID number together with the application name, with the data being arrayed in increasing sequence of values of ID number, starting from 1. These ID numbers are allocated to the external applications during the scenario interpretation processing.

Figure 26:
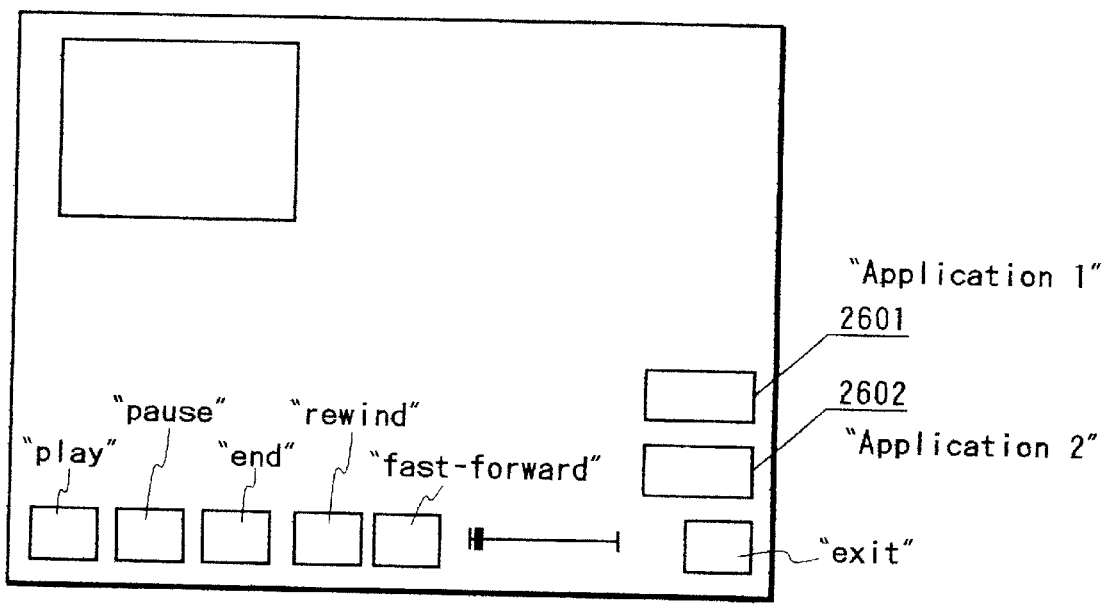
FIG. 26 shows an example of a display picture produced with the fifth embodiment.

FIG. 26 shows an example of the display condition during playing of such a hypermedia title. 2601 and 2602 designate buttons which are generated by the external application activation command input section 2203, and correspond to respective external applications. The number and respective positions of these buttons are automatically determined based on predetermined standards, at the time of scenario interpretation, in accordance with the number of external applications which are linked to the scenario. In this example, it is assumed that two external applications are listed in the scenario, so that two buttons are displayed as the external application activation command input section 2203. In the same way as the overall control and management section 1101, the overall control and management section 2201 executes flag initialization (step 2304 in FIG. 23) and generates object presentation status management data (step 2305 in FIG. 23).

Figure 23A:
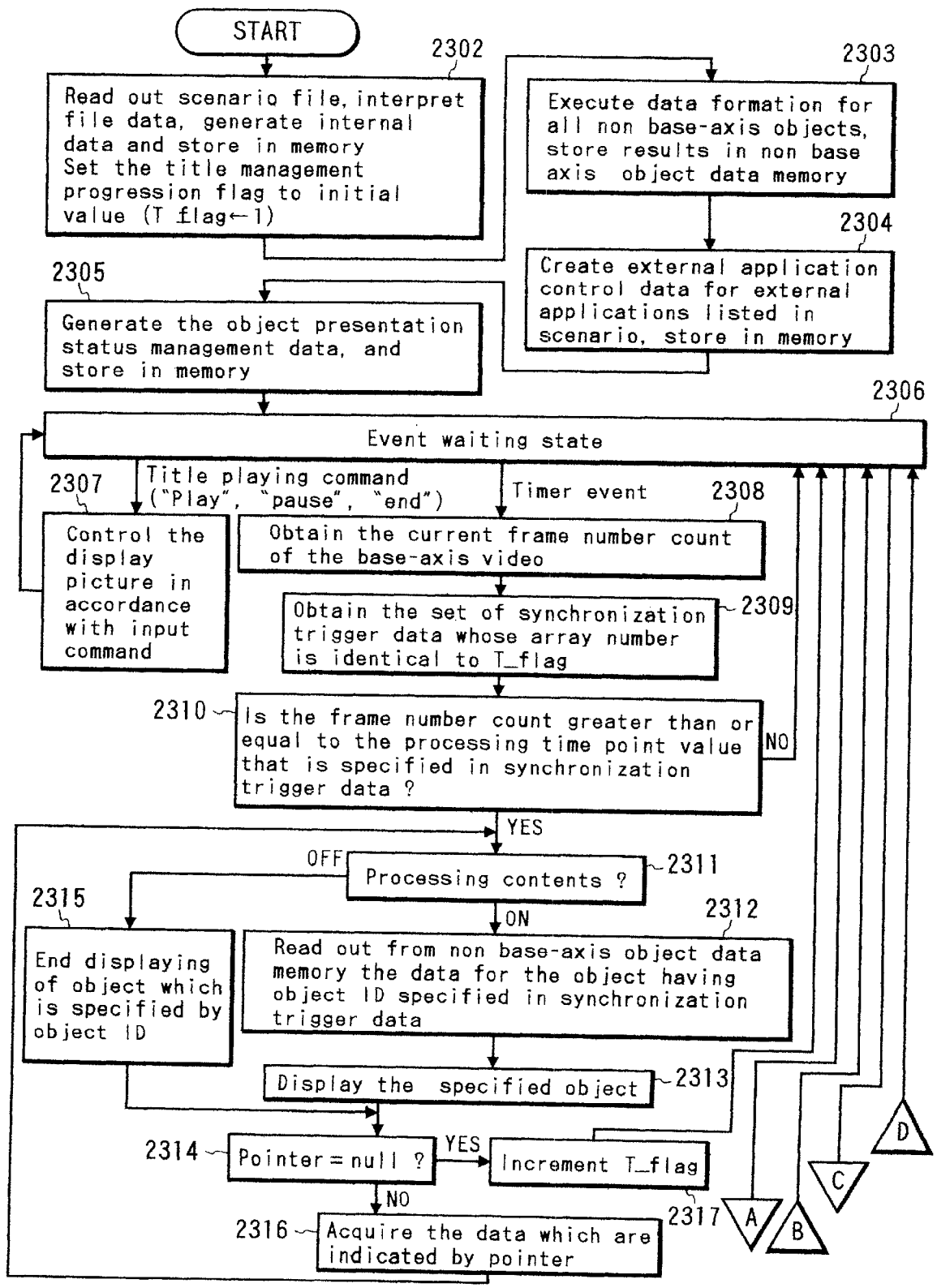

After completing this initial processing, the overall control and management section 2201 enters the event waiting state (step 2306 in FIG. 23). Thereafter, when a command is input from the title playing command input section 109, a timer event is generated by the timer event generating section 110, or a command is input from the title control command input section 1304, the same processing is executed as described hereinabove for the overall control and management section 1301 of FIG. 13 (step 2307 to 2324 in FIG. 23). If a command is input from the external application activation command input section 2203, the overall control and management section 2201 passes control to the external application activation section 2204, while determining the button which has been selected ("clicked" on), to thereby determine the external application which has been specified, and supplies the ID number of that application to the external application activation section 2204. When that occurs, the external application activation section 2204 refers to the external application control data held in the external application memory 2202 (step 2325 in FIG. 23), then executes operations to activate the external application corresponding to the ID number that has been passed from the overall control and management section 2201 (step 2326 in FIG. 23).

Thus with this embodiment, one or more external applications, i.e., application programs which are not directly related to playing a hypermedia title, can be registered in the scenario file of a hypermedia title as respective linked applications, with a user being enabled to selectively activate these external applications during playing of that hypermedia title. As a result, a multimedia playing apparatus can be provided having both multimedia presentation functions and also external application functions.

With such an apparatus it becomes possible for example, while playing a hypermedia title such as an advertising multimedia presentation for a commercial company, to arrange that an external application can be selectively activated by a user whereby orders which are sent to the company, e.g., by facsimile or by a dispatch request apparatus, can be filled and dispatched.

A sixth embodiment of the invention will be described in the following. With the second embodiment described above, the scenario is interpreted before playing of a hypermedia title begins, with the data of the respective monomedia object data files being read out from an auxiliary storage device such as a hard disk storage apparatus, and corresponding monomedia object data which can be utilized by the non base-axis object display section 107 being formed, and stored in a memory having relatively high access speed. If the number of monomedia objects which will be presented is small, then such a method is feasible. However if the number of monomedia objects is large, or the amount of data constituting each monomedia object is large, then the amount of time required for object data preparation, before playing of a hypermedia title can begin, will become excessive. That is to say, the amount of time for which a user must wait, after inputting a "play" command for a hypermedia title, until the point at which the presentation actually begins, will be excessive. In addition, it is necessary to reserve a sufficient amount of memory resources for storing the data of monomedia objects which are to be presented during playing of the hypermedia title.

However with the sixth embodiment of the invention, after interpretation of the scenario prior has been completed, i.e., after the initial processing has been completed, the subject matter data of at least part of at least one of the non base-axis objects are acquired, and formed as required for presentation, by processing that is executed in parallel with playing of hypermedia title. It may be possible to execute such processing for the subject matter data of all of the non base-axis objects, or for all of these objects other than one or a few object which must start to be displayed immediately after the start of the playing progression. For each such object whose subject matter data can be acquired in parallel with playing the hypermedia title, the subject matter data of that object are handled as a plurality of data blocks of suitable size, with these data blocks being successively acquired from the subject matter data storage apparatus while the hypervideo title is being played, and with acquisition and formation of the entire subject matter data for such an object being completed prior to the point at which that object is to start to be played.

With this method, since the non base-axis object subject matter data are acquired from data storage and prepared while playing of the hypermedia title is in progress, it becomes unnecessary for the user to wait for an excessive time (after inputting a "play" command) before playing of the hypermedia title begins. Moreover, since the monomedia object data can be acquired in any sequence, the memory utilization efficiency can be substantially improved. That is to say, since the subject matter data of a non base-axis object can be deleted from memory at the end of playing that object, the amount of capacity which must be reserved as the non base-axis object data memory (such as memory 1102 in FIG. 11) can be greatly reduced, since it is no longer necessary to store all of the subject matter data for all of the non base-axis objects in that memory prior to the start of the playing progression of the hypermedia title.

In addition, the amount of time required for initial processing, before playing of a hypermedia title can begin, is reduced, and presentation of the monomedia objects can be executed at high speed.

With this method, since acquisition and preparation of the non base-axis object data is performed continuously during playing of the hypermedia title, it is necessary to ensure that such data acquisition and forming processing does not hinder the progression of playing the base-axis object. Specifically, when a video is used as the base-axis object, it is necessary to ensure that no interruption to the playing of that video will occur.

Figure 27:
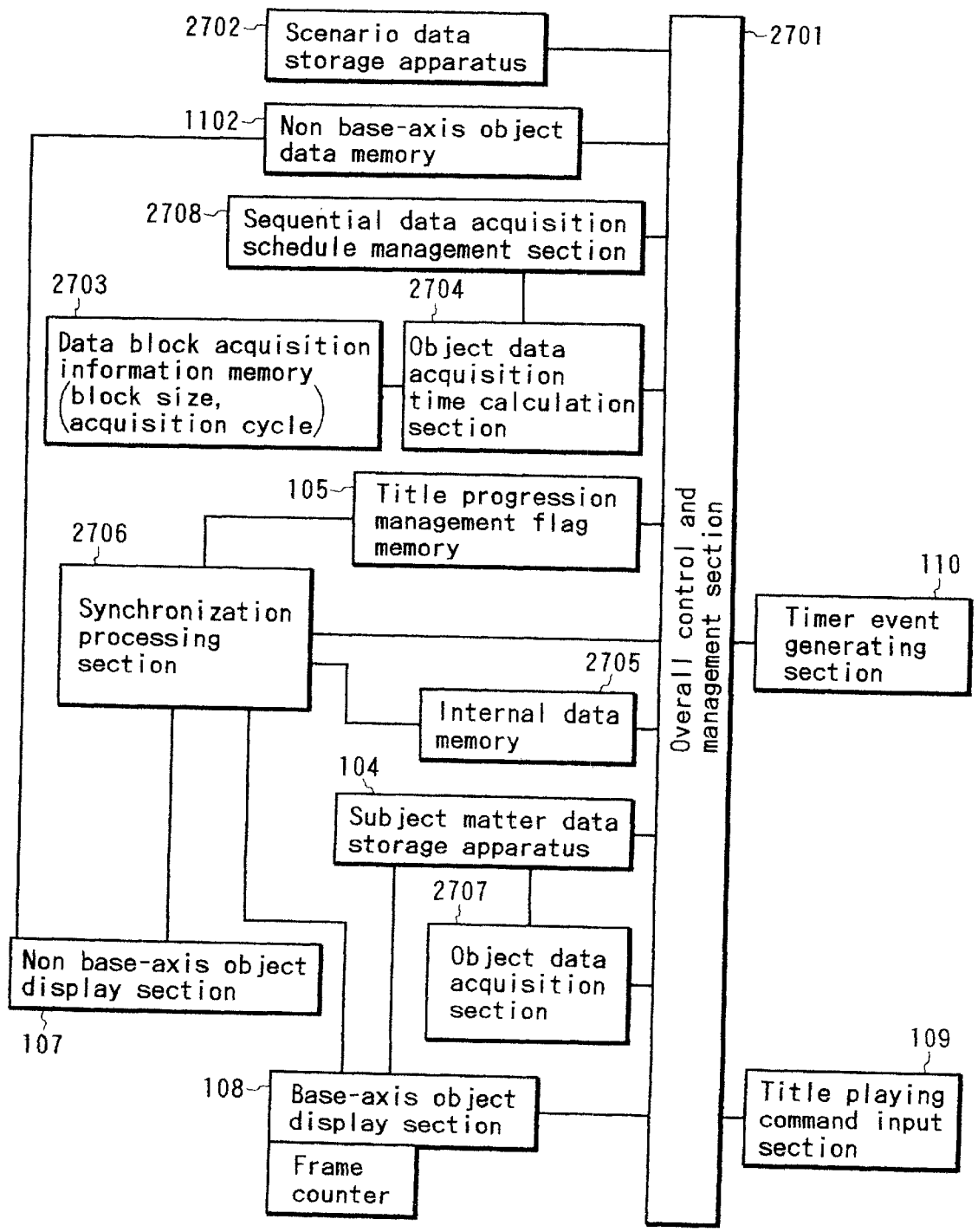
FIG. 27 is a general system block diagram of a sixth embodiment of a multimedia playing apparatus according to the present invention.

The configuration of a sixth embodiment of the invention is shown in the general system block diagram of FIG. 27, and will be described referring to the operating flow diagram of FIG. 28. Firstly, the general principles of operation of the apparatus shown in FIG. 27 will be described. With this embodiment, as shown in FIG. 30, the "subject matter descriptor" information for a non base-axis object in the scenario also includes the size of the subject matter data file for that object. This embodiment is formed of a object data storage apparatus 104, title progression management flag memory 105. non base-axis object display section 107, base-axis object display section 108, title playing command input section 109, timer event generating section 110, and non base-axis object data memory 1102 as for the preceding embodiment, together with an overall control and management section 2701, scenario data storage apparatus 2702, internal data memory 2705, and synchronization processing section 2706 whose functions differ to some extent from the functions of the corresponding blocks of the second embodiment shown in FIG. 11, as will be clear from the following description, and further includes a data block acquisition information memory 2703 in which are stored respective predetermined values for data block size and data acquisition transfer cycle (described hereinafter), as well as an object data acquisition time calculation section 2704, object data acquisition section 2707, and sequential data acquisition schedule management section 2708.

Figure 31:
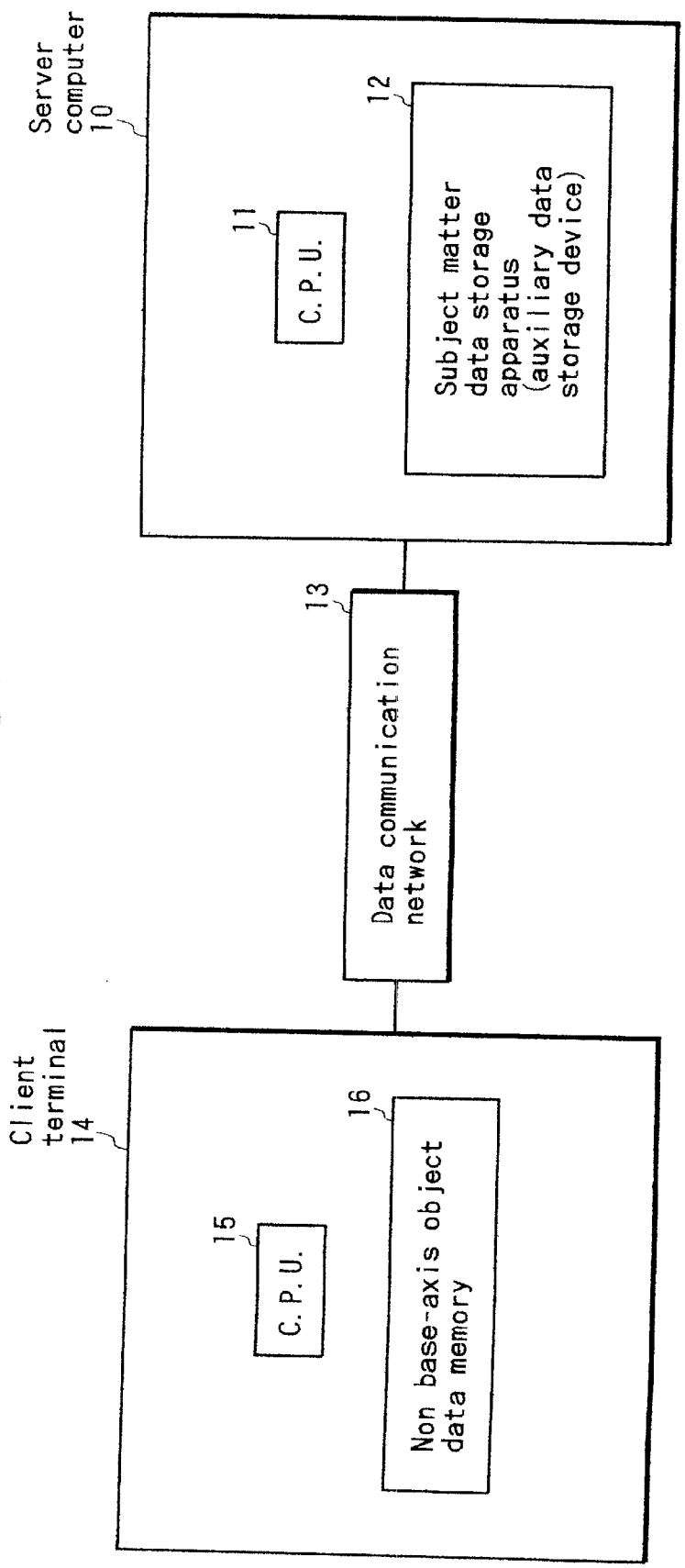
FIG. 31 is a basic system block diagram for illustrating a multimedia playing apparatus in which data are transferred from a subject matter data storage apparatus to a non base-object data memory via a data transmission path through a network.

In a practical application, such an apparatus could be implemented as basically illustrated in the block system diagram of FIG. 31. Here, the subject matter data storage apparatus 12 (typically a high-capacity hard disk data storage device) of a server computer 10 implements the functions of the object data storage apparatus 104 of FIG. 27, while a data memory 16 of a client terminal 14 serves as the non base-axis object data memory 1102 in FIG. 27. The functions of the overall control and management section 2701 in FIG. 27, as well as the various other processing operations of this embodiment, are generally performed by the CPU 15 of the client terminal 14, however the data acquisition function of the object data acquisition section 2707, i.e., data transfer from the server 10 to the client terminal 14 via a transmission path through a data communication network 13, employs a data transfer protocol, and so involves the CPUs 11, 15 of both the server and client computers.

It will again be assumed that the base-axis object is a video object. The frame rate of displaying a video is slower than the rate at which video data can be transferred (e.g., as MPEG compressed data) via a network, and for that reason, the base-axis object display section 108 of the apparatus of FIG. 27 transfers the video subject matter data periodically, as successive fixed-size data blocks, in response to transfer requests which are periodically generated by the base-axis object display section 108. As each block is received by the base-axis object display section 108, it is temporarily stored in a video buffer memory, is decompressed, and successive frames of the resultant data are formed (as specified by the scenario) such as to be ready for display, i.e., in a window whose size and position are designated by the scenario.

Figure 32:
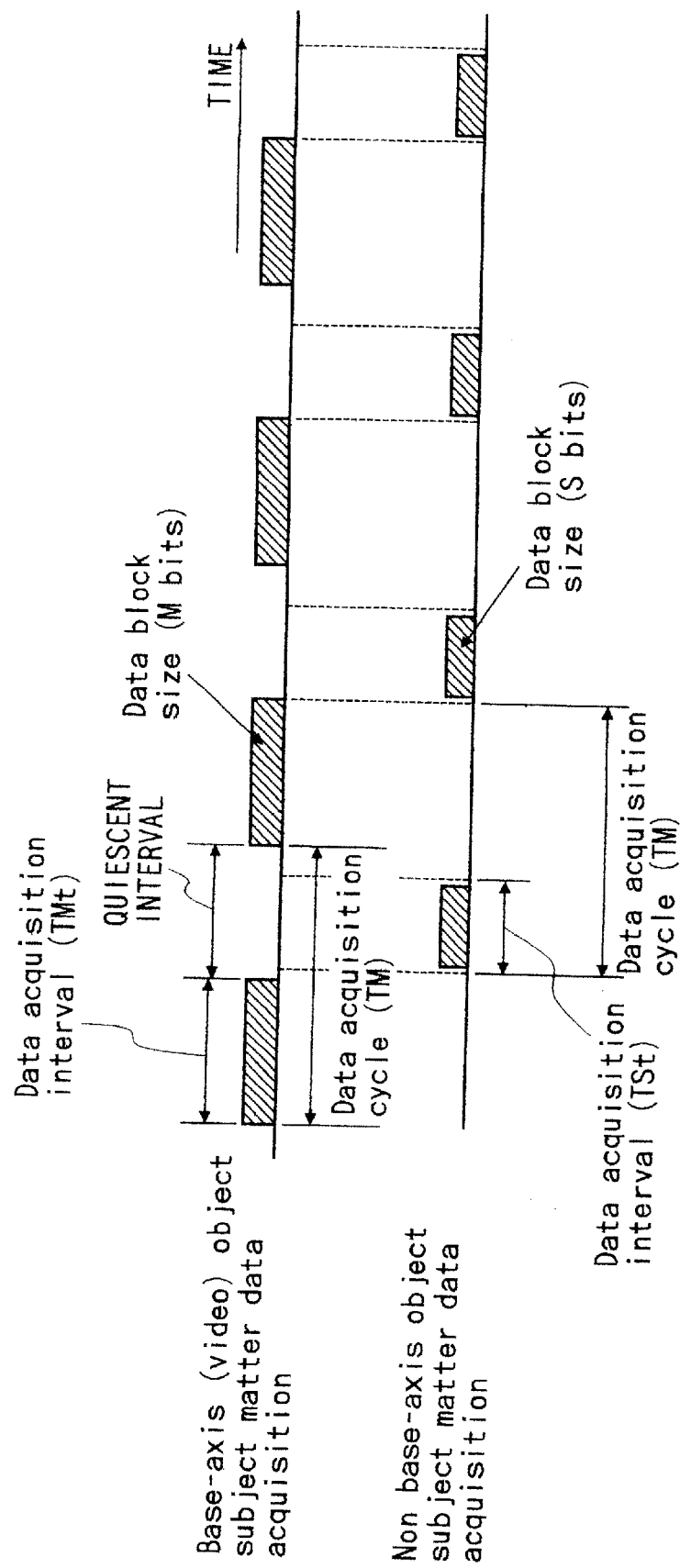
FIG. 32 is a timing diagram for illustrating acquisition of data from a subject matter data storage apparatus as sequential blocks, with the sixth embodiment.

The process of acquiring the video base-axis object subject matter data is illustrated in FIG. 32. As shown, the data blocks are acquired by the base-axis object display section 108 from the object data storage apparatus 104 with a fixed repetition period, referred to as the data acquisition cycle, whose value will be designated TM (sec). The video data block size will be designated as M (bits). If the apparatus is configured for example as shown in FIG. 31, with the client terminal consisting of a usual type of personal computer, then it will not be possible to acquire other subject matter data while a block of video subject matter data is being acquired, i.e. it is necessary to acquire the subject matter data of the non base-axis objects in the quiescent intervals between successive acquisitions of blocks of video data. With this embodiment, the subject matter data of each base-axis object are also acquired as sequential blocks, during playing of the base-axis object, and the relationship between these data blocks, each having S bits, is as shown in in FIG. 32. Specifically, the relationships between the quantities shown in FIG. 32 can be considered as follows, designating the non base-axis object data acquisition cycle as TS (sec). The data units and time units will be assumed to be bits and seconds, respectively. It should be understood that these time units of seconds are measured with respect to the playing progression axis, as described hereinabove, i.e., correspond to respective numbers of frames of the base-axis object video, and do not directly correspond to units of real time. Firstly, to ensure that acquisition of non base-axis object data cannot interfere with acquisition of base-axis object data, TS must be made equal to TM. The rate of data acquisition (e.g., data transfer rate via the network of FIG. 31) will be designated as v (bps). In order to ensure that acquisition of non base-axis object data will not hinder acquisition of base-axis object data, it must be ensured that:

$$TM - TMt > TSt \qquad (1)$$

The respective values of TMt and TSt are determined based on the data acquisition rate v and on the block size TM, i.e., $$TMt = M/v \qquad (2)$$

$$TSt = S/v \qquad (3)$$

Using equations (2), (3) in equation (1) gives:

$$v*TM - M > S \qquad (4)$$

The size of the aforementioned video buffer will be designated as B bits, and the amount by which the buffer contents must be depleted before a request is generated to acquire another block of video data will be designated as a %. In that case:

$$M = a*B (0 < a < 1) \qquad (5)$$

Designating the average data acquisition rate for the base-axis object as R (i.e., determined by the video data acquisition cycle and block size values), $$TM = a*B/R \qquad (6)$$

Inserting equations (5), (6) into equation (4):

$$(v*a*B/R) - (a*B) > S \qquad (7)$$

Since a, B, R and v are all known values, they can be treated as constants in the equations. Hence, respective values for the data acquisition cycle TM and the data block size S which are used for acquisition of the non base-axis object data can be obtained from equations (6) and (7) respectively. These values will be assumed to have been calculated beforehand and stored in the data block acquisition information memory 2703.

Figure 33:
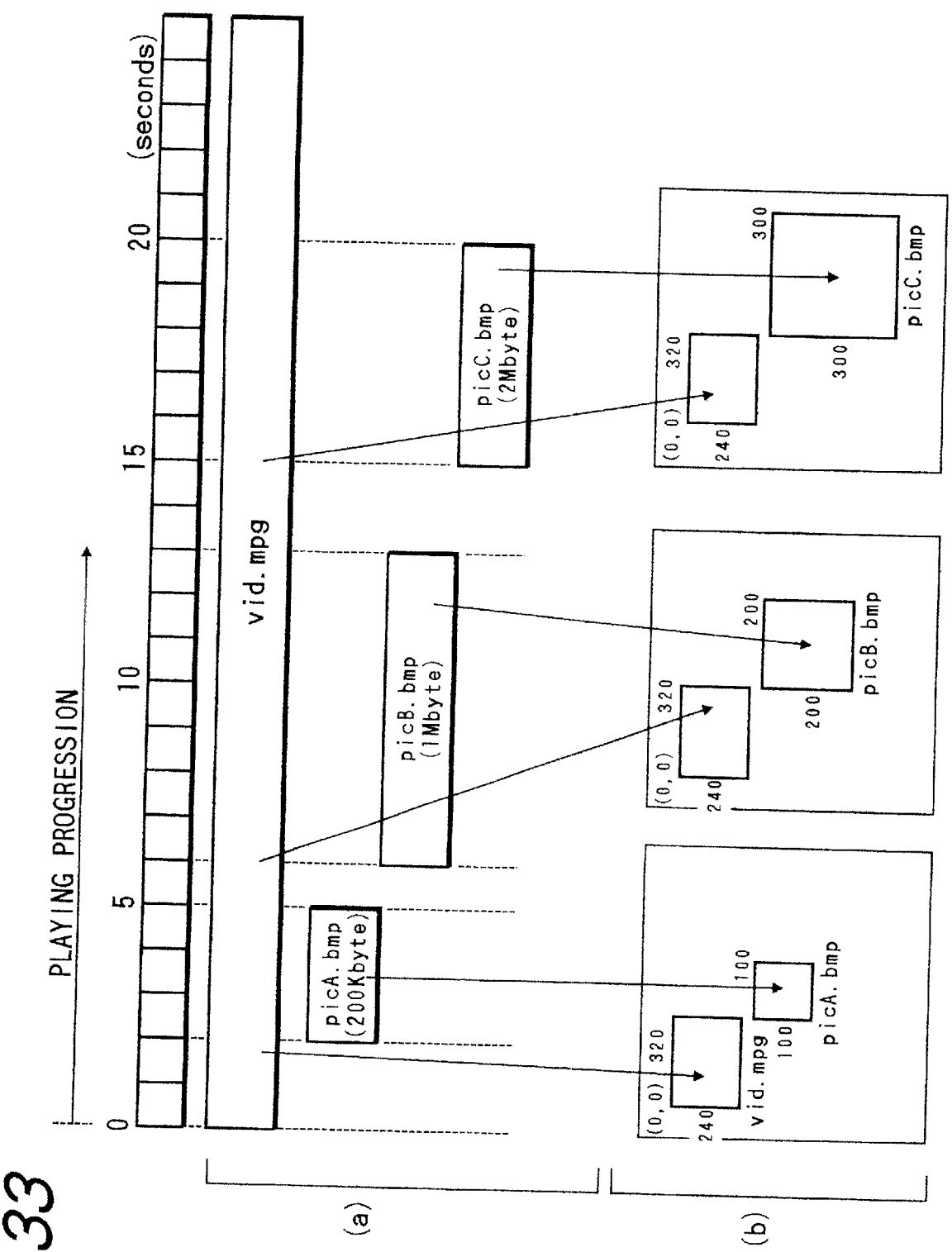
FIG. 33 is a conceptual timing diagram illustrating timing relationships between the playing progression of a hypermedia title and playing of respective subject matter data file contents.

FIG. 33 conceptually illustrates an example of playing a specific hypermedia title. In this simple example, the base-axis object is again a video object, with the corresponding subject matter data file name being video.mpg and there are three non base-axis objects. These are respective still pictures which will be referred to as A, B and C respectively, having respective subject matter data file names picA.bmp, picB.bmp and picC.bmp. The respective sizes of these subject matter data files are 200 Kbyte, 1 Mbyte and 2 MByte, as indicated in section (a) of FIG. 33. The scenario of this hypermedia title specifies that presentation of the three still pictures A, B and C are to begin at time points of 2 seconds, 6 seconds, and 15 seconds respectively, in the playing progression. The scenario further specifies that the object size (display window size) for the base-axis object is 320×240 picture elements, and for the still pictures A, B, C is 100×100, 200×200, and 300×300 picture elements respectively, as indicated in section (b) of FIG. 33.

Figure 34:
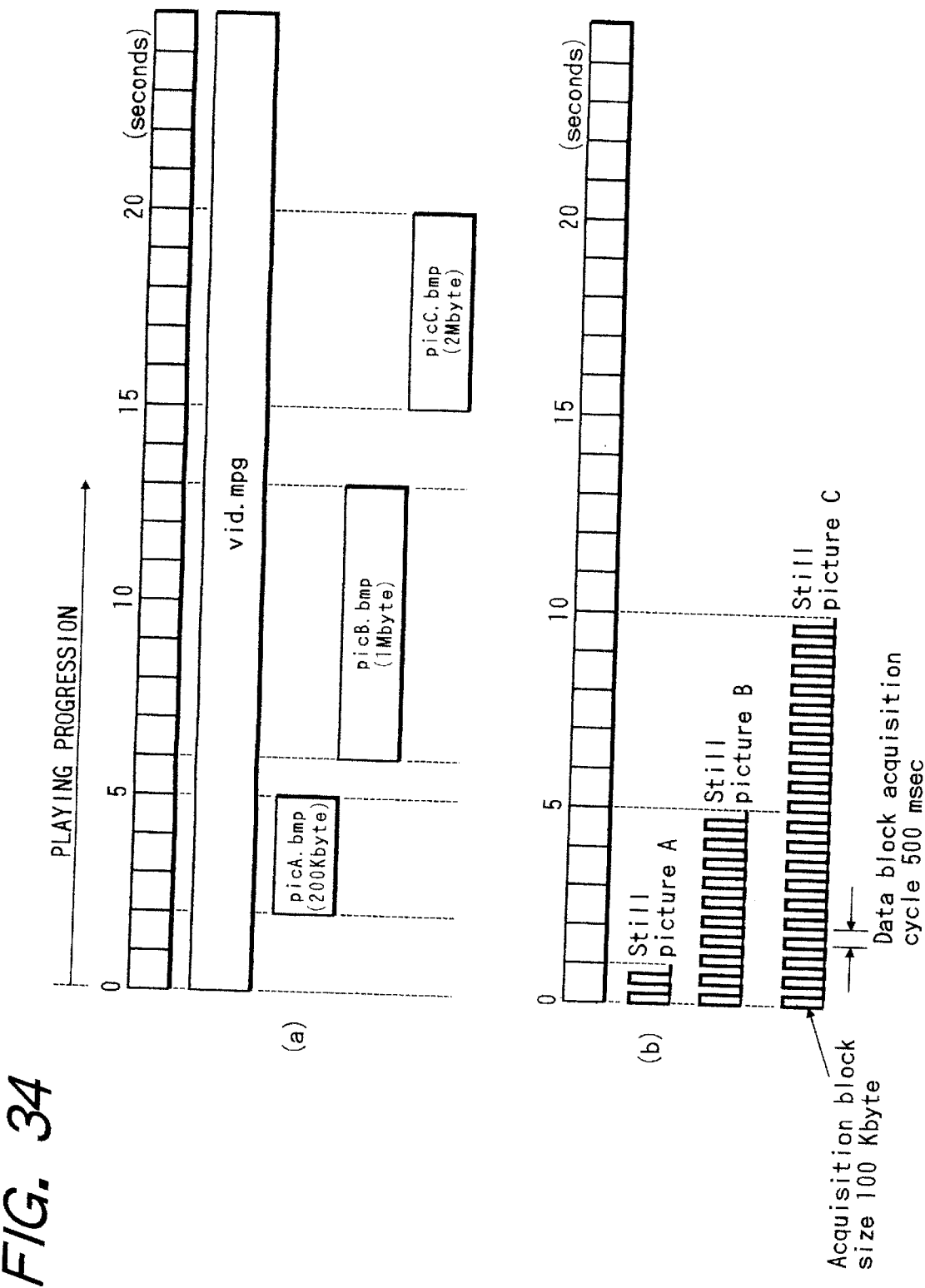
FIGS. 34 to 37 are conceptual timing diagrams, for illustrating processing for deriving respective data acquisition time durations of respective non base-axis objects, and arranging the respective data acquisition times in a non-overlapping sequence extending within the playing progression, to obtain respective values of data acquisition starting time point for these objects, with the sixth embodiment.
Figure 35:
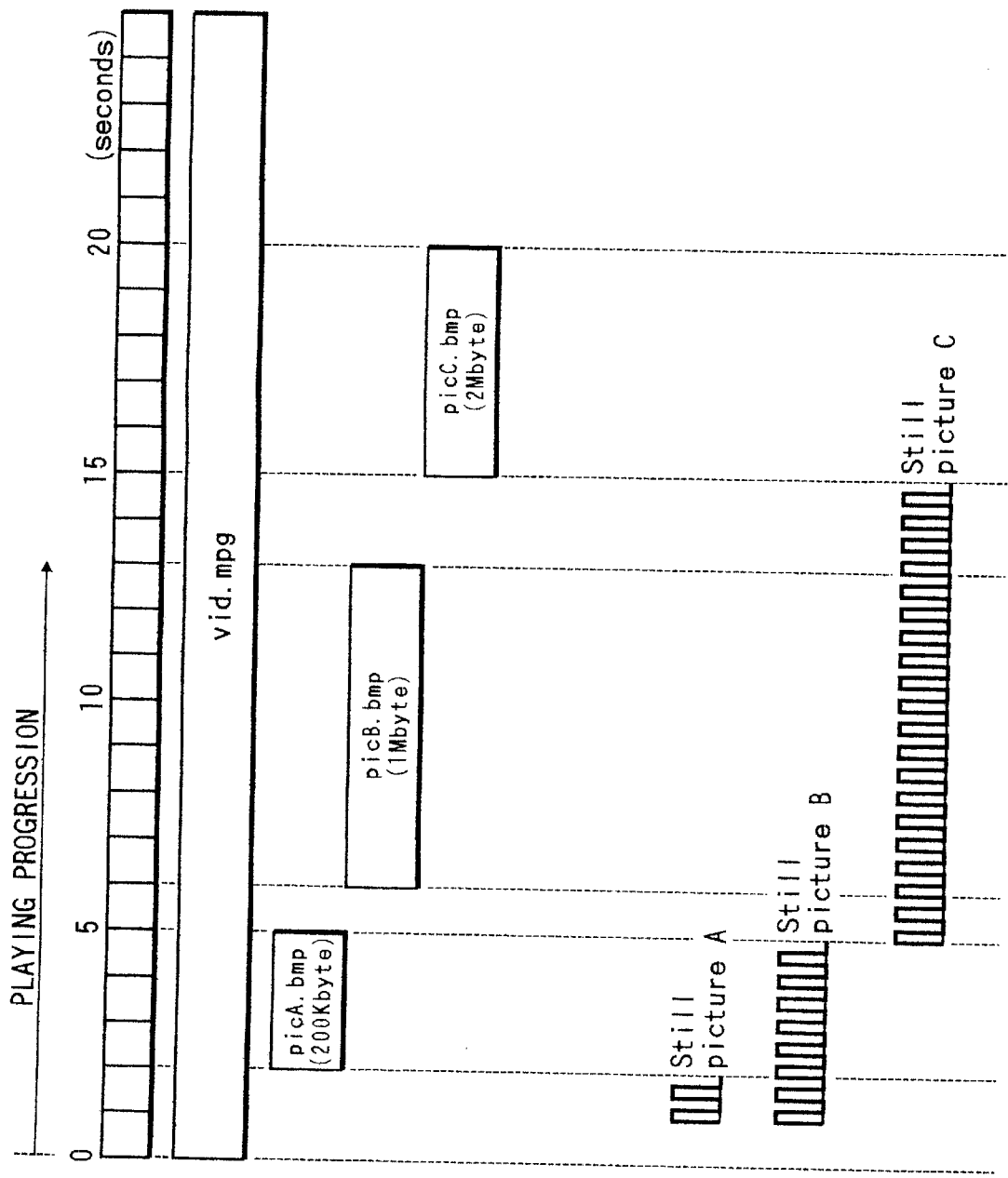

Determination of the respective data acquisition durations (i.e., respective numbers of data acquisition cycles) for obtaining the subject matter data of the still pictures A, B and C is illustrated in FIG. 34. As shown, the data acquisition durations values obtained (2 seconds, 5 seconds, 10 seconds) are derived for the case in which the data block size and acquisition cycle values which are stored in the data block acquisition information memory 2703 are 100 Kbyte and 500 msec, respectively. If data acquisition for each of the still pictures A, B and C were to begin at a time point such that the necessary subject matter data would be acquired just before the time point at which each of these objects is to start to be presented, then the relationships between the data acquisition durations and the object presentation intervals would be as illustrated in FIG. 35. As can be seen, in that case there would be overlap between acquisition of data blocks of respective objects, which is not permissible.

For that reason, it is necessary to schedule the respective positions of these periods of data acquisition, such as to avoid any data transfer conflict. This is illustrated first in FIG. 36, in which the time interval in which all of the subject matter data of still picture B are acquired (as a succession of data blocks) is shifted, back along the playing progression axis, such as to end before the point at which data acquisition for still picture C is to begin. Similarly, as shown in FIG. 37, the time interval in which all of the subject matter data of still picture A are acquired is shifted, back along the playing progression axis, such as to end before the point at which data acquisition for still picture B is to begin.

Figure 36:
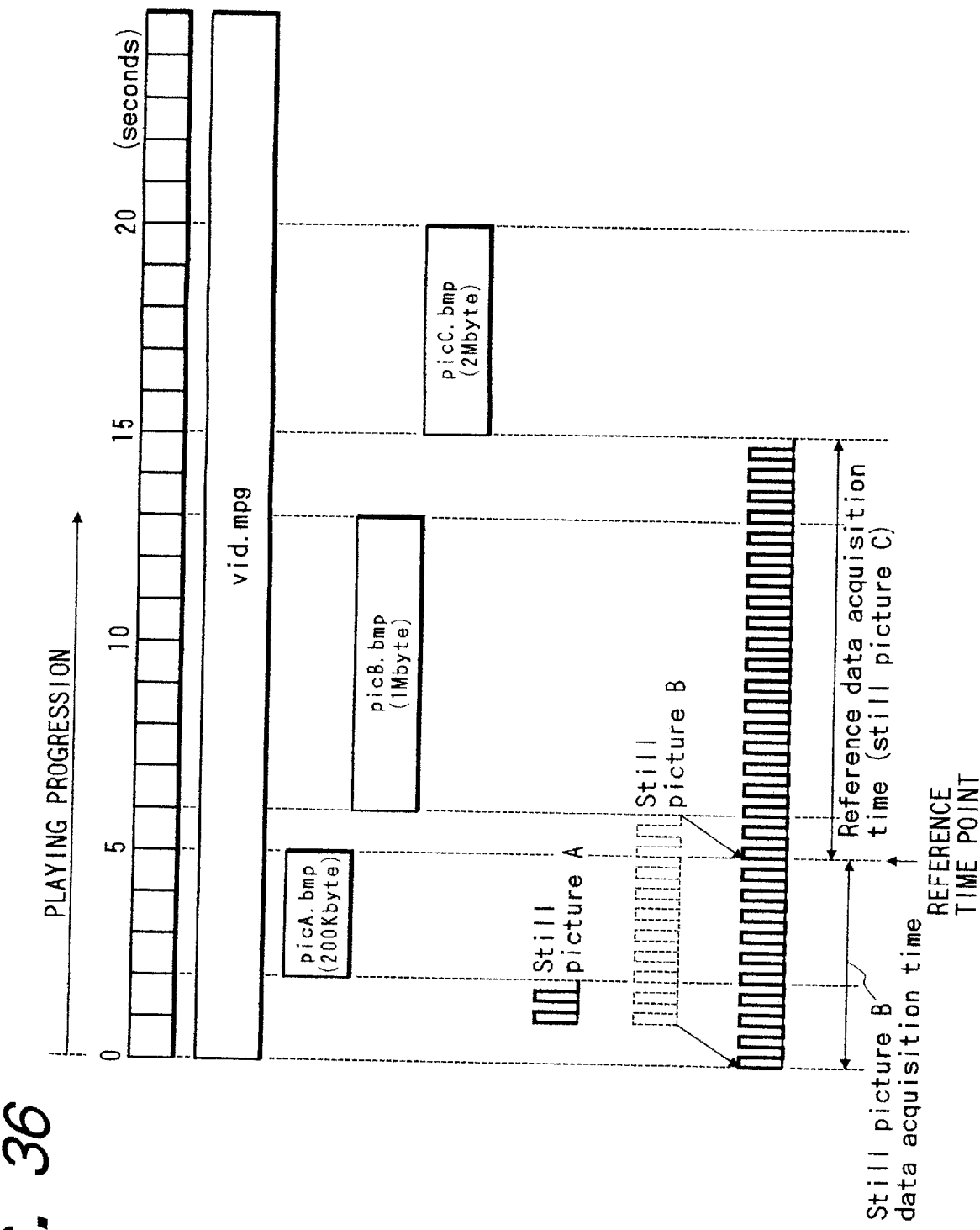
Figure 37:
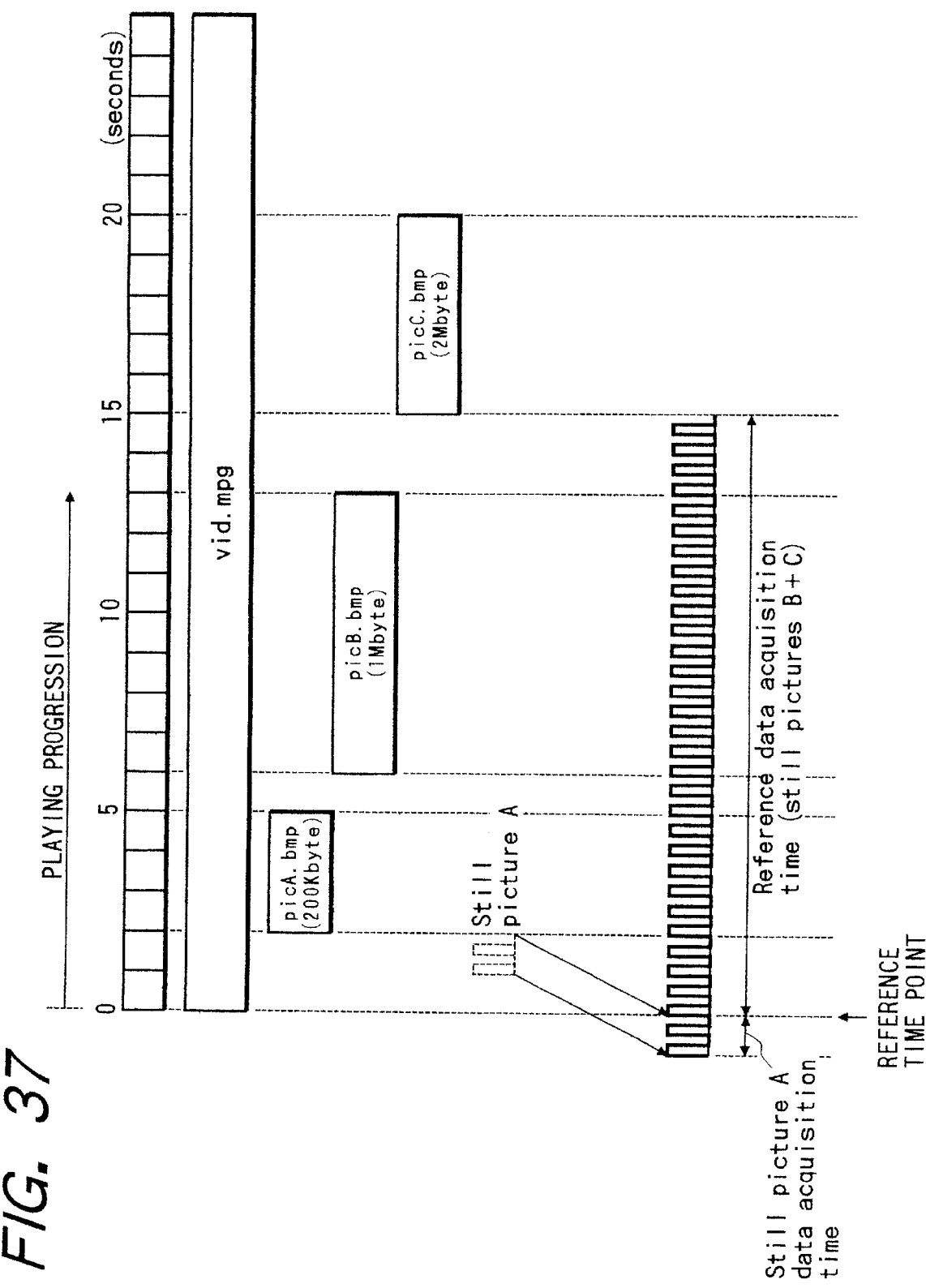

It can thus be understood that the time point at which data acquisition for the object having the highest value of presentation starting time point (in this example, still picture C) must begin, such that all of the subject matter data of that object are acquired immediately prior to the start of object presentation, is first used as a reference time point (i.e., the "5 seconds" time point in FIG. 36). That reference time point is then used to define the time point at which acquisition of the data of the object having the next-highest value of presentation starting time point (in this example, still picture C) must begin, (i.e., the "0 seconds" time point, which is the start of the playing progression). That process is then repeated to define the data acquisition starting time point for the next object, and so on.

It will be understood that in this example, a negative value of data acquisition starting time point is obtained for the still picture A, i.e.,—2 seconds. This indicates that all of the subject matter data of still picture A must be acquired prior to the start of the playing progression, i.e., prior to the time at which the system is set in the aforementioned waiting state, ready to receive a "play" input command from a user.

Figure 38:
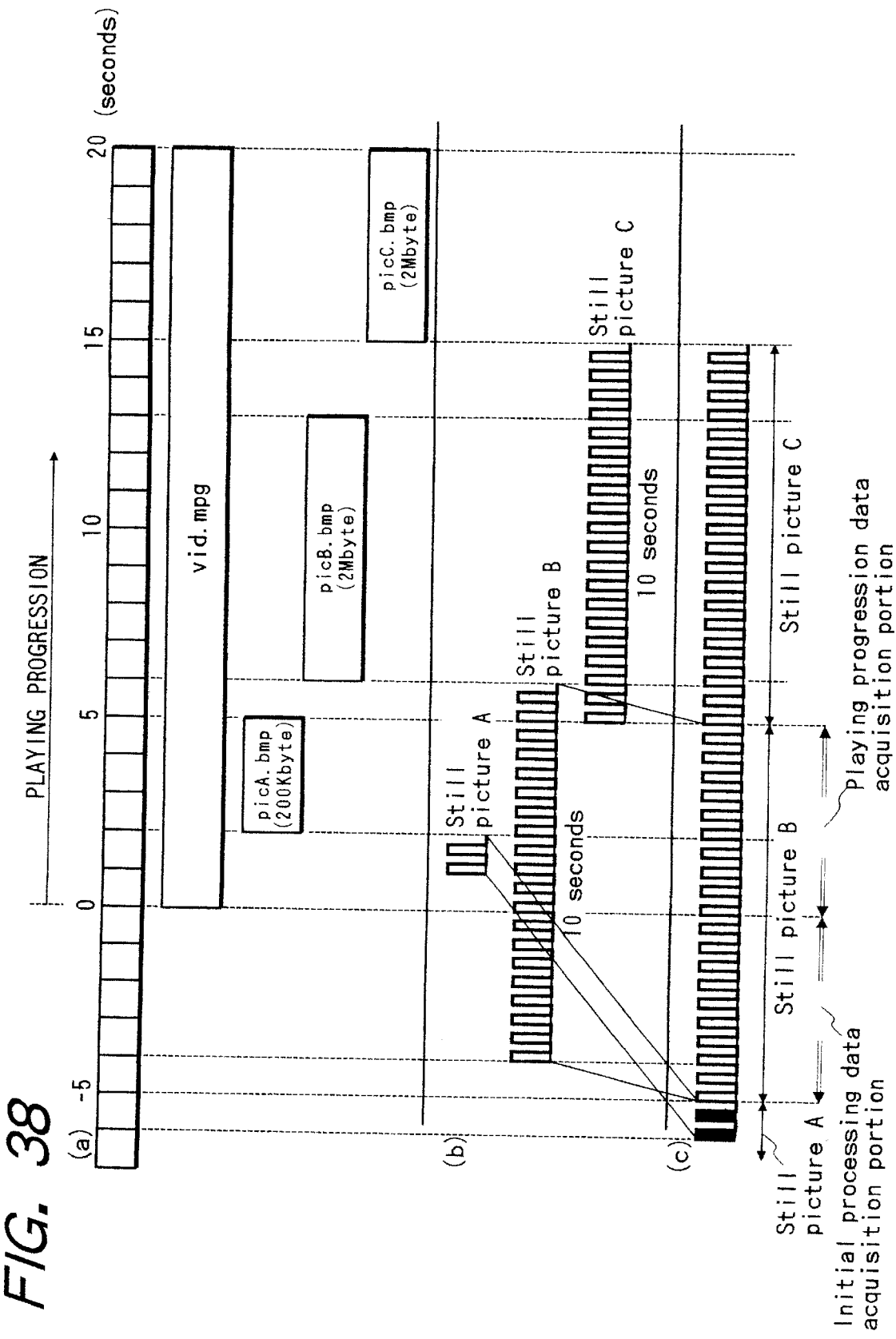
FIG. 38 is a conceptual timing diagram, for illustrating processing for deriving an initial processing data acquisition portion and a playing progression acquisition portion of the data acquisition time of a non base-axis object which is found to have a negative value of acquisition starting time point.

FIG. 38 shows another example, which differs from the previous example in that the size of the subject matter data file of still picture B is now 2 Mbyte, so that the data acquisition duration of still picture B is now increased to 10 seconds, as shown in section (b) of FIG. 38. As a result, as shown in section (c) of FIG. 38, a part of the complete data acquisition interval for still picture B lies within the playing progression, i.e., extends from the 0 seconds to 5 seconds time point. In the following, such a portion of a complete data acquisition interval will be referred to as the playing progression data acquisition portion. The remaining part of that complete data acquisition interval occurs prior to the start of the playing progression, i.e., extends from −5 seconds to 0 seconds. In the following, such a portion of a complete data acquisition interval will be referred to as the initial processing data acquisition portion.

As shown in FIG. 29, this embodiment also differs from the preceding embodiments with regard to the internal data which are prepared by interpreting the scenario, and stored in memory during the initial processing. Specifically, there are differences in the contents of the subject matter descriptor and the synchronization trigger data. In the subject matter descriptor data, each subject matter ID is linked not only to the corresponding subject matter data file name, but also to the size of that subject matter data file. In addition, each set of synchronization trigger data specifies either the presentation ON state, or OFF state, or the start of subject matter data acquisition (ACQUIRE DATA), as processing to be executed for a specific object at a specific processing time point. When a plurality of subject matter data sets have the same processing time point, and so are linked by successive pointers, priority is assigned to execution of the respective processing contents of these subject matter data sets in the order OFF processing, ON processing, ACQUIRE DATA processing.

With this embodiment, the object data acquisition time calculation section 2704 uses the information held in the data block acquisition information memory 2703 to calculate the respective durations (expressed in time units or as numbers of video frames) required to acquire subject matter data for each of the non base-axis objects of a hypermedia title that is to be played, e.g., the durations illustrated in section(b) of FIG. 34. The sequential data acquisition schedule management section 2708 has the function of deriving respective appropriate values for the data acquisition starting time points for each of these objects, using the respective data acquisition durations, e.g., the function illustrated in sections (b), (c) of FIG. 38.

Figure 28:
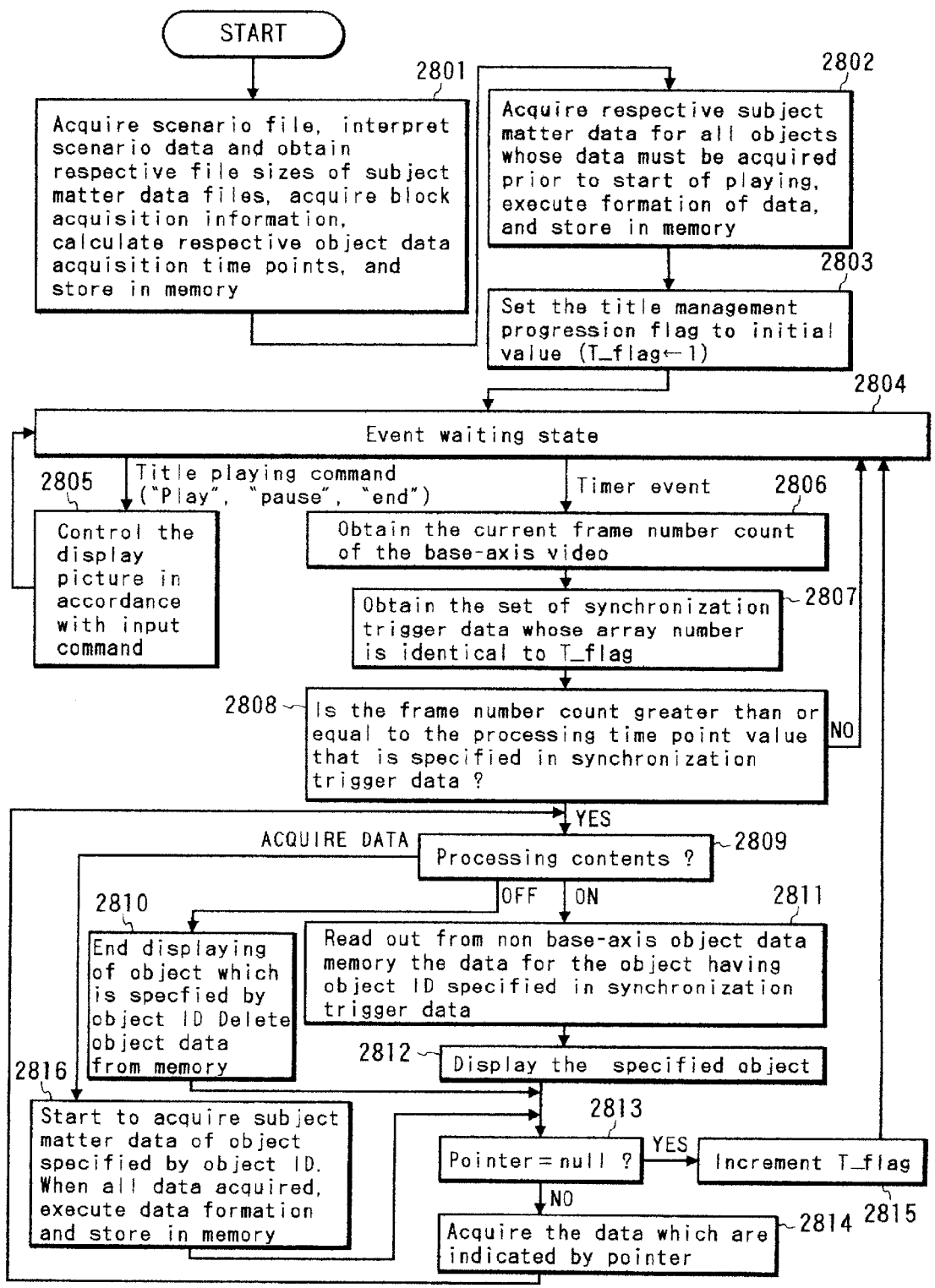
FIG. 28 is a flow diagram showing the overall operation of the sixth embodiment.

FIG. 28 is a flow diagram showing the overall operation of this embodiment. The initial processing is shown as a set of steps 2801 to 2803. Firstly, in step 2801, the scenario file is acquired and interpreted, to obtain the internal data (object descriptor data, subject matter descriptor data, and synchronization trigger data) which are then stored in the internal data memory 2705, in the same way as for the second embodiment. However with this embodiment as mentioned above, the subject matter decriptor data also includes the respective subject matter data file names for the non base-axis objects.

The information held in the synchronization processing section 2706 is then used, by the object data acquisition time calculation section 2704 and sequential data acquisition schedule management section 2708, to derive respective data acquisition starting time points for the non base-axis objects, in accordance with a sequential data acquisition schedule which will ensure the most rapid possible acquisition of subject matter data without overlapping between data acquisition of respective objects, as described above.

Figure 39:
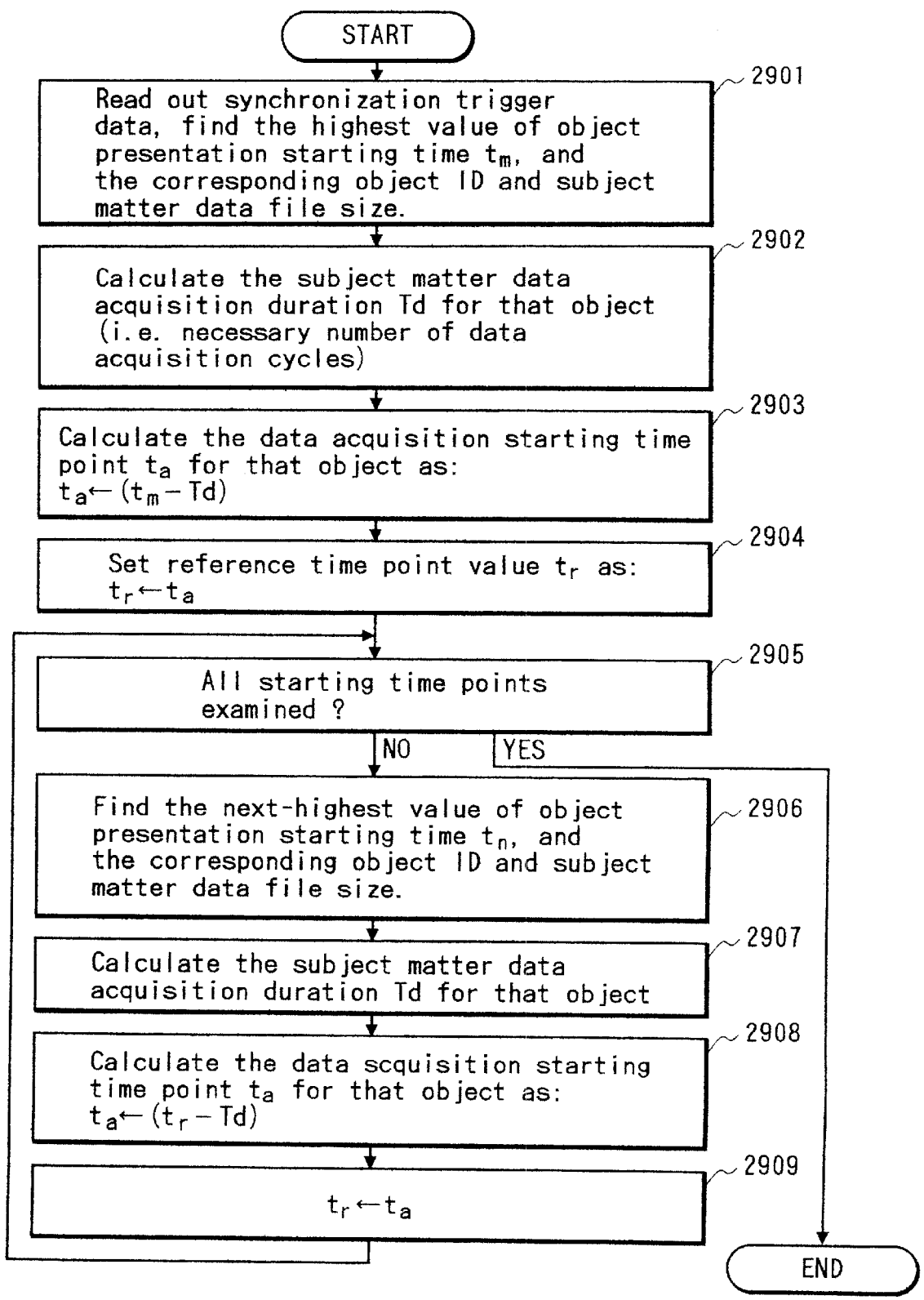
FIG. 39 is a flow diagram of processing which is executed to obtain respective values of data acquisition starting time point for each non base-axis object, with the sixth embodiment.

The processing thus executed to establish the presentation starting time points is shown in the flow diagram of FIG. 39. Here, in steps 2901 to 2904, the highest value of object presentation starting time point (e.g., the value 15 seconds for still picture C in FIG. 38) is used in conjunction with the data acquisition duration value for the corresponding object, to establish the data acquisition starting time point for that object and thereby establish the first value for the reference time point $t_r$ (for example, the 5-second time point in the example of FIG. 38).

Thereafter, in steps 2905 to 2909, that reference time point value is used in conjunction with the data acquisition duration for the object having the next-highest value of presentation starting time point (e.g., still picture B in FIG. 38) to establish the data acquisition starting time point for that object and thereby establish an updated value for the reference time point $t_r$. Thereafter, steps 2905 to 2909 are successively repeated for each of the remaining non base-axis objects of the hypermedia title.

As each data acquisition starting time point value is derived, it is stored in the internal data memory 2705 in conjunction with the corresponding object ID.

When all of the data acquisition starting time points have been derived and stored, the overall control and management section 2701 successively reads these out and generates (for each data acquisition starting time point value which is positive) a corresponding synchronization trigger data set, having that time point as the processing time point, and with the processing contents being "ACQUIRE DATA", and stores that synchronization trigger data set in the internal data memory 2705.

However with this embodiment, if a non base-axis object is found to have a negative value of data acquisition starting time point, i.e., the subject matter data must be acquired prior to setting the apparatus in the event waiting state (as for still pictures A, B in the example of FIG. 38), then in step 2802 of FIG. 28, the subject matter data of that object are acquired from the object data storage apparatus 104 and are then formed as required for supplying to the non base-axis object display section 107, and stored in the non base-axis object data memory 1102. In this case the subject matter data are acquired by continuous access, rather than as sequential blocks.

Figure 40:
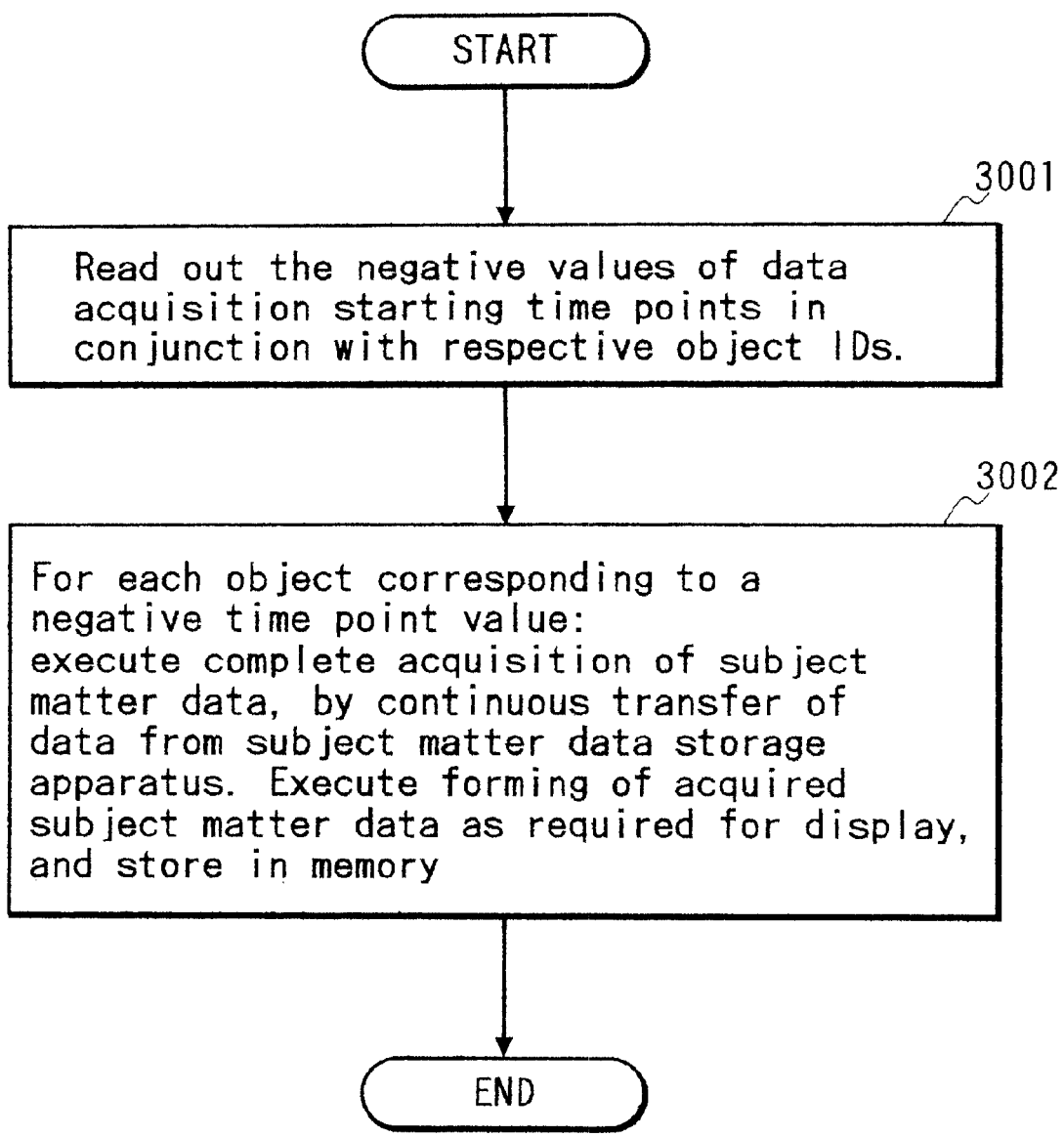
FIG. 40 is a flow diagram of processing which is executed to acquire the subject matter data of each non base-axis object found to have a negative value of data acquisition starting time point.

The contents of step 2802 of this embodiment are shown in the flow diagram of FIG. 40.

The counter T_flag is then set to the initial value of 1, and the apparatus is set in the event waiting state.

Subsequently, when it is found in step 2808 that a processing operation must be executed, and the corresponding synchronization trigger data set specifies that the processing contents are "ACQUIRE DATA", i.e., to start data acquisition for the object whose ID is specified in that synchronization trigger data set, then step 2816 is executed, whereby synchronization processing section 2706 sends a command to the overall control and management section 2701 to designate that the subject matter data of the specified object are to be acquired. The overall control and management section 2701 then controls the object data acquisition section 2707 such that the subject matter data of that object are acquired by the object data acquisition section 2707 from the object data storage apparatus 104 as successive blocks (i.e., of predetermined size S, with the predetermined data acquisition cycle value TM, as specified by the information stored in the data block acquisition information memory 2703). When all of the subject matter data of that object have been acquired, the data are formed as required for supplying to the non base-axis object display section 107 and set into the non base-axis object data memory 1102. This constitutes step 2816 in the flow diagram of FIG. 28. Playing of that non base-axis object can then begin when the presentation starting time point is reached.

If the pointer field of the synchronization trigger data set of that object contains the NULL code, then the T_flag counter value is incremented, and the system returns to the event waiting state.

Subsequently, when the processing time point is reached at which playing of that object is to be ended, then step 2810 in FIG. 28 is executed, whereby playing is terminated and the data of that object are deleted from the non base-axis object data memory 1102.

In other respects, the operation of this sixth embodiment is identical to that of the second embodiment described above.

It can thus be understood that with this embodiment, the scenario is interpreted before the apparatus is set in the condition in which playing of a hypermedia title can be initiated, and based on the predetermined values of data acquisition block size (S) and acquisition cycle (TM), respective appropriate data acquisition starting time points for each of the non base-axis objects are then calculated.

All of such time point values are established on the basis of playing successive units of the base-axis object in the playing progression of the hypermedia title, i.e., are equivalent to respective numbers of frames, in the case of a video base-axis object.

In that way, since it is not necessary to store all of the subject matter data of all of the non base-axis objects in memory before the apparatus is set in the event waiting state, a reduction can be achieved in the amount of memory resources which must be made available for such data storage.

In addition, the amount of time required for initial processing, before playing of a hypermedia title can begin, is reduced, and presentation of the monomedia objects can be executed at high speed, while ensuring smooth playing of the hypermedia title.

In the above description, the case has not been considered in which a plurality of synchronization trigger data sets are assigned to a single processing time point, with each of these having the. ON processing contents, i.e., each designating that playing of the corresponding non base-axis object is to be started at that time point. In that case, the initial processing is similar to that described above, however the data acquisition starting time points must be determined for the respective objects in accordance with the aforementioned priority sequence which has been established for these. That is to say, if for example such a set of synchronization trigger data sets are assigned to the highest value of processing time point, then the first reference time point (e.g., as shown in the example of FIG. 36) would be established on the basis of the data acquisition duration for the non base-axis object of the synchronization trigger data set having the lowest priority, i.e., the non base-axis object which will be processed last of all. The next position of the reference time point would then be determined on the basis of the data acquisition duration for the non base-axis object of that set having the next-lowest priority, and so on.

With the sixth embodiment described above, if a non base-axis object has is found to have a negative value of data acquisition starting time point (indicating that at least a part of the subject matter data of that object must be acquired prior to the start of playing the hypermedia title), then all of the subject matter data of that object are acquired by continuous data transfer from the object data storage apparatus 104 in the initial processing. Hence, referring to the example of FIG. 38, as the final part of the initial processing, the subject matter data of still picture A would be acquired by the object data acquisition section 2707 from the object data storage apparatus 104, under the control of the overall control and management section 2701, as a continuous set of data. The subject matter data of still picture B would then be similarly acquired. A seventh embodiment of the invention will be described, which differs from the sixth embodiment only with regard to the manner in which such subject matter data are acquired.

Figure 41:
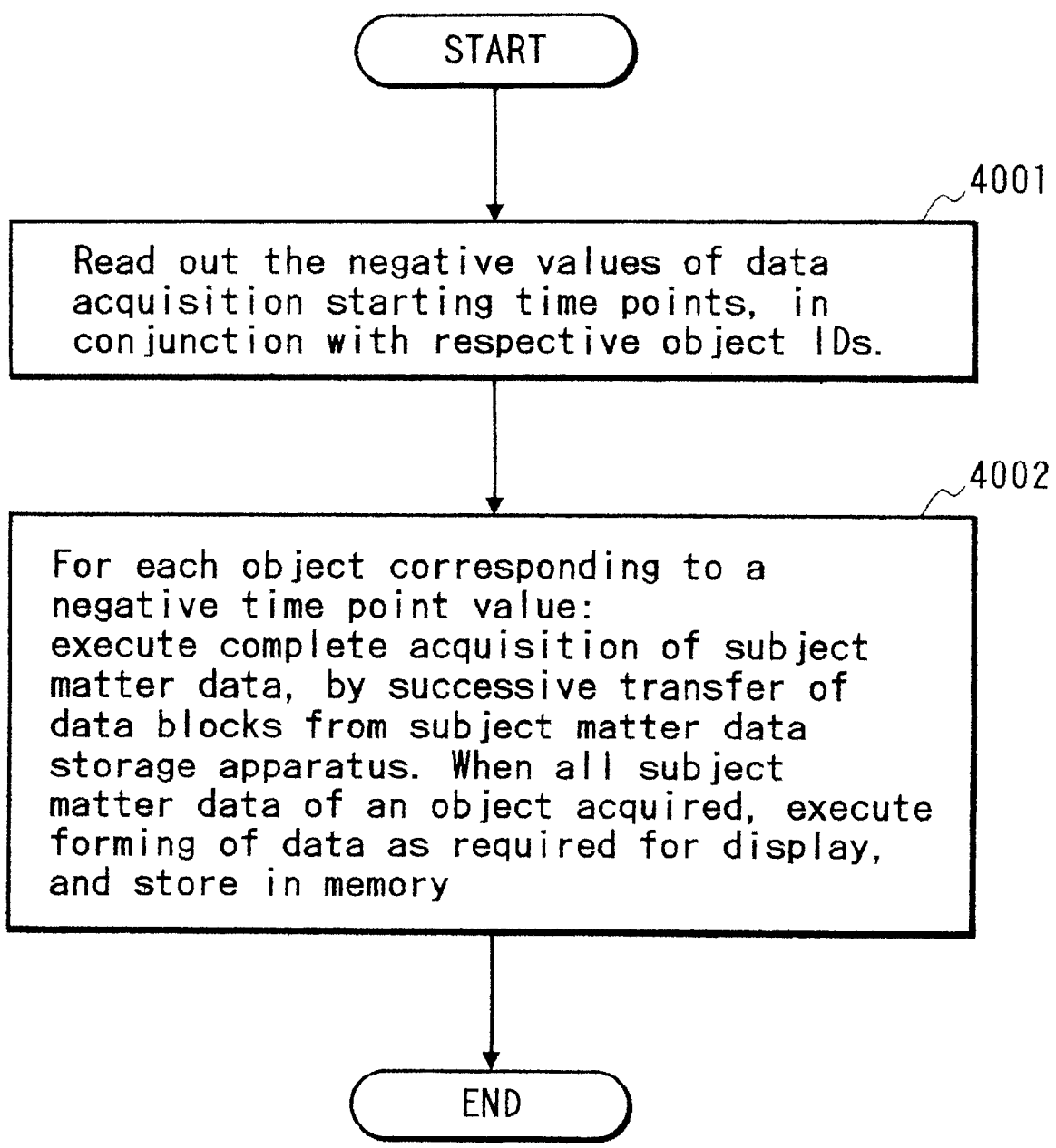
FIG. 41 a flow diagram of an alternative form of processing which is executed to acquire the subject matter data of each non base-axis object found to have a negative value of data acquisition starting time point.

Specifically, with the seventh embodiment, the object data acquisition section 2707 executes such a data transfer, during the initial processing, in the same manner as a data transfer which is executed during the playing progression, i.e., as a sequence of periodically transferred data blocks. In that case, the contents of step 2802 of FIG. 28 would become as shown in FIG. 41. Here, in step 4002, the values used for data block size and the acquisition cycle are the predetermined values (S, MT) which are held in the data block acquisition information memory 2703.

An eighth embodiment of the invention will now be described. Again, this embodiment differs from the sixth embodiment only with regard to the manner in which subject matter data are acquired, for a non base-axis object which is found to have a negative value of data acquisition starting time point, and also in that when a synchronization trigger data set is created which specifies a "data acquisition starting time point" as a processing time point, that synchronization trigger data set may specify an intermediate position within the subject matter data file of the object concerned, from which data acquisition is to be started when playing of the hypermedia title is begun. That position can for example be specified as a number of data blocks, having the predetermined data block size (S), e.g., as a synchronization trigger data item "ACQUISITION STARTING BLOCK NUMBER", in a synchronization trigger data set which specifies processing that is to immediately be triggered each time the playing progression is started.

Figure 42:
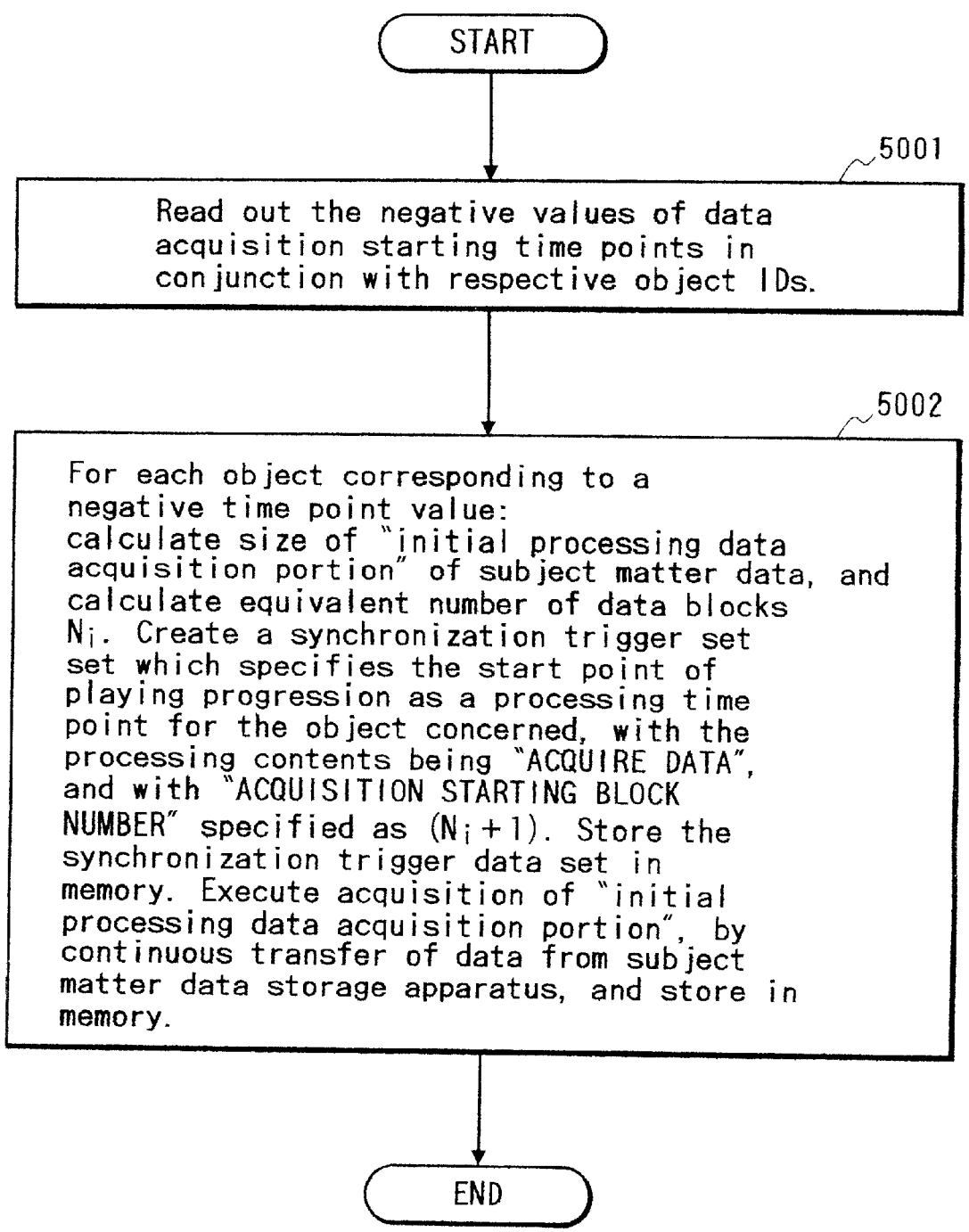
FIG. 42 is a flow diagram of processing which is executed to acquire the initial processing data acquisition portion of a non base-axis object having a negative value of data acquisition starting time point.

In this case, the contents of step 2802 of the flow diagram of FIG. 28 are as shown in FIG. 42. For each object corresponding to a negative time point value, if the subject matter data is found to have a non-zero value of "playing progression data acquisition portion", as defined hereinabove and illustrated in FIG. 32, then the size of the "initial processing data acquisition portion" of the subject matter data is calculated, and converted to an equivalent number of data blocks $N_i$, having the block size (S) that has been predetermined and is stored in the data block acquisition information memory 2703. The overall control and management section 2701 then creates a synchronization trigger set which specifies the start point of playing progression (i.e., the "0 second" time point in FIG. 38) as a processing time point for the object concerned, with the processing contents being "ACQUIRE DATA", and with "ACQUISITION STARTING BLOCK NUMBER" specified as ($N_i$+1). That synchronization trigger data set is then stored in the internal data memory 2705. The "initial processing data acquisition portion" of the subject matter data are then acquired, e.g., by continuous transfer of data from the object data storage apparatus 104, and stored in the non base-axis object data memory 1102.

The apparatus can then be set in the event waiting state. Thereafter, when the "play" button is selected by a user and the playing progression is entered, the object data acquisition section 2707 begins to acquire the playing progression data acquisition portion, as successive data blocks. When all of the subject matter data for that object have thereby been obtained (i.e., at a point prior to the presentation starting time point for the object concerned) the data are formed as required by the non base-axis object display section 107, and stored in the non base-axis object data memory 1102.

It can thus be understood that with this embodiment, a further reduction in the duration of the time required to execute the initial processing can be achieved, since it becomes unnecessary to acquire and store at least a part of the data of a non base-axis object (such as the still picture B of FIG. 38) if that data portion can be aquired during the playing progression, even if the data acquisition starting time point has a negative value.

In the preceding description of the sixth embodiment, it is assumed that the transfer rate at which the base-axis object (video) data are acquired from the subject matter data storage apparatus, e.g., via a data communication network, is a fixed value. However it is possible that the data transfer rate may vary, in accordance with different types of transmission path (e.g., different networks) being used to acquire data from the subject matter data storage apparatus. A ninth embodiment will be described, which differs from the sixth embodiment only with respect to the contents of the data block acquisition information memory 2703. With the ninth embodiment, rather than storing a pair of predetermined values (data block size S, acquisition cycle TM), a plurality of such predetermined pairs are stored, which have been calculated as appropriate for use with respectively different values of data transfer rate (v) of the base-axis object. These sets of values can be stored in the form of a table, an example of which is shown in FIG. 43, for the case of three different possible values of data transfer rate.

Various ways could be envisaged for selecting the appropriate pair of such values, for use in deriving the data acquisition starting time point values in step 2801 of FIG. 28 as described above. For example, a tri-state flag could be provided, which is preset by an operator to a state indicative of one of the three possible data transfer rates, before the operations shown in FIG. 28 are started. In that case, the overall control and management section 2701 can examine the state of that flag, before beginning to interpret the scenario, and select the corresponding pair of values (S, MT) from the pairs of values stored in the memory 2703, with the selected values being used thereafter in determining the data acquisition starting time points for the non base-axis objects.

Although the invention has been described in the above with respect to embodiments in which it is assumed that the base-axis object is a video object, it would be equally possible to use an audio object as the base-axis object. For example, if a multimedia title has a sound track which is played continuously from start to end of the title, then by embedding timing markers (i.e., which will not noticeably affect the audible sound produced) at periodic intervals within that sound track, and providing a circuit for detecting and counting successive occurrences of these timing markers during the playing progression, the timing markers can perform the same function that has been described for the video frames of the above embodiments, i.e., the base-axis object is formatted as a sequence of playing sections. Processing time points can be defined as respective (counted) numbers of timing markers. Since the design of circuits for implementing such detection and counting of timing markers is readily within the capabilities of a skilled person, specific embodiments using such a method have been omitted. In the case of video data, the finally obtained video signal inherently contains such embedded timing markers, i.e., the vertical synchronizing pulses, so that successively displayed frames can be easily counted.

Thus, although the invention has been described in the above with reference to specific embodiments, it will be understood that various modifications to these embodiments could be envisaged, which fall within the scope claimed for the invention in the appended claims.

What is claimed is:

1. The multimedia playing apparatus for playing a hypermedia title formed of a base-axis object and at least one non base-axis object, said base-axis object being a finite-time monomedia object having a playing duration which extends from start to end of a playing progression of said hyper media title, said base-axis object being configured as a plurality of sequential fixed-length playing sections, said multimedia playing apparatus comprising:

scenario data storage means for storing data of a scenario of said hypermedia title, said scenario including a plurality of sets of synchronization trigger data, each of said sets identifying a corresponding one of said non base-axis objects and specifying, for said corresponding non base-axis object, a processing time point during said playing progression at which a processing operation for starting playing of said non base-axis object or a processing operation for ending playing of said non base-axis object is to be executed, each of said processing time points being expressed as an integral number of said playing sections, subject matter data storage means for storing respective subject matter data of said base-axis object and each of said non base-axis objects;

timer event generating means for periodically generating timer events;

base-axis object display means controllable for acquiring subject matter data of said base-axis object from said subject matter data storage means and utilizing said subject matter data to play said base-axis object continuously throughout said playing progression, non base-axis object display means for playing said non base-axis objects;

internal data memory means;

processing event counter means;

playing progression counter means for counting successive ones of said playing sections during playing of said hypermedia title;

playing command input means, operable by a user for generating at least a "play" input command to designate that playing of said hypermedia title is to be started; and overall control and synchronization processing means for executing initial processing to set said apparatus in a condition of readiness for playing said hypermedia title, said initial processing comprising at least operations for acquiring said scenario data from said scenario data storage means, obtaining said sets of synchronization trigger data from said scenario data and storing said sets in sequentially numbered locations in said internal memory means, for setting said processing event counter means and playing progression counter means to respective predetermined initial values, and on completion of said initial processing, when input of said "play" input command occurs, executing operations for controlling said base-axis object display means to begin to acquire said base-axis object subject matter data, in response to occurrence of each of said timer events, obtaining respective current values of said playing sections count and processing event count, obtaining from said internal memory means a set of said synchronization trigger data having a storage location which corresponds to said processing event count value, judging whether said playing sections count value is greater than or equal to a processing time point value which is specified in said obtained set of synchronization trigger data, and, when said playing sections count value is judged to be greater than or equal to said specified processing time point value, executing a processing operation which is specified in said synchronization trigger data set, for a non base-axis object which is identified in said synchronization trigger data set, and incrementing said processing event counter means.

2. The multimedia playing apparatus according to claim 1, wherein a plurality of said sets of synchronization trigger data may be assigned to a specific one of said processing time points, and wherein each of said synchronization trigger data sets includes storage location pointer information for defining a sequence in which said plurality of sets are to be successively read out from memory and processed when said specific processing time point is reached.

3. The multimedia playing apparatus according to claim 1 wherein said overall control and synchronization processing means comprises means functioning, when said obtained set of synchronization trigger data specifies for said corresponding non base-axis object that playing of said non base-axis object is to be started, to acquire a subject matter data set of said non base-axis object from said subject matter data storage means, to process said subject matter data set into a corresponding formed data set which is in accordance with said playing conditions specified in said scenario, and to supply said formed data set to said non base-axis object display means.

4. The multimedia playing apparatus according to claim 1, further comprising non base-axis object data memory means, and wherein said overall control and synchronization processing means further comprises:

means functioning, during execution of said initial processing operations, to acquire respective sets of subject matter data of each of said non base-axis objects from said subject matter data storage means, to convert each of said sets into respective corresponding sets of formed data which are in accordance with said playing conditions specified in said scenario, and to store said sets of formed data in said non base-axis object data memory means, and means functioning during said playing progression, when said obtained set of synchronization trigger data specifies for said corresponding non base-axis object that playing of said non base-axis object is to be started, to acquire a formed data set corresponding to said non base-axis object from said non base-axis object data memory means and to supply said formed data set to said non base-axis display means.

5. The multimedia playing apparatus according to claim 4, further comprising title control command input means, operable by a user for generating a title control input command to specify that a current playing position of said hypermedia title is to be shifted to a new playing position in said playing progression, object presentation status management data memory means, and playing status restoration processing means, and wherein said overall control and synchronization processing means further comprises means functioning during execution of said initial processing operations to obtain said information specifying respective processing time points for starting and ending playing of each of said non base-axis objects, to generate corresponding object presentation status management data specifying, for each of respective sequentially numbered segments of said playing progression which are defined between successive pairs of said processing time points, each of said non base-axis objects which is to be played during said segment, and to store said object presentation status management data in said object presentation status management data memory means, and wherein said playing status restoration processing means comprises means functioning, in response to designation of a shift to a new playing position by a title control input command, to control said non base-axis object display means to terminate playing of all non base-axis objects which are currently being played by said second display means, to obtain the number of a segment which contains said new playing position, to obtain from said object presentation status management data memory means said object presentation status management data corresponding to said segment, to read out from said non base-axis object data memory means respective sets of said formed data of non base-axis objects which are specified for said segment in said object presentation status management data and to supply said non base-axis object formed data to said non base-axis object display means.

6. The multimedia playing apparatus according to claim 4, further comprising object control means, and object control command input means operable by a user for generating an object control command to designate for at least one of said non base-axis objects that said non base-axis object is to be played in accordance with a user-mediated play condition which is different from a play condition specified for said non base-axis object in said scenario, and wherein said overall control and synchronization processing means further comprises means, functioning during execution of said initial processing operations, to modify said formed data set of said non base-axis object to obtain a modified formed data set which is in accordance with said user-mediated play condition, and to store said modified formed data set in said internal data memory means, and wherein said object control means functions during playing of said hypermedia title, in response to input of said object control command, to control said non base-axis object display means to terminate playing of said non base-axis object and to acquire said modified formed data set from said internal data memory means and supply said modified formed data set to said non base-axis object display means, for thereby playing said non base-axis object in accordance with said user-mediated play condition.

7. The multimedia playing apparatus according to claim 1, wherein said scenario includes information relating to at least one external application program having functions which are not related to the playing of a hypermedia title, said apparatus further comprising external application program activation command input means operable by a user for generating an external application program activation input command, external application program activation means controllable for activating the execution of said external application program, and external application program data memory means, said overall control and synchronization processing means further comprising means functioning during execution of said initial processing operations to generate external application program control data which are necessary for activating said external application program and to store said external application program control data in said external application program data memory means, and wherein said external application program activation means is responsive to generation of said external application program activation input command, during playing of said hypermedia title, for acquiring said external application program control data from said external application program data memory means and supplying said external application program control data to said external application program activation means, and wherein said external application program activation means utilizes said external application program control data to activate said external application program.

8. The multimedia playing apparatus according to claim 1, wherein said base-axis object subject matter data are cyclically acquired by said base-axis object display means from said subject matter data storage means as successive fixed-size data blocks having a first value of data block size, with a fixed cycle time, and wherein said overall control and synchronization processing means acquires and supplies said non base-axis object subject matter data as successive fixed-size data blocks, with said cycle time, said blocks having a second value of size which is predetermined based on said cycle time and said first value of size, said apparatus further comprising:

non base-axis object data memory means, data block acquisition information memory means having stored therein said cycle time and said second data block size value, object data acquisition time calculation means functioning during said initial processing to calculate, for each of said non base-axis objects, a duration of acqusition time required to acquire said subject matter data of said each non base-axis object from said subject matter data storage means, and sequential data acquisition schedule management means for determining, based on said acquisition time durations, respective data acquisition starting time points for sequential acquisition of subject matter data of respective ones of said non base-axis objects are to begin, with at least one of said data acquisition starting time points being determined such that at least a part of said subject matter data of a corresponding non base-axis object is specified to be acquired during said playing progression of said- hypermedia title, said overall control and synchronization processing means comprising means functioning during said initial processing to create, in correspondence with each of said data acquisition starting time points which is a positive value, an additional synchronization trigger data set which specifies as processing contents thereof that data acquisition for said corresponding non base-axis object is to commence at said data acquisition starting time point, and to store said additional synchronization trigger data sets in said internal memory means, to acquire from said subject matter data storage means respective subject matter data sets for each of said non base-axis objects corresponding to a data acquisition starting time point which is a negative value, convert each of said subject matter data sets into a corresponding set of formed data which are in accordance with said playing conditions specified in said scenario, and to store said sets of formed data in said non base-axis object data memory means, said overall control and synchronization processing means further comprising means functioning during said playing progression, when said obtained set of synchronization trigger data specifies for said corresponding non base-axis object that playing of said non base-axis object is to be started, to acquire a formed data set corresponding to said non base-axis object from said non base-axis object data memory means and to supply said formed data set to said non base-axis display means, and means functioning during said playing progression, when a processing operation is executed to end playing of a non base-axis object, to delete all data relating to said object from said non base-axis object data memory means.

9. The multimedia playing apparatus according to claim 8, wherein said acquisition of respective subject matter data sets for each of said non base-axis objects corresponding to a data acquisition starting time point which is a negative value is executed by continuous data acquisition from said subject matter data storage means.

10. The multimedia playing apparatus according to claim 8, wherein said acquisition of respective subject matter data sets for each of said non base-axis objects corresponding to a data acquisition starting time point which is a negative value is executed by cyclic acquisition of said subject matter data set from said subject matter data storage means, as sequential data blocks having said second fixed size, with said cycle time.

11. The multimedia playing apparatus according to claim 8, wherein said sequential data acquisition schedule management means comprises means functioning, for each of said non base-axis objects corresponding to a data acquisition starting time point which is a negative number, to divide said subject matter data set of said non base-axis object into an initial processing data acquisition portion and a playing progression data acquisition portion each comprising an integral number of said data blocks of the second size value, and, when said playing progression data acquisition portion has other than zero magnitude, to acquire from said subject matter data storage means said initial processing data acquisition portion and store said portion in said non base-axis object data memory means, and wherein said overall control and synchronization processing means comprises means for creating an additional synchronization trigger data set which specifies that acquisition of said playing progression data acquisition portion from said subject matter data storage means is to be commenced at the starting point of said playing progression, and for storing said additional synchronization trigger data set in said internal memory means.

12. The multimedia playing apparatus according to claim 1, wherein said data block acquisition information memory means has stored therein a plurality of pairs of values, each pair being a combination of a cycle time value and second data block size value which have been predetermined in accordance with a specific value of bandwidth of a data communication path between said subject matter data storage means and said base-axis object display means.

13. The multimedia playing apparatus according to claim 1, wherein said base-axis object is a video object, and wherein said playing sections are respective frames of said video object.

* * * * *